(12) United States Patent
Soldati et al.

(10) Patent No.: US 12,719,606 B2
(45) Date of Patent: Aug. 25, 2026

(54) INTER-NODE EXCHANGE OF LINK ADAPTATION ASSISTANCE INFORMATION

(71) Applicant: Telefonaktiebolaget LM Ericsson (publ), Stockholm (SE)

(72) Inventors: Pablo Soldati, Solna (SE); Euhanna Ghadimi, Bromma (SE); Yu Wang, Solna (SE); Burak Demirel, Älvsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 314 days.

(21) Appl. No.: 18/287,230

(22) PCT Filed: Apr. 26, 2022

(86) PCT No.: PCT/EP2022/061046

§ 371 (c)(1),
(2) Date: Oct. 17, 2023

(87) PCT Pub. No.: WO2022/229181

PCT Pub. Date: Nov. 3, 2022

(65) Prior Publication Data

US 2024/0204910 A1 Jun. 20, 2024

Related U.S. Application Data

(60) Provisional application No. 63/180,569, filed on Apr. 27, 2021, provisional application No. 63/180,557, filed on Apr. 27, 2021.

(51) Int. Cl.

| | |
|---|---|
| ***H04L 1/00*** | (2006.01) |
| ***H04W 24/02*** | (2009.01) |
| ***H04W 76/20*** | (2018.01) |

(52) U.S. Cl.
CPC ........... *H04L 1/0023* (2013.01); *H04W 24/02* (2013.01); *H04W 76/20* (2018.02)

(58) Field of Classification Search
CPC ......... H04L 1/0023; H04L 2001/0092; H04W 24/02; H04W 76/20; H04W 36/0083
See application file for complete search history.

(56) References Cited

U.S. PATENT DOCUMENTS

2009/0238163 A1* 9/2009 Zhang .................. H04W 24/02 370/338
2010/0189075 A1 7/2010 Iwamura et al.
(Continued)

FOREIGN PATENT DOCUMENTS

WO 2013025131 A1 2/2013
WO 2020025109 A1 2/2020
(Continued)

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," Technical Specification 36.300, Version 16.5.0, Mar. 2021, 3GPP Organizational Partners, 391 pages.
(Continued)

*Primary Examiner* — Jamal Javaid
(74) *Attorney, Agent, or Firm* — Weisberg I.P. Law, P.A.

(57) ABSTRACT

Systems and method for inter-node exchange of link adaptation assistance information in a communications system are disclosed. In one embodiment, a method performed by a first network node comprises obtaining link adaptation assistance information associated to at least one communication device served by the first network node and transmitting a link adaptation assistance information message comprising the link adaptation assistance information to a second net-
(Continued)

work node. In this manner, more efficient and better performing link adaptation algorithms in the communications system are enabled. Corresponding embodiments of a first network node are also disclosed herein. Corresponding embodiments of a second network node and a method of operation thereof are also disclosed.

18 Claims, 44 Drawing Sheets

(56) References Cited

U.S. PATENT DOCUMENTS

| | | | | |
|---|---|---|---|---|
| 2016/0157144 | A1* | 6/2016 | Karlsson | H04W 36/0058 455/436 |
| 2017/0238148 | A1* | 8/2017 | Kolan | H04L 1/0041 370/312 |
| 2019/0261234 | A1* | 8/2019 | Park | H04W 36/085 |
| 2020/0154287 | A1 | 5/2020 | Novlan et al. | |

FOREIGN PATENT DOCUMENTS

| | | | |
|---|---|---|---|
| WO | 2020190182 | A1 | 9/2020 |
| WO | 2020226542 | A1 | 11/2020 |
| WO | 2020254859 | A1 | 12/2020 |

OTHER PUBLICATIONS

Author Unknown, "Technical Specification Group Radio Access Network; NR; NR and NG-RAN Overall Description; Stage 2 (Release 16)," Technical Specification 38.300, Version 16.5.0, Mar. 2021, 3GPP Organizational Partners, 151 pages.

Author Unknown, "Technical Specification Group Radio Access Network; NG-RAN; Architecture description (Release 15)," Technical Specification 38.401, Version 15.4.0, Dec. 2018, 3GPP Organizational Partners, 40 pages.

Huawei, "R3-206874: SOD on Use Cases for SI on Data Collection," 3GPP TSG-RAN WG3 #110-e, Nov. 2-12, 2020, Electronic Meeting, 12 pages.

International Search Report and Written Opinion for International Patent Application No. PCT/EP2022/061046, mailed Sep. 20, 2022, 9 pages.

* cited by examiner

FIRST NETWORK NODE
1200-1

SECOND NETWORK NODE
1200-2

1500. MAKE HANDOVER DECISION

1502. HANDOVER REQUEST

1504. HANDOVER RESPONSE INCLUDING LINK ADAPTATION ASSISTANCE INFORMATION REQUEST

1202. OBTAIN LINK ADAPTATION ASSISTANCE INFORMATION FOR AT LEAST ONE SERVED WCD

1204. LINK ADAPTATION ASSISTANCE INFORMATION MESSAGE (IN A HANDOVER REQUEST)

1206. USE THE LINK ADAPTATION ASSISTANCE INFORMATION

INTER-NODE EXCHANGE OF LINK ADAPTATION ASSISTANCE INFORMATION

This application is a 35 U.S.C. § 371 national phase filing of International Application No. PCT/EP2022/061046, filed Apr. 26, 2022, which claims the benefit of provisional patent application Ser. No. 63/180,569, filed Apr. 27, 2021, and provisional patent application Ser. No. 63/180,557, filed Apr. 27, 2021, the disclosures of which are hereby incorporated herein by reference in their entireties.

TECHNICAL FIELD

The present disclosure relates to link adaptation in a communications system.

BACKGROUND

1 Third Generation Partnership Project (3GPP) System Architecture

The Long Term Evolution (LTE) Evolved Universal Terrestrial Radio Access Network (E-UTRAN) architecture is illustrated in FIG. 1 and consists of evolved Node Bs (eNBs), Mobility Management Entities (MMEs), and System Architecture Evolution Gateways (S-GWs). An S1 interface connects the eNBs to the MME/S-GW, while connectivity between eNBs is supported by an X2 interface.

The architecture of the current Fifth Generation (5G) Radio Access Network (RAN), which is also referred to as the Next Generation RAN (NG-RAN), is depicted in FIG. 2 and described in 3GPP Technical Specification (TS) 38.401 (see, e.g., v15.4.0). The NG-RAN supports the New Radio (NR) radio access technology (RAT).

The Next Generation (NG) architecture (which is also referred to as the 5G system architecture) can be further described as follows. As illustrated in FIG. 2, the NG-RAN consists of a set of NG NodeBs (gNBs) connected to the 5G Core (5GC) through the NG interface. An gNB can support Frequency Division Duplexing (FDD) mode, Time Division Duplexing (TDD) mode, or dual mode operation. gNBs can be interconnected through the Xn interface. A gNB may consist of a gNB Central Unit (gNB-CU) and one or more gNB Distributed Units (gNB-DU)s. A gNB-CU and a gNB-DU are connected via F1 logical interface. One gNB-DU is connected to only one gNB-CU. For resiliency, a gNB-DU may be connected to multiple gNB-CU by appropriate implementation. NG, Xn, and F1 are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1), the related TNL protocol and the functionality are specified in the 3GPP specifications. The TNL provides services for user plane transport and signaling transport.

A gNB may also be connected to an LTE eNB via the X2 interface. Another architectural option is where an LTE eNB connected to the Evolved Packet Core (EPC) network is connected over the X2 interface with a so called "nr-gNB". The latter is a gNB not connected directly to a core network and connected via X2 to an eNB for the sole purpose of performing dual connectivity.

The architecture in FIG. 2 can be expanded by spitting the gNB-CU into two entities, namely, a gNB-CU User Plane (UP) part (gNB-CU-UP) and a gNB-CU Control Plane (CP) part (gNB-CU-CP). The gNB-CU-UP serves the user plane and hosts the Packet Data Convergence Protocol (PDCP) protocol. The gNB-CU-CP serves the control plane and hosts the PDCP and Radio Resource Control (RRC) protocols. For completeness, it should be said that a gNB-DU hosts the Radio Link Control (RLC), Medium Access Control (MAC), and physical layer (PHY) protocols.

2 Link Adaptation in Communication Systems

Link adaptation, or adaptive modulation and coding (AMC), is a technique used in wireless communications systems, such as the 3GPP High-Speed Downlink Packet Access (HSDPA), LTE, or NR, to dynamically adapt the transmission rate of a communication link to the time- and frequency-varying channel conditions. Modulation and Coding Schemes (MCSs) effectively adapt the transmission rate by matching the modulation and coding parameters used for communication to the conditions of the radio link, such as propagation loss, channel strength, interference from other signals concurrently transmitted in the same radio resources, etc. Link adaptation is a dynamic process that acts potentially as frequently as each transmission time interval (e.g., on a millisecond time-scale in the 3GPP LTE system), wherein the communication link between a radio node and a User Equipment (UE) is scheduled for transmission.

Therefore, link adaptation algorithms require some form of Channel State Information (CSI) at the transmitter to improve the rate of transmission and/or reduce bit or block error rates. CSI is typically reported by the receiver to the transmitter. In the of the 3GPP LTE and NR systems, for instance, a UE can be configured to report, periodically or event based, CSI measurement reports to the network that provide a measure of channel quality experienced by the UE. CSI reports may comprise, for instance, a Channel Quality Indicator (CQI), Rank Indication (RI), and Precoding Matric Index (PMI) for leveraging spatial diversity in Multiple Input Multiple Output (MIMO) transmissions. In a TDD system, it is often reasonable to assume channel reciprocity, i.e., that the quality of the downlink channel from the transmitter (the network node) to the receiver (the UE) is approximately the same as the uplink channel quality. Therefore, the network node can use estimates of the uplink channel state derived from uplink sounding reference signals as a measure of the downlink channel state to perform the link adaptation process for the downlink communication.

In either case, the CSI available at the transmitter may not be very accurate or degrade over time. For instance, CSI derived from sounding reference signals is used by the transmitter until a new sounding reference signal is received. This implies that the latest channel state estimate becomes less and less reliable over time. This is referred to as channel aging. In the 3GPP LTE system, for instance, a UE can be configured to transmit sounding reference signals as frequently as every 2 milliseconds (ms) (i.e., every other radio subframe) or as infrequently as 160 ms (i.e., every 16 radio frames). When the UE estimates the CSI for the network node, the channel state report is received within a certain delay and the channel state measurements may have been prefiltered by the UE either over time, or over frequency, or over spatial domain (e.g., such as over different transmission beams in a multi-antenna system).

The mismatch between the channel state estimate available at the transmitter and the effective instantaneous channel state between the transmitter and the receiver may introduce uncertainty and errors in the selection of the transmission parameters, such as modulation order, modulation and coding scheme (MCS) index, code rate, etc., which may result in suboptimal performance. For instance, if the CSI is underestimated, the transmitter may configure a transmission with more conservative transmission parameters, e.g., a low modulation order. While this choice would make the transmission more robust to errors, less information would be transmitted in the allocated resource compared to the effective channel capacity, thereby resulting in reduced spectral efficiency and resource overutilization. On the other hand, if the channel quality is over estimated, the transmitter may configure more aggressive transmission parameters (e.g., a higher modulation order) and try to send more information than the channel capacity can carry, thereby increasing the probability of transmission failure. This would ultimately incur into several retransmissions of the same information, thus reducing the user throughput as well as the network spectral efficiency.

Such mismatch can become severe in scenarios with rapidly varying channel conditions due to certain radio environment conditions, such as fast-moving UEs, sudden changes in traffic in neighboring cells, rapidly varying inter-cell interference, etc. Therefore, link adaptation algorithms need to account for inaccurate CSI to achieve high spectral efficiency in the data transmission.

2.1 MCS Selection and Block Error Rate (BLER)

Link adaptation algorithms attempt to optimally adapt the transmission data rate chosen for a link to the current channel and interference conditions of the link. FIG. 3 shows an example of how link adaptation can be implemented in a RAN node, which in the example of FIG. 3 is an eNB. The RAN node typically relies on a discrete number of transmission rates that can be configured for a downlink or an uplink transmission. Such discrete rate values are typically mapped to different combinations of modulation order and coding rate, also referred to as MCS values. Link adaptation algorithms adapt the communication rate of a radio link by selecting the most appropriate MCS value based on the latest information available about the state of the communication system as well as the state of the individual communication link for which the MCS value is selected.

State of the art of RAN systems, such as the 3GPP LTE and NR systems, rely on link adaptation strategies that aim at controlling the error decoding rate for each communication session over a radio link, also referred to as the Block Error Rate (BLER). A common strategy is to adapt the MCS selection, hence the data transmission rate, to maintain the average BLER for a communication session link below or equal to a certain value, hereafter referred to as "BLER target". A typical BLER target choice is 10% BLER, that is, link adaptation aims at a 90% successful transmission rate at the first transmission attempt. To this end, the link adaptation algorithm executed by a RAN node exploits the CSI reported by the UE, such as the CQI, RI, and PMI, to derive an estimate of the signal to noise and interference ratio (SINR) experienced over the radio link by the UE, as illustrated in FIG. 3. Such an initial estimate is then corrected by an offset value based on parameters computed as a function of the desired BLER target and feedback from the Hybrid Automatic Repeat Request (HARQ) process (i.e., positive and negative acknowledgement of previous transmissions over the link) to derive an effective SINR estimate which, on average, would yield a 10% BLER. The effective SINR estimate is ultimately used to select a MCS value for the next transmission attempt which can ensure a 10% BLER.

The BLER target used by link adaptation algorithms provides a proxy parameter for controlling the average quality of a communication session. Depending on the channel state of the communication link, however, an incorrect setting of the BLER target can result into an excessive usage of radio resources, for instance, if a too low BLER target is required from a communication link with poor channel quality, or in poor performance if a too high BLER target is configured for a link with very good channel performance.

3 Mobility and Handover in Radio Networks 3.1 Mobility in the LTE system

When the system determines that there is a signal degradation for the serving cell of a UE and that a neighboring cell (i.e., a target cell) could serve the UE with a better signal quality, a handover procedure between the serving cell and the target cell can be initiated. A handover procedure may additionally be initiated to balance the load between radio cells, and therefore optimize the usage of the system resources and increase the system throughput.

In LTE, the eNBs responsible for the serving cell and the target cell may directly exchange load information by using the X2 interface prior to initiating a handover preparation procedure so as to avoid moving the UE to a loaded cell which, despite having a stronger radio signal towards the UE, may not be able to serve the UE with sufficient radio resources. In this case, initiating the handover would degrade the performance of the UE once moved to the target cell as well as of the UEs already served by the target cell (since the available radio resources would be shared among more UEs).

To determine whether a handover decision should be made, measurement reports from the UE can be configured to periodically report to the serving eNB (e.g., through uplink by using RRC signaling) information on the velocity and the service type of the UE.

The intra-MME/S-GW handover procedure in a 3GPP LTE system has three phases, namely, handover preparation, handover execution, and handover completion. When the conditions to start a handover preparation are met, the handover preparation procedure is mainly made up for a handover decision stage in serving eNB and for an admission control stage in target eNB as shown in FIG. 4.

In an LTE system, the handover decision in the handover preparation procedure is made by the radio resource management (RRM) function based on the measurement report from the UE. To avoid ping-pong effects between source and target eNBs, the handover decision made by the serving eNB must meet a robust handover criterion comprising threshold parameters for signal strength, hysteresis, and time to trigger.

The initial handover condition to be met for a positive handover decision is that the received signal strength (RSS) of the serving eNB is less than a given threshold value. In order to make the handover decision more robust, a signal strength threshold and a hysteresis operation can be enforced for the signal measured from the target eNB. In essence, if the candidate target eNB provides a higher RSS than that of the serving eNB during a period of time, a hysteresis operation is considered by the serving eNB for the target eNB. Once the conditions to trigger a handover procedure are met, a handover request is transmitted from the serving eNB to the target eNB. If the UE can be admitted by the target eNB, a handover request acknowledgment message is transmitted back from the target eNB to the serving eNB. At this point, the serving eNB can issue a handover command to the UE to begin the handover.

FIGS. 5A and 5B show an illustration of the of Intra-MME/S-GW handover for the 3GPP LTE Advanced (LTE-A) system (cf. Section 10 in 3GPP TS 36.300 V16.5.0). Steps 7 to 16 provide means to avoid data loss during handover and are discussed in detail in Sections 10.1.2.1.2 and 10.1.2.3 of 3GPP TS 36.300.

In step 7, the target eNB generates the RRC message to perform the handover, i.e. RRCConnectionReconfiguration message including the mobilityControlInformation, to be sent by the source eNB towards the UE. The source eNB performs the necessary integrity protection and ciphering of the message.

The UE receives the RRCConnectionReconfiguration message with necessary parameters (i.e., new Cell Radio Network Temporary Identifier (C-RNTI), target eNB security algorithm identifiers, and optionally dedicated Random Access Channel (RACH) preamble, target eNB System Information Blocks (SIBs), etc.) and is commanded by the source eNB to perform the handover. If RACH-less handover is configured, the RRCConnectionReconfiguration includes timing adjustment indication and optionally pre-allocated uplink grant for accessing the target eNB. If pre-allocated uplink grant is not included, the UE should monitor Physical Downlink Control Channel (PDCCH) of the target eNB to receive an uplink grant. The UE does not need to delay the handover execution for delivering the Hybrid Automatic Repeat Request (HARQ)/Automatic Repeat Request (ARQ) responses to source eNB.

If Make-Before-Break HO is configured, the connection to the source cell is maintained after the reception of RRCConnectionReconfiguration message with mobilityControlInformation before the UE executes initial uplink transmission to the target cell. In this case, the source eNB can deliver/receive additional user plane data to/from the UE. If Make-Before-Break HO is configured, the source eNB decides when to stop transmitting to the UE.

3.2 Mobility in the NR System

The basic mobility solution in NR shares some similarities to LTE. The UE may be configured by the network to perform cell measurements and report them in order to assist the network to make mobility decisions. However, a difference is that the UE may be configured to perform Layer 3 (L3) beam measurements based on different reference signals (Synchronization Signal Blocks (SSBs) and/or CSI Reference Signals CSI-RSs)) and report them, for each serving and triggered cell, i.e. for each cell fulfilling triggering conditions for a measurement report (e.g., A3 event).

3.2.1 Measurements to Support Mobility in NR

The measurement model in NR, as described in 3GPP TS 38.300 V16.5.0, states that, in RRC_CONNECTED, the UE measures multiple beams (at least one) of a cell and the measurements results (power values) are averaged to derive the cell quality. In doing so, the UE is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the gNB.

The corresponding high-level measurement model is illustrated in FIG. 6 (cf. FIG. 9.2.4-1 from 3GPP TS 38.300) and described below.

NOTE: K beams correspond to the measurements on SSB or CSI-RS resources configured for L3 mobility by gNB and detected by UE at the physical layer (i.e., L1). Various labels in FIG. 6 are defined as follows:

A: measurements (beam specific samples) internal to the physical layer.

Layer 1 filtering: internal layer 1 filtering of the inputs measured at point A. Exact filtering is implementation dependent. How the measurements are actually executed in the physical layer by an implementation (inputs A and Layer 1 filtering) in not constrained by the standard.

$A^1$: measurements (i.e., beam specific measurements) reported by layer 1 to layer 3 after layer 1 filtering.

Beam Consolidation/Selection: beam specific measurements are consolidated to derive cell quality. The behavior of the Beam consolidation/selection is standardized, and the configuration of this module is provided by RRC signalling. Reporting period at B equals one measurement period at $A^1$.

B: a measurement (i.e., cell quality) derived from beam-specific measurements reported to layer 3 after beam consolidation/selection.

Layer 3 filtering for cell quality: filtering performed on the measurements provided at point B. The behavior of the Layer 3 filters is standardized, and the configuration of the layer 3 filters is provided by RRC signalling. Filtering reporting period at C equals one measurement period at B.

C: a measurement after processing in the layer 3 filter. The reporting rate is identical to the reporting rate at point B. This measurement is used as input for one or more evaluation of reporting criteria.

Evaluation of reporting criteria: checks whether actual measurement reporting is necessary at point D. The evaluation can be based on more than one flow of measurements at reference point C e.g., to compare between different measurements. This is illustrated by input C and $C^1$. The UE shall evaluate the reporting criteria at least every time a new measurement result is reported at point C, $C^1$. The reporting criteria are standardized, and the configuration is provided by RRC signalling (UE measurements).

D: measurement report information (message) sent on the radio interface.

L3 Beam filtering: filtering performed on the measurements (i.e., beam specific measurements) provided at point $A^1$. The behavior of the beam filters is standardized, and the configuration of the beam filters is provided by RRC signalling. Filtering reporting period at E equals one measurement period at $A^1$.

E: a measurement (i.e., beam-specific measurement) after processing in the beam filter. The reporting rate is identical to the reporting rate at point $A^1$. This measurement is used as input for selecting the X measurements to be reported.

Beam Selection for beam reporting: selects the X measurements from the measurements provided at point E. The behavior of the beam selection is standardized, and the configuration of this module is provided by RRC signalling.

F: beam measurement information included in measurement report (sent) on the radio interface.

Measurement reports are characterized by the following:

Measurement reports include the measurement identity of the associated measurement configuration that triggered the reporting;

Cell and beam measurement quantities to be included in measurement reports are configured by the network;

The number of non-serving cells to be reported can be limited through configuration by the network;

Cells belonging to a blacklist configured by the network are not used in event evaluation and reporting, and conversely when a whitelist is configured by the network, only the cells belonging to the whitelist are used in event evaluation and reporting;

Beam measurements to be included in measurement reports are configured by the network (beam identifier only, measurement result and beam identifier, or no beam reporting).

Intra-frequency neighbor (cell) measurements and inter-frequency neighbor (cell) measurements are defined as follows:

SSB based intra-frequency measurement: a measurement is defined as an SSB based intra-frequency measurement provided the center frequency of the SSB of the serving cell and the center frequency of the SSB of the neighbor cell are the same, and the subcarrier spacing of the two SSBs is also the same.

SSB based inter-frequency measurement: a measurement is defined as an SSB based inter-frequency measurement provided the center frequency of the SSB of the serving cell and the center frequency of the SSB of the neighbor cell are different, or the subcarrier spacing of the two SSBs is different.

NOTE: For SSB based measurements, one measurement object corresponds to one SSB and the UE considers different SSBs as different cells.

CSI-RS based intra-frequency measurement: a measurement is defined as a CSI-RS based intra-frequency measurement provided the bandwidth of the CSI-RS resource on the neighbor cell configured for measurement is within the bandwidth of the CSI-RS resource on the serving cell configured for measurement, and the subcarrier spacing of the two CSI-RS resources is the same.

CSI-RS based inter-frequency measurement: a measurement is defined as a CSI-RS based inter-frequency measurement provided the bandwidth of the CSI-RS resource on the neighbor cell configured for measurement is not within the bandwidth of the CSI-RS resource on the serving cell configured for measurement, or the subcarrier spacing of the two CSI-RS resources is different.

3.2.2 Cell-Level Mobility in NG-RAN

Section 9.2.3 of the 3GPP TS 38.300 specifies the cell-level mobility for the NG-RAN system.

Network controlled mobility applies to UEs in RRC_CONNECTED and is categorized into two types of mobility: cell level mobility and beam level mobility.

Cell Level Mobility requires explicit RRC signalling to be triggered, i.e., handover. For inter-gNB handover, the signalling procedures consist of at least the elemental components illustrated in FIG. 9.2.3.1-1 3GPP TS 38.300, which is reproduced herein as FIG. 7.

The procedure consists if the following steps:

1. The source gNB initiates handover and issues a HANDOVER REQUEST over the Xn interface.
2. The target gNB performs admission control and provides the new RRC configuration as part of the HANDOVER REQUEST ACKNOWLEDGE.
3. The source gNB provides the RRC configuration to the UE by forwarding the RRCReconfiguration message received in the HANDOVER REQUEST ACKNOWLEDGE. The RRCReconfiguration message includes at least cell ID and all information required to access the target cell so that the UE can access the target cell without reading system information. For some cases, the information required for contention-based and contention-free random access can be included in the RRCReconfiguration message. The access information to the target cell may include beam specific information, if any.
4. The UE moves the RRC connection to the target gNB and replies with the RRCReconfigurationComplete.

NOTE: User Data can also be sent in step 4 if the grant allows.

The handover mechanism triggered by RRC requires the UE at least to reset the MAC entity and re-establish RLC. RRC managed handovers with and without PDCP entity re-establishment are both supported. For Data Radio Bearers (DRBs) using RLC Acknowledgement Mode (AM) mode, PDCP can either be re-established together with a security key change or initiate a data recovery procedure without a key change. For DRBs using RLC Unacknowledged Mode (UM) mode and for Signaling Radio Bearers (SRBs), PDCP can either be re-established together with a security key change or remain as it is without a key change.

Data forwarding, in-sequence delivery, and duplication avoidance at handover, can be guaranteed when the target gNB uses the same DRB configuration as the source gNB.

Timer based handover failure procedure is supported in NR. RRC connection re-establishment procedure is used for recovering from handover failure.

3.2.3 Cell-Level Mobility in NG-RAN

In LTE and NR, handover decisions or Primary Secondary Cell (PSCell) change decisions (when the UE is operating in E-UTRA-NR Dual Connectivity (EN-DC) and/or Multi-RAT Dual Connectivity (MR-DC) or any other form of dual connectivity, carrier aggregation, etc.) are typically taken based on the coverage and quality of a serving cell compared to the quality of a potential neighbor cell. Quality is typically measured in terms of Reference Signal Received Quality (RSRQ) or SINR, while coverage is typically measured based on Reference Signal Received Power (RSRP). In NR, a cell may be comprised by a set of beams where Primary Synchronization Signal (PSS)/Secondary Synchronization Signal (SSS) are transmitted in different downlink beams.

FIG. 8 illustrates reference signal beams between LTE and NG-RAN (i.e., NR) systems.

Beam Level Mobility does not require explicit RRC signaling to be triggered. The gNB provides via RRC signaling the UE with measurement configuration containing configurations of SSB/CSI resources and resource sets, reports and trigger states for triggering channel and interference measurements and reports. Beam Level Mobility is then dealt with at lower layers by means of physical layer and MAC layer control signaling, and RRC is not required to know which beam is being used at a given point in time.

SSB-based Beam Level Mobility is based on the SSB associated to the initial downlink (DL) bandwidth part (BWP) and can only be configured for the initial DL BWPs and for DL BWPs containing the SSB associated to the initial DL BWP. For other DL BWPs, Beam Level Mobility can only be performed based on CSI-RS.

FIG. 9 illustrates an example of beam-level handover decision in a NG-RAN (i.e., NR) system.

Beam measurement information (SSB/CSI-RS indexes with or without associated measurements) may be included in measurement reports. One of the purposes of these beam reports is to enable the source node to take educated decisions in terms of ping-pong avoidance. For example, if multiple neighbor cells are reported (e.g., in an A3 event, namely a mobility event where the trigger condition is that the neighbor cell signal becomes better than the source by a certain offset) and these cells have somewhat equivalent quality/coverage (e.g., similar RSRP and/or similar RSRQ and/or similar SINR), criteria to decide where to handover the UE to could be the quality of reported beams. For example, network could prioritize the cells with more beams than another cell.

3.2.4 C-Plane and U-Plane Handling in Handover

FIGS. 10A and 10B illustrate the Intra-Access and Mobility Management (AMF)/User Plane Function (UPF) Handover for 3GPP NG-RAN system (cf. Section 9.2.3.2.1 of 3GPP TS 38.300). Upon the handover preparation is completed (steps 1-5), the RAN handover initialization is started (cf. step 6).

During the RAN handover initialization, from a control plane (C-plane) perspective, the source gNB triggers the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated RACH resources, the association between RACH resources and SSB(s), the association between RACH resources and UE-specific CSI-RS configuration(s), common RACH resources, and system information of the target cell, etc.

The user plane (U-plane) handling during the Intra-NR-Access mobility activity for UEs in RRC_CONNECTED takes the following principles into account to avoid data loss during handover:

During handover preparation, U-plane tunnels can be established between the source gNB and the target gNB;

During handover execution, user data can be forwarded from the source gNB to the target gNB;

Forwarding should take place in order as long as packets are received at the source gNB from the UPF or the source gNB buffer has not been emptied.

SUMMARY

Systems and method for inter-node exchange of link adaptation assistance information in a communications system are disclosed. In one embodiment, a method performed by a first network node comprises obtaining link adaptation assistance information associated to at least one communication device served by the first network node and transmitting a link adaptation assistance information message comprising the link adaptation assistance information to a second network node. In this manner, more efficient and better performing link adaptation algorithms in the communications system are enabled. Corresponding embodiments of a first network node are also disclosed.

In another embodiment, a method performed by a second network node for inter-network-node exchange of link adaptation assistance information in a communication network comprises receiving a link adaptation assistance information message from a first network node, where the link adaptation assistance information message comprises link adaptation assistance information associated to at least one communication device served by the first network node. In one embodiment, the method further comprises using the link adaptation assistance information. In one embodiment, using the link adaptation assistance information comprises using the link adaptation assistance information to train or update a machine learning or artificial intelligence based link adaptation scheme. In another embodiment, using the link adaptation assistance information comprises using the link adaptation assistance information to initialize one or more link adaptation parameters for the at least one communication device upon handover of the at least one communication device to a cell served by the second network node. Corresponding embodiments of a second network node are also disclosed.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
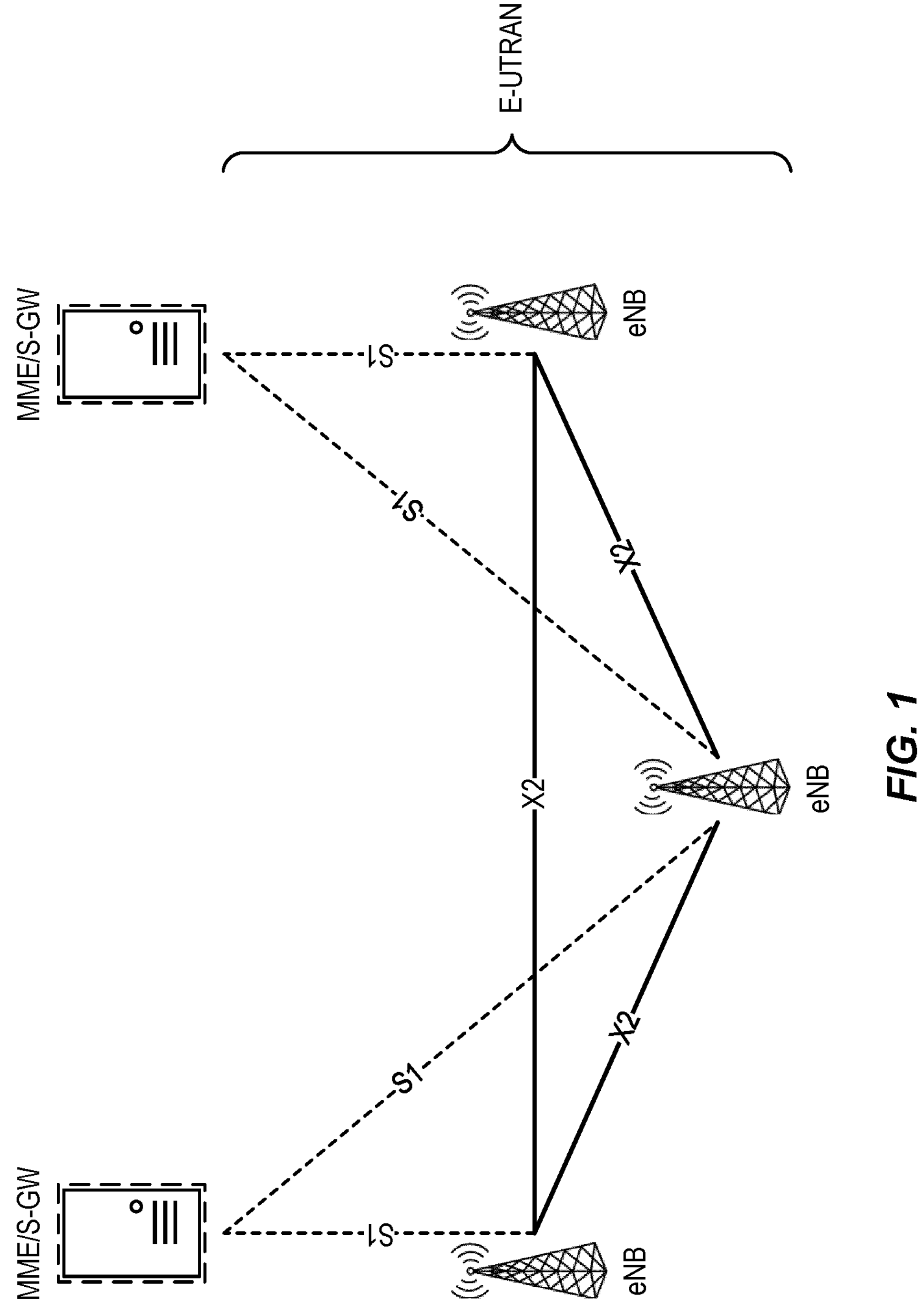
FIG. 1 illustrates the Long Term Evolution (LTE) Evolved Universal Terrestrial Radio Access Network (E-UTRAN) architecture.
Figure 2:
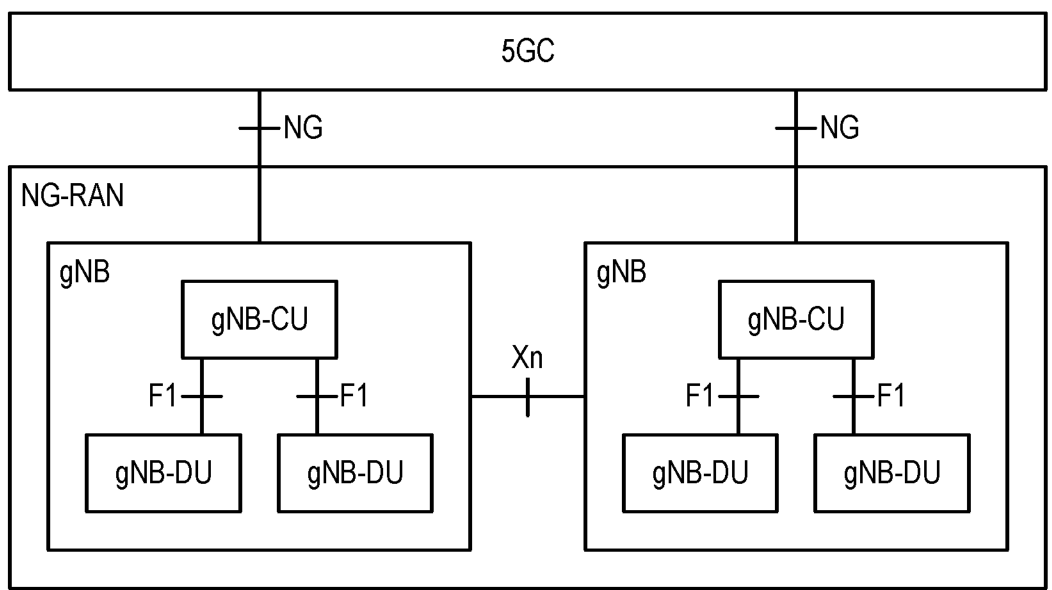
FIG. 2 illustrates the architecture of the current Fifth Generation (5G) Radio Access Network (RAN), which is also referred to as the Next Generation RAN (NG-RAN)
Figure 3:
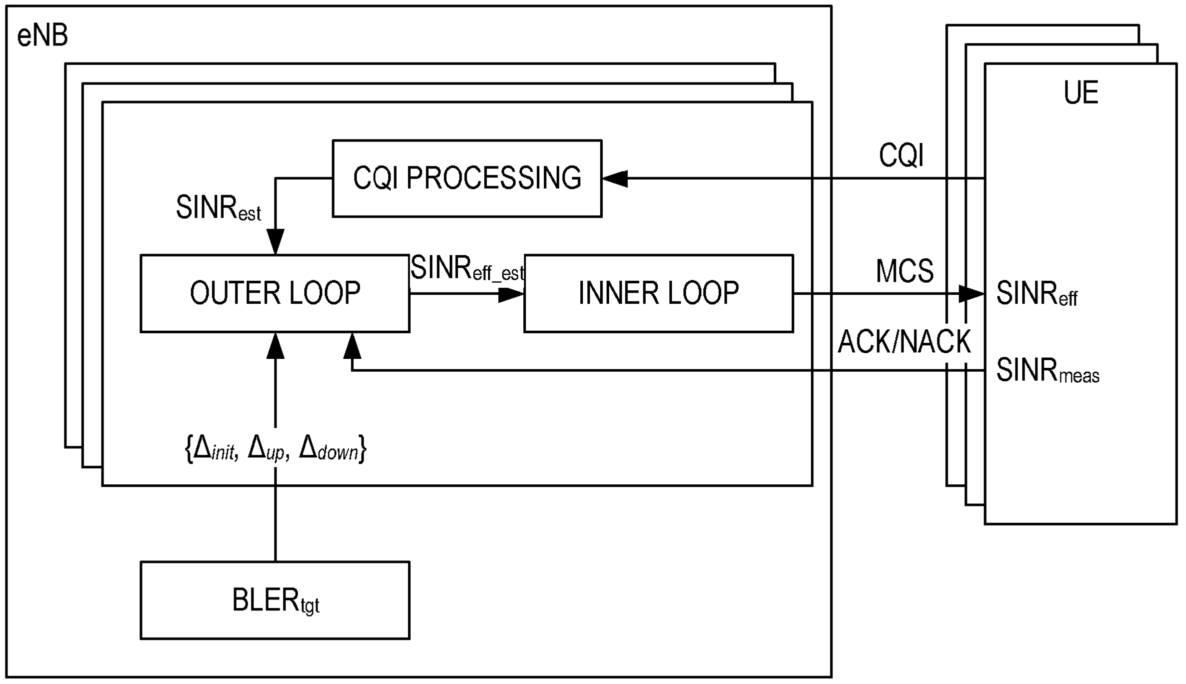
FIG. 3 shows an example of how link adaptation can be implemented in a Radio Access Network (RAN) node.
Figure 4:
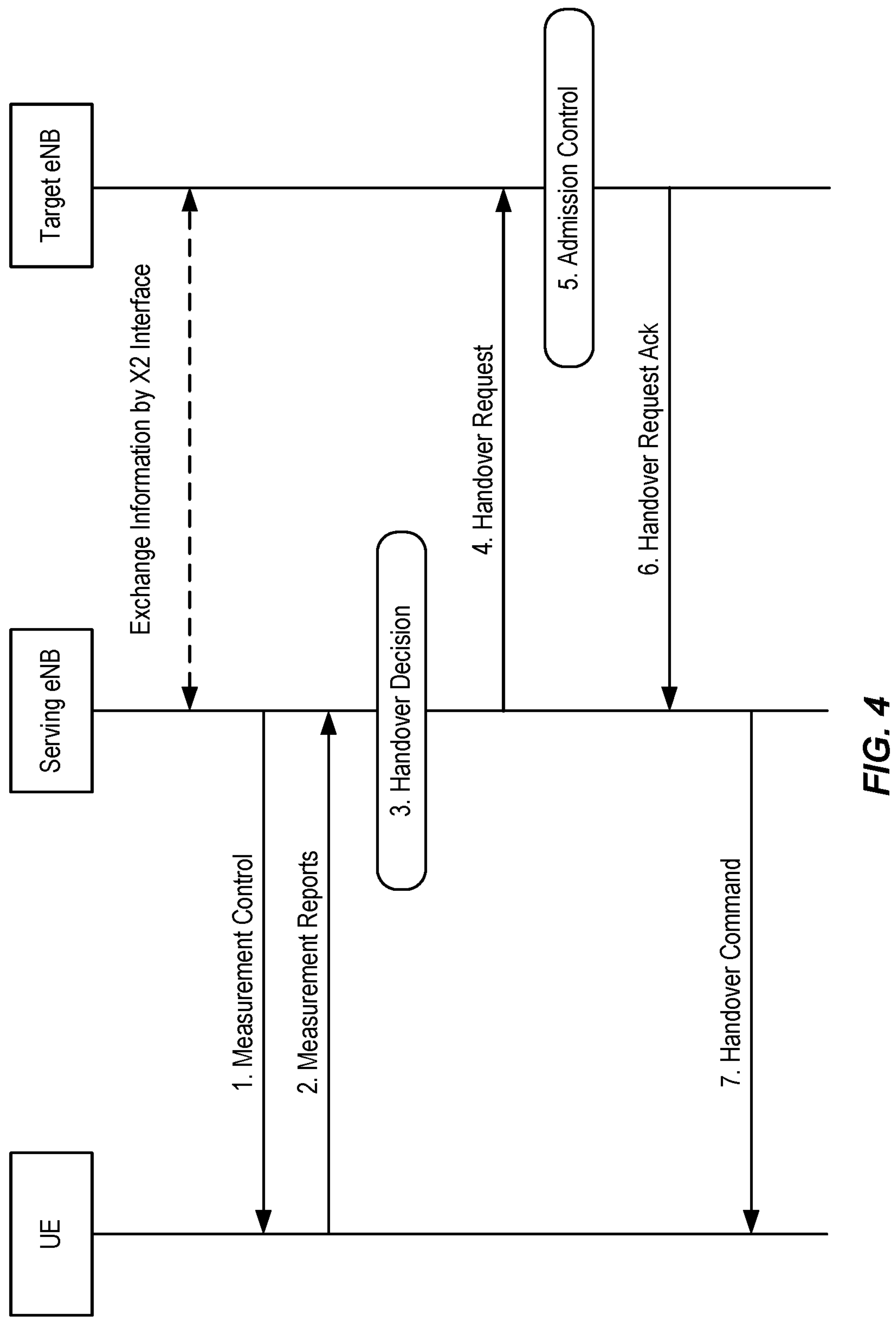
FIG. 4 illustrates the handover preparation procedure for an LTE system.
Figure 5A:
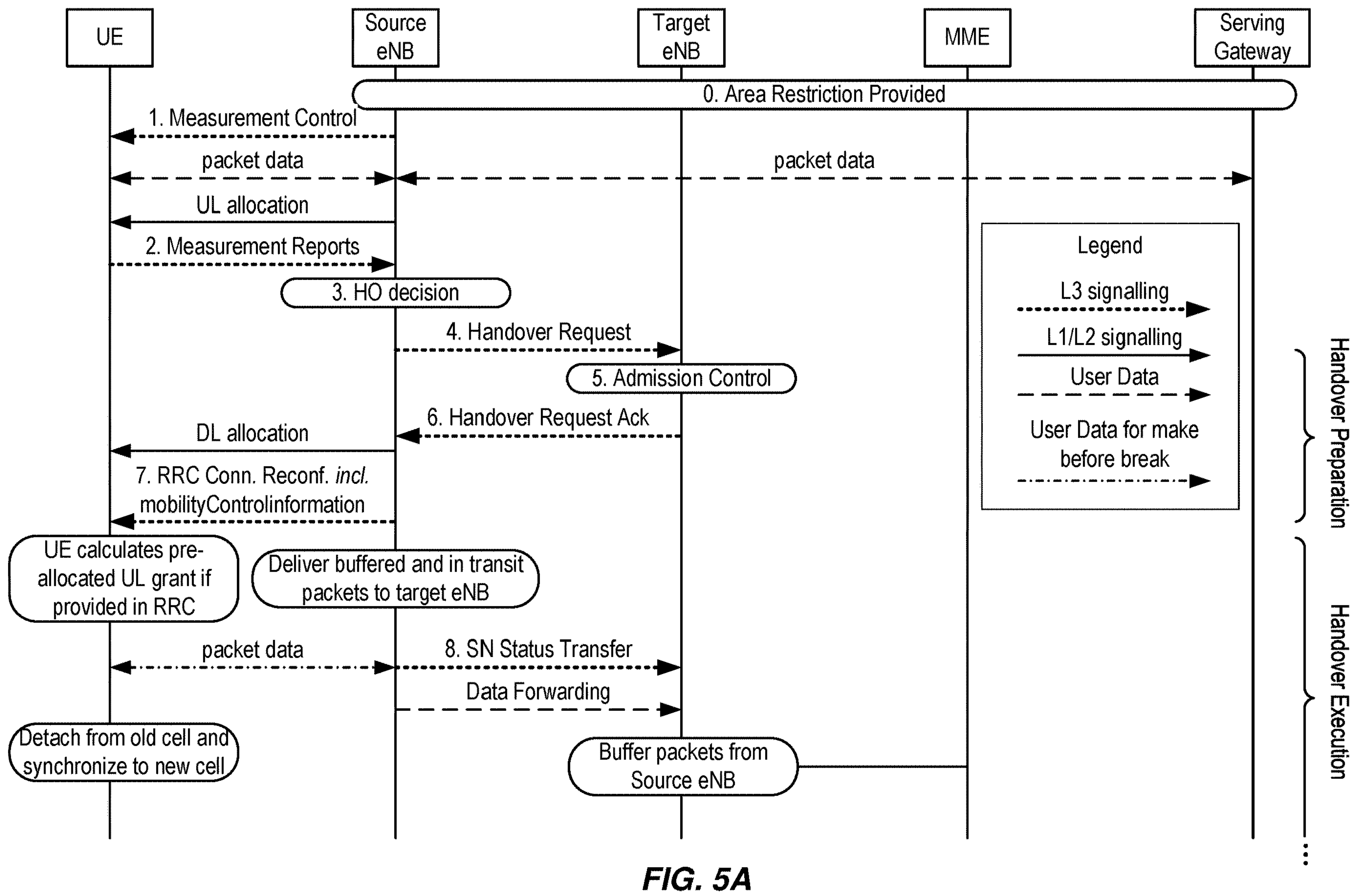
FIGS. 5A and 5B illustrate intra-MME/S-GW handover for 3GPP LTE-A.
Figure 5B:
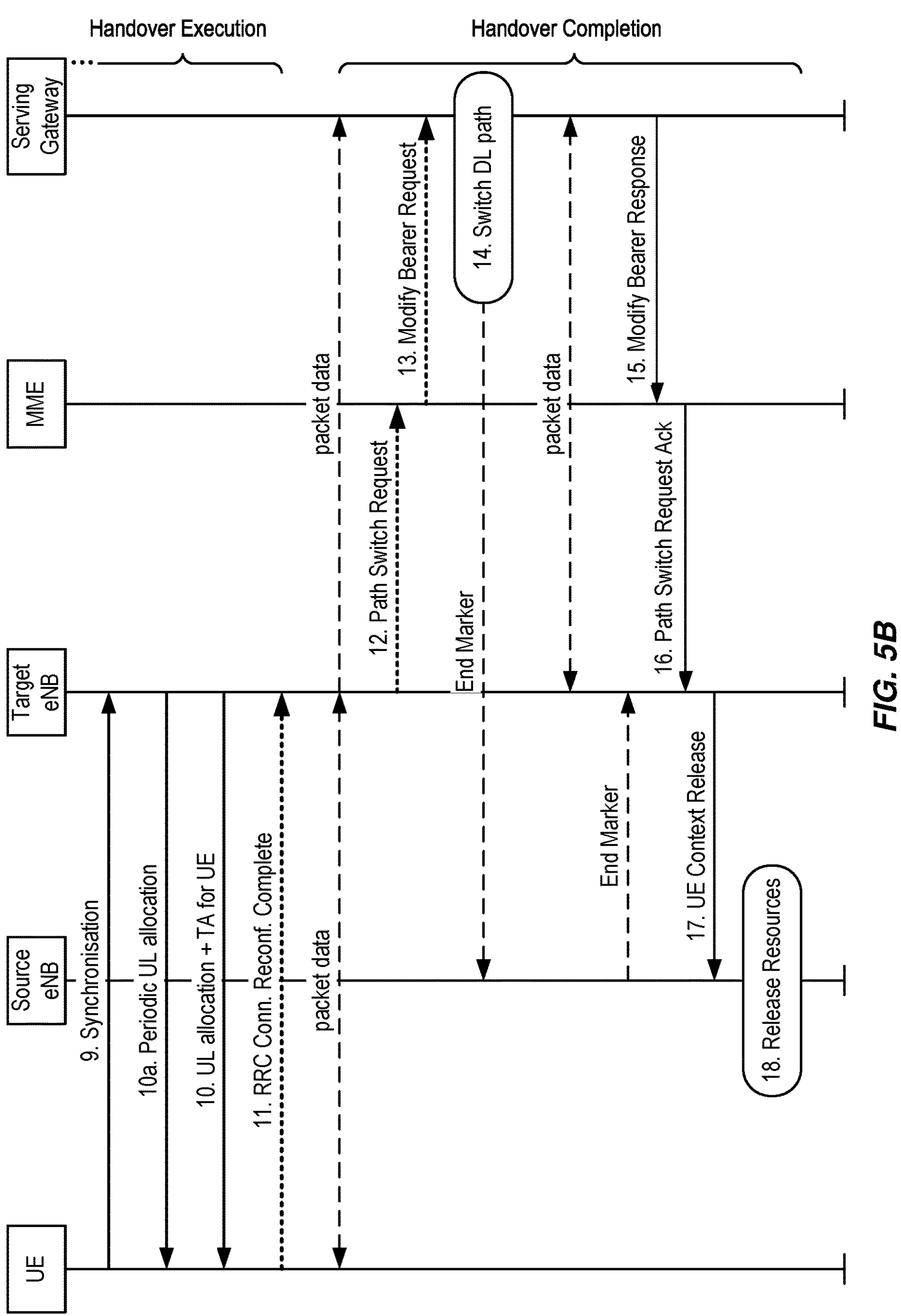
Figure 6:
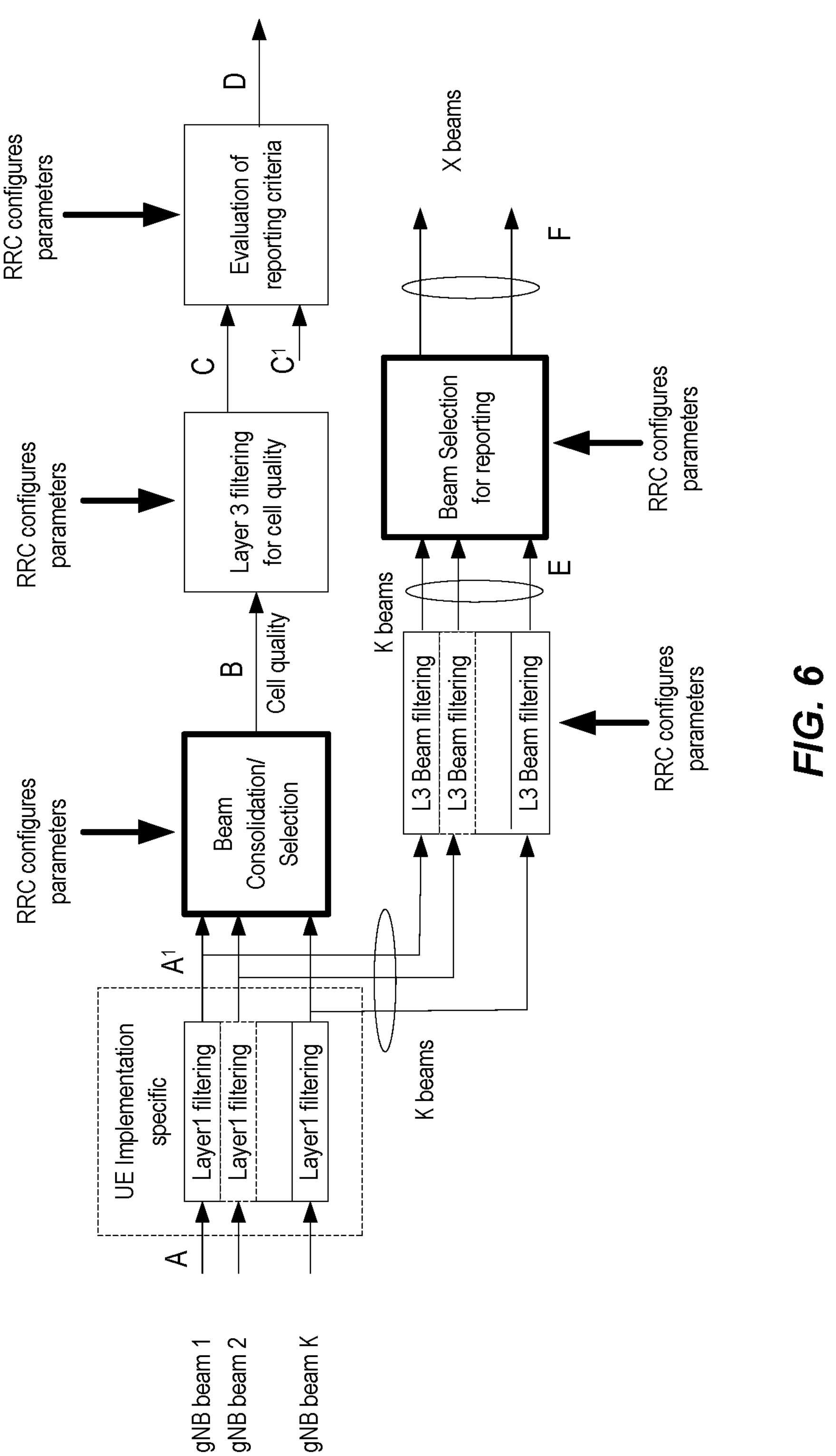
FIG. 6 illustrates a high-level model of measurements to support mobility in New Radio (NR)
Figure 7:
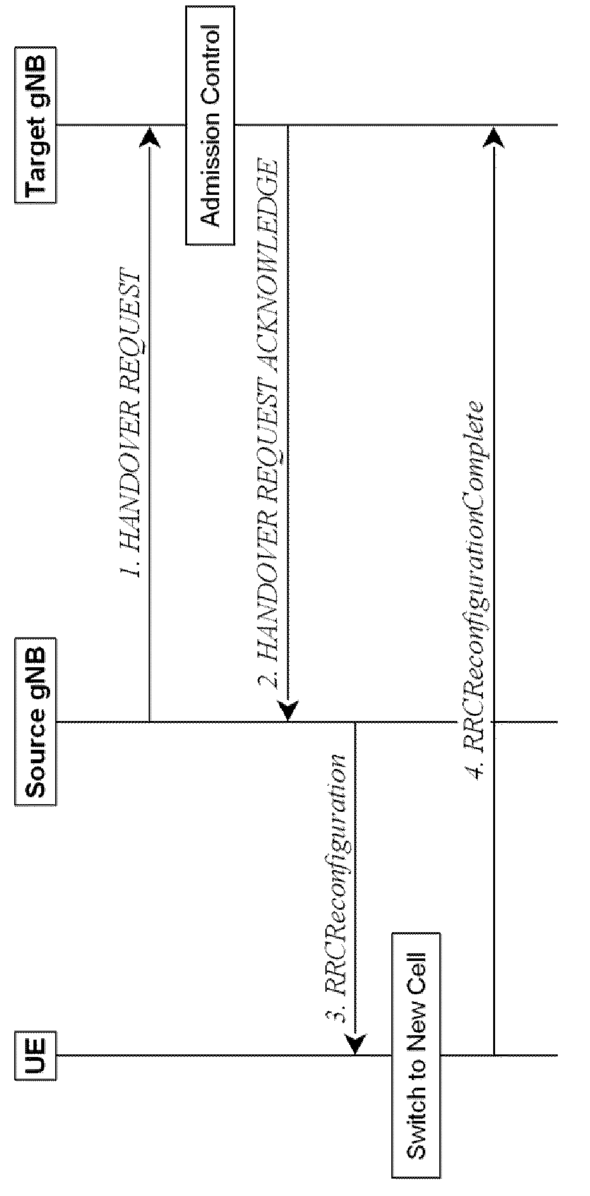
FIG. 7 is a reproduction of FIG. 9.2.3.1-1 of 3GPP TS 38.300.
Figure 8:
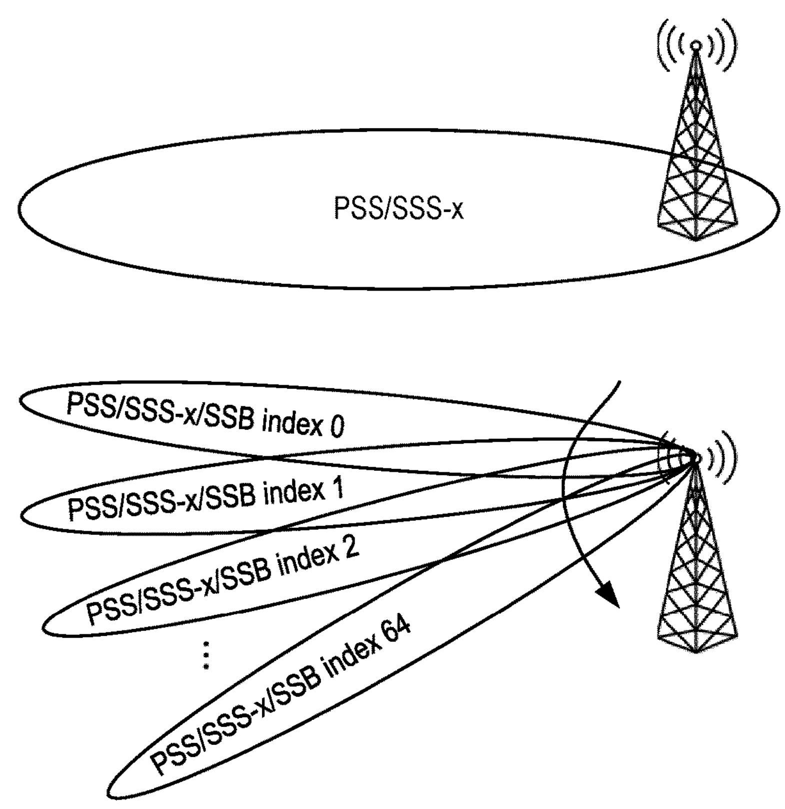
FIG. 8 illustrates reference signal beams between LTE and NG-RAN (i.e., NR) systems.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node. A RAN node or network node can refer to LTE or NR technology and may, e.g., be one of eNB, gNB, en-gNB, ng-eNB, CU-CP, CU-UP, DU, gNB-CU, gNB-DU, gNB-CU-UP, gNB-CU-CP, eNB-CU, eNB-DU, eNB-CU-UP, eNB-CU-CP, IAB-node, IAB-donor DU, IAB-donor-CU, IAB-DU, IAB-MT, O-CU, O-CU-CP, O-CU-UP, O-DU, O-RU, O-eNB.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

It should also be noted that while the description herein focuses on embodiments in a wireless communication system, the present disclosure is not limited to a wireless communication system. In other words, embodiments of the present disclosure may be implemented in a wired communication system (e.g., Asynchronous Digital Subscriber Line (ADSL)) system.

Figure 11:
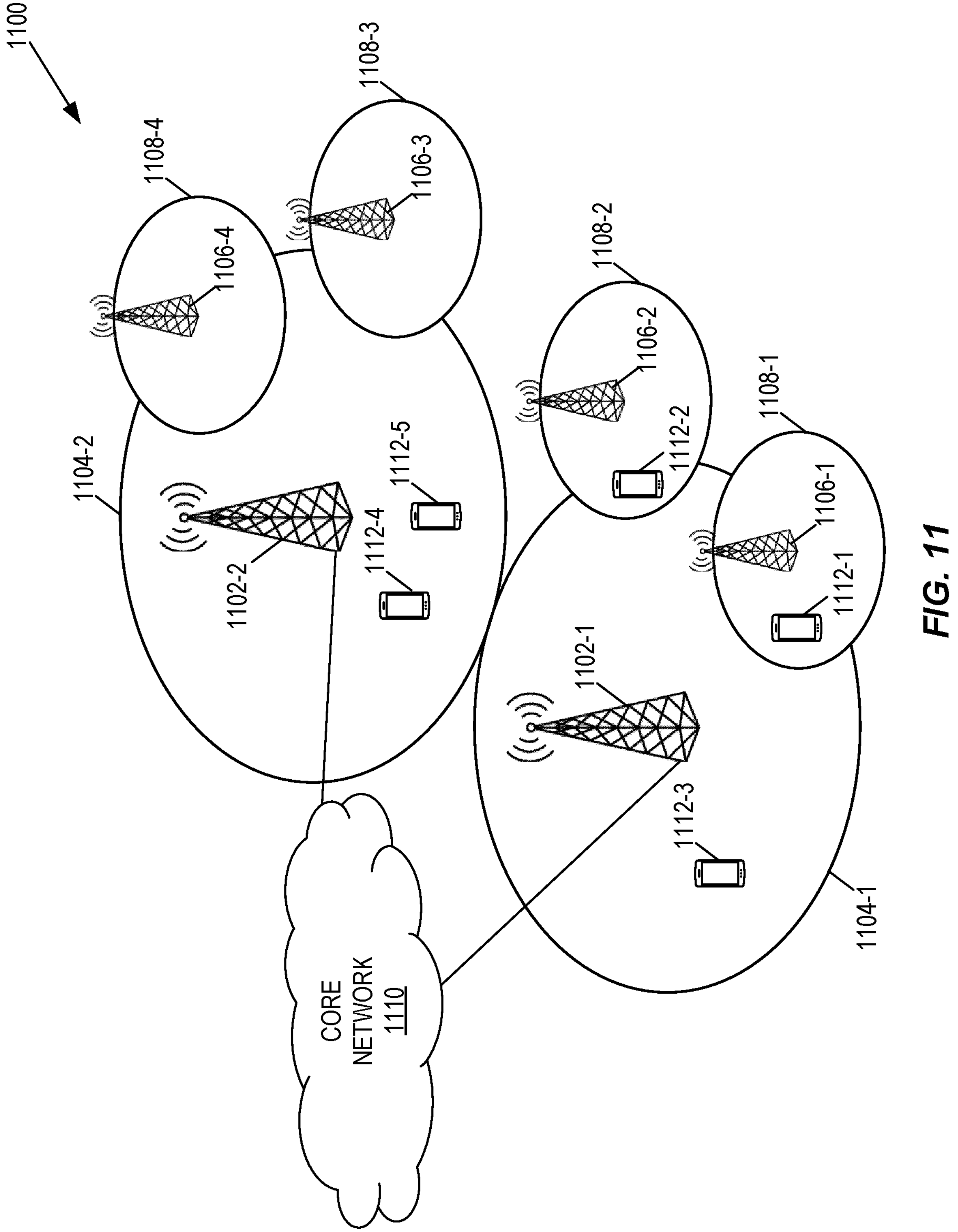
FIG. 11 illustrates one example of a cellular communications system in which embodiments of the present disclosure may be implemented.

FIG. 11 illustrates one example of a cellular communications system 1100 in which embodiments of the present disclosure may be implemented. In the embodiments described herein, the cellular communications system 1100 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC);

however, the embodiments disclosed herein may be used in any type of wireless communication system that uses link adaptation. In this example, the RAN includes base stations 1102-1 and 1102-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 1104-1 and 1104-2. The base stations 1102-1 and 1102-2 are generally referred to herein collectively as base stations 1102 and individually as base station 1102. Likewise, the (macro) cells 1104-1 and 1104-2 are generally referred to herein collectively as (macro) cells 1104 and individually as (macro) cell 1104. The RAN may also include a number of low power nodes 1106-1 through 1106-4 controlling corresponding small cells 1108-1 through 1108-4. The low power nodes 1106-1 through 1106-4 can be small base stations (such as pico or femto base stations) or RRHs, or the like. Notably, while not illustrated, one or more of the small cells 1108-1 through 1108-4 may alternatively be provided by the base stations 1102. The low power nodes 1106-1 through 1106-4 are generally referred to herein collectively as low power nodes 1106 and individually as low power node 1106. Likewise, the small cells 1108-1 through 1108-4 are generally referred to herein collectively as small cells 1108 and individually as small cell 1108. The cellular communications system 1100 also includes a core network 1110, which in the 5G System (5GS) is referred to as the 5GC and in the EPS is referred to as the EPC. The base stations 1102 (and optionally the low power nodes 1106) are connected to the core network 1110.

The base stations 1102 and the low power nodes 1106 provide service to wireless communication devices 1112-1 through 1112-5 in the corresponding cells 1104 and 1108. The wireless communication devices 1112-1 through 1112-5 are generally referred to herein collectively as wireless communication devices 1112 and individually as wireless communication device 1112. In the following description, the wireless communication devices 1112 are oftentimes UEs and as such sometimes referred to herein as UEs 1112, but the present disclosure is not limited thereto.

1 Description Related to Embodiments Related to Inter-Node Exchange of Link Adaptation Assistance Information There are several issues with the existing link adaptation algorithms deployed in communication systems such as LTE and NR systems. These issues include the following:

- Existing link adaptation algorithms are controlled by a fixed Block Error Rate (BLER) target, typically the same for all UEs (at least with the same type of traffic).
- Existing link adaptation algorithms have slow convergence, in the order of hundreds of Transmit Time Intervals (TTIs), before the link adaptation parameters can meet the desired BLER target for a specific UE.
- Existing link adaptation algorithms rely on a default (safe) configuration of link adaptation parameters when Channel State Information (CSI) feedback for the UE is not yet available (typically the lowest modulation order and lowest Modulation and Coding Scheme (MCS) index are chosen to insure robust communication at the expense of performance).
- Existing link adaptation algorithms need to be re-initialized upon mobility decisions.

Link adaptation in existing communication systems, such as the 3GPP LTE and 5G NR systems, traditionally use a fixed BLER target that is common for all UEs with the same type of traffic as a control parameter to select link adaptation parameters for a transmission (i.e., modulation order, code rate, MCS index and allocation of resources). In some implementations, the same BLER target is configured for all UEs in the coverage area of a RAN node regardless of their traffic type. Furthermore, the BLER target is typically not adapted over time, but kept fixed for all links.

This approach can simplify some implementations of a link adaptation algorithm in the radio communication system at the expense of performance due to the non-stationary and rapidly varying channel conditions, both over time and frequency domain. On one hand, configuring the same BLER target for all UEs within the coverage area of a RAN node (or worse, within larger parts of the RAN) can be problematic as different UEs typically experience different channel states and interference. On the other hand, keeping the BLER target fixed within a communication session can only allow tracking of the average channel behavior and therefore does not fully exploit the potential of a communication link.

Another issue with existing link adaptation algorithms that are based on a BLER target is slow convergence to a proper adjustment of the reported channel quality (i.e., CQI). Tens to hundreds of TTIs may be required before link adaptation converges to the desired BLER target. As such, the UE experiences sub-optimal performance for a long period of time (e.g., in terms of throughput). The convergence issue becomes particularly severe for UEs with a small amount of data to transmit/receive since, in this case, the link adaptation algorithm may never converge.

The link adaptation algorithm also relays on CSI feedback as an input feature. However, a UE may also be scheduled to transmit/receive in absence of a CSI feedback, as it may occur at the beginning of a communication session. The lack of a CSI feedback forces the link adaptation algorithm to rely on a default (safe) configuration of link adaptation parameters, wherein typically the lowest modulation order and lowest MCS index are chosen to insure robust communication. However, such robust configuration results in lower throughput for the UE despite a high consumption of radio resources (i.e., Physical Resource Blocks (PRBs)), which in turns lowers the overall system performance since such resources cannot be used by other UEs. This condition is exacerbated in case of UEs with small packets, for which the data to transmit/receive is so small that the transmission of the data may be completed before a CQI index is available.

Finally, a major issue with existing link adaptation algorithms is that they need to be re-instantiated (i.e., from the default configuration) whenever a UE is moved from a source cell to a target cell as part of a handover procedure. In this case, no prior knowledge from the source cell is used to warm-start the link adaptation algorithm.

Certain aspects of the present disclosure and their embodiments may provide solutions to the aforementioned or other challenges. Embodiments of systems and methods are disclosed herein that provide signaling and information support to enable more efficient and better performing link adaptation algorithms in a RAN. In particular, embodiments disclosed herein provide signaling procedures to exchange link adaptation assistance information associated to wireless communication devices (e.g., UEs) among network nodes, which can then be used to, e.g., develop, train, and/or execute ML or AI based link adaptation algorithms, or procedures, in the network nodes.

Non-limiting examples of machine learning and/or artificial intelligence algorithms that could be trained to determine link adaptation parameters to be configured for a communication instance (such as a transmission/reception instance) between a network node and a communication device, may include supervised learning algorithms, reinforcement learning algorithms, contextual multi-armed bandit algorithm, autoregression algorithms, etc. A ML/AI algorithm trained for optimizing link adaptation could therefore provide one or more link adaptation parameters for the communication with the communication device, such as one or more parameters (but not limited to) in the group of: modulation and coding scheme (MCS) index, code rate, modulation order, transport block size, an indication of a rate value for communication, transmission rank, a precoding matrix index (PMI), a set of time-frequency resources to be used for communication with the user device, etc.

A ML/AI-based algorithm for link adaptation could be trained, for instance, with data samples comprising link adaptation assistance information characterizing prior transmission/receptions instances between any network node and any communication device, which may include prior configurations of link adaptation parameters for the user device, as well as an associated performance/reward indicator (i.e., the throughput achieved by the communication device with the prior configuration of the link adaptation parameters). Additionally, the data samples used for training such algorithm may comprise information associated to the radio/communication environment experienced by the communication device and/or the network node in association with prior communication instances and/or in association to prior link adaptation parameters used for communication between the network node and the communication device.

Embodiments of a method executed by a first network node (e.g., a source network node for a mobility or handover procedure) in a communication network for inter-node exchange of link adaptation assistance information are disclosed. In one embodiment, the method executed by the first network node comprises:

- obtaining link adaptation assistance information associated to at least a served wireless communication device (e.g., at least one UE), and
- transmitting a link adaptation assistance information message comprising the obtained link adaptation assistance information to a second network node (e.g., a target network node for a mobility or handover procedure).

In one embodiment, the link adaptation assistance information comprises one or more of the following information elements:

- at least one estimated or recommended link adaptation parameter (e.g., for the at least one wireless communication device), such as, e.g., MCS index, code rate, and/or modulation order;
- at least one link adaptation state information (e.g., for the at least one wireless communication device)
  - In one embodiment, the at least one link adaptation state information is associated to a wireless communication device or a group wireless communication devices with respect to either the source network node or the target network node.

In one embodiment, the link adaptation assistance information is associated to:

- a specific wireless communication device camping in a serving cell of the first network node,
- a communication link between a wireless communication device in a serving cell of the first network node and the first network node,
- a communication link between a wireless communication device in a serving cell of the first network node and a second network node (e.g., the target node of a handover event), or
- a group of wireless communication devices camping in a cell of the first network node (e.g., a source network node) to be used, e.g., after handover, by the second network node (e.g., a target network node).

In one embodiment, the method performed by the first network node may include one or more of the following additional signaling aspects:

- The link adaptation assistance information message may be transmitted as part of a handover request for at least one wireless communication device camping in a radio cell of the first network node.
- The first network node may receive, from the second network node, a request for link adaptation assistance information.
  - The request may be associated to one or more handover procedures.
  - The request may indicate the type of link adaptation assistance information to be reported to the second network node.
  - The request may indicate how to report link adaptation assistance information to the second network node.
- The first network node may transmit a link adaptation assistance information acknowledgement message to the second network node (e.g., to acknowledge a link adaptation assistance information request) to indicate successful configuration on link adaptation assistance information reporting.

Embodiments for how the first network node acquires link adaptation assistance information for a served wireless communication device(s) are also disclosed.

Additional details characterizing these two messages are described below.

Embodiments are also disclosed for a method executed by a second network node (e.g., a target network node for a mobility or handover procedure) in a communication network for inter-node exchange of link adaptation assistance information. In one embodiment, the method performed by the second network node comprises:

- receiving a link adaptation assistance information message from a first network node (e.g., a source network node), and
- using the link adaptation assistance information message to handle one or more wireless communication devices handed over by the first network node.

Certain embodiments may provide one or more of the following technical advantage(s). Embodiments of the solution(s) disclosed herein aim at solving the mentioned issues with existing link adaptation algorithms by exchanging link adaptation assistance information among network nodes.

By enabling an exchange of link adaptation assistance information associated to wireless communication devices (e.g., UEs) among network nodes, embodiments of the solution(s) disclosed herein may be used to support the development, training, and execution of Machine Learning (ML) or Artificial Intelligence (AI) based link adaptation algorithms in network nodes. In one example, link adaptation assistance information could be used by the target network node to learn a more general link adaptation algorithm, e.g., by means of machine learning, by using data collected by other network nodes. This has the advantage to enable the target network node to learn and optimize configuration of link adaptation parameters (e.g., modulation order, code rate, and/or MCS index) for any of the wireless communication devices served by its radio cells. When combined with an algorithm that directly optimizes throughput by choosing modulation order, code rate, and MCS index, without aiming to guarantee a specific BLER target, embodiments of the solution(s) disclosed herein may allow a better and faster configuration of the link adaptation parameters compared to the existing link adaptation algorithms, thereby resulting in better performance in terms of throughput and latency.

Embodiments of the proposed solution(s) may allow optimization of the transmission format for transmissions occurring over a communication link between a wireless communication device and a network node based on ML or AI. One advantage of embodiments of the solution(s) disclosed herein is to enable the target network node of a handover event to acquire link adaptation assistance information associated to one or more wireless communication devices that are handed over by the source network node. The target network node can then exploit this information to train or improve the link adaptation algorithm such that it is capable to directly configure optimal link adaptation parameters for communicating with the wireless communication devices based on fast inference of a ML/AI algorithm. Thereby, an advantage of embodiments of the solution(s) disclosed herein is to avoid the long transient of state-of-the-art link adaptation algorithms based on outer loop link adaptation (OLLA) and a BLER target, thereby yielding improved spectral efficiency and throughput for the individual wireless communication devices and the system as a whole.

In one example, link adaptation assistance information could be used by the target network node to learn a more general link adaptation algorithm, e.g., by means of machine learning, by using data collected by other network nodes. In another example, link adaptation assistance information can be exchanged as part of a handover procedure and used by the target network node to warm-start the link adaptation for the newly acquired wireless communication device. As such, the target network node can configure optimal link adaptation parameters for communicating with the wireless communication devices handed over by avoiding long transient of existing link adaptation algorithms and by avoiding reliance on default conservative configurations of link adaptation parameters. Thereby, also in this case, the resulting spectral efficiency and throughput for the individual wireless communication devices and the system as a whole can be improved over the state-of-the-art solutions.

Figure 12:
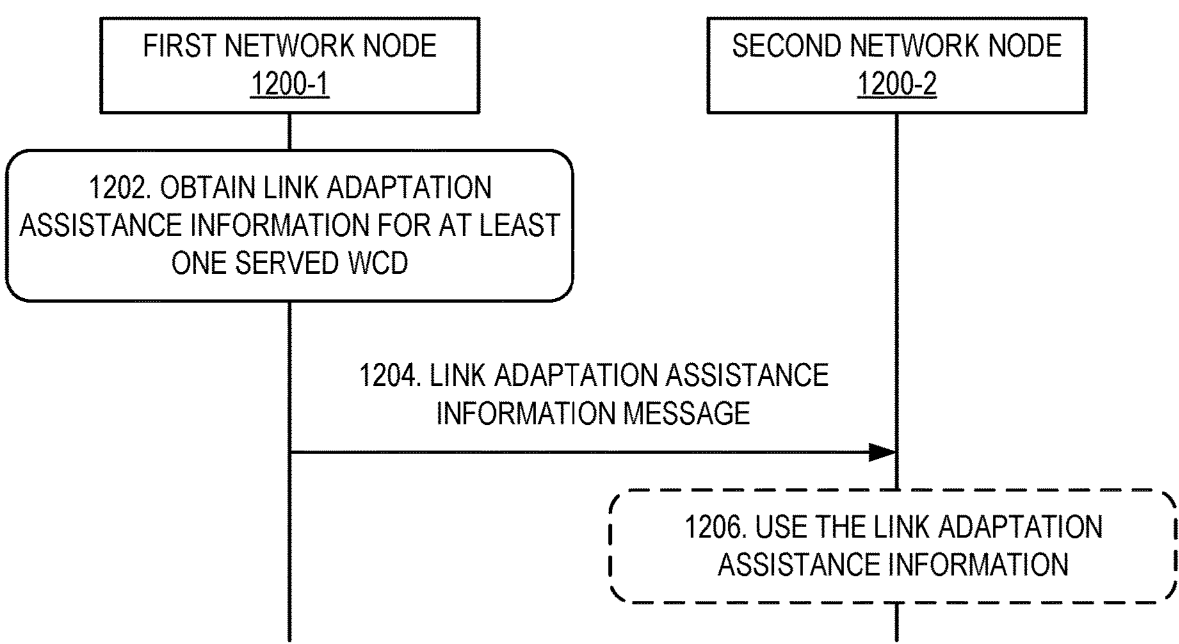
FIG. 12 illustrates the operation of a first network node and a second network node for inter-node exchange of link adaptation assistance information in accordance with an embodiment of the present disclosure.

FIG. 12 illustrates the operation of a first network node 1200-1 (e.g., a source network node for a mobility or handover procedure) and a second network node 1200-2 (e.g., a target network node for a mobility or handover procedure) for inter-node exchange of link adaptation assistance information in a communication network in accordance with one embodiment of the present disclosure. Optional steps are represented by dashed lines/boxes. The first network node 1200-1 may be, for example, a first RAN node (e.g., a first base station 1102-1, first gNB, or first eNB), and the second network node 1200-2 may be, for example, a second RAN node (e.g., a second base station 1102-2, second gNB, or second eNB). As illustrated, the first network node 1200-1 determines, or otherwise obtains, link adaptation assistance information associated to at least one served wireless communication device (e.g., at least one wireless communication device 1112) (step 1202). In one embodiment, the first network node 1200-1 obtains the link adaptation assistance information via reception of report(s) from the at least one served wireless communication device, where the report(s) comprise at least some of the link adaptation assistance information. The first network node 1200-1 transmits a link adaptation assistance information message including the link adaptation assistance information to the second network node 1200-2 (step 1204). The second network node 1200-2 may then use the link adaptation assistance information from the received message (step 1206). For example, the second network node 1200-2 may use the link adaptation assistance information to learn (e.g., train) a link adaptation model and/or to provide a warm-start for link adaptation for associated wireless communication device(s) in a cell controlled by the second network node 1200-2.

In one embodiment, the link adaptation assistance information message is transmitted by the first network node 1200-1 to the second network node 1200-2 as part of a handover event preparation. In this case, the first network node 1200-1 is the source network node of the handover event, while the second network node 1200-2 is the target network node of the handover event.

In one embodiment, the link adaptation assistance information could be associated a specific wireless communication device camping in a serving cell of the first network node 1200-1. When link adaptation assistance information is transmitted to the second network node 1200-2 as part of a handover event preparation for the wireless communication device, the link adaptation assistance information could be additionally associated to, for instance, a communication link between the wireless communication device in a serving cell of the first network node 1200-1 and the first network node 1200-1, a communication link between the wireless communication device in a serving cell of the first network node 1200-1 and another network node such as, for example, the second network node 1200-2 (e.g., the target network node of a handover event), or both of the above.

Therefore, the link adaptation assistance information provided in the link adaptation assistance information message (and other such messages) could carry information that assists the second network node 1200-2 to quickly establish an optimal configuration of the link adaptation algorithm for wireless communication devices handed over by the first network node 1200-1. For example, when the link adaptation assistance information is associated to a communication link between the wireless communication device in a serving cell of the first network node 1200-1 and the first network node 1200-1, this information provides a best guess for the second network node 1200-2 to configure the link adaptation parameters for the wireless communication device. When the wireless communication device is handed over, it is in fact reasonable to assume that even link adaptation assistance information used by the first network node 1200-1 can provide a good configuration for the initial communication between the wireless communication device and the second network node 1200-2.

In an alternative embodiment, the link adaptation assistance information contained in the link adaptation assistance information message could be used to pro-actively trigger a handover event. The second network node 1200-2 may determine, based on the reported link adaptation assistance information associated to a wireless communication device, that better radio channel conditions can be offered by one of its controlled cells, and therefore trigger a handover event.

In one embodiment, the link adaptation assistance information included in the message may specify one or more radio signals, transmitted by the first or the second network node 1200-1 or 1200-2, that have been used (e.g., by the wireless communication device(s)) to determine the link adaptation assistance information. In one example, the link adaptation assistance information included in the message may indicate one or more of the following signals:

- one or more common reference signals of the first network node 1200-1,
- one or more common reference signals of the second network node 1200-2,
- one or more Synchronization Signal/PBCH Blocks (SSBs) of the first network node 1200-1,
- one or more SSB beams of the first network node 1200-1, for instance identified by one or more SSB beam indices,
- one or more SSBs of the second network node 1200-2,
- one or more SSB beams of the second network node 1200-2, for instance identified by one or more SSB beam indices,
- one or more Channel State Information Reference Signals (CSI-RSs) of the first network node 1200-1,
- one or more CSI-RSs of the second network node 1200-2.

Therefore, the link adaptation assistance information characterizes the link conditions that the wireless communication device(s) could experience with the first network node 1200-1 or with the second network node 1200-2.

The procedure of FIG. 12 naturally extends to the case wherein the link adaptation assistance information is associated to a group of wireless communication devices of the first network node 1200-1. In this case, the link adaptation assistance information may characterize the radio conditions for a group of wireless communication devices with respect to a cell or a fraction of a cell of the first or the second network node 1200-1 or 1200-2. In one example, the first network node 1200-1 may report link adaptation assistance information associated to a group of wireless communication devices camping in the coverage area of a SSB beam of a serving cell of the first network node 1200-1. Therefore, the link adaptation assistance information message may comprise a list of one or more link adaptation assistance information, with each list being associated to a group of wireless communication devices under the coverage of one or more SSB beams. This information could then be valuable for load balancing purposes.

In one embodiment, the link adaptation assistance information message transmitted from the first network node 1200-1 to the second network node 1200-2 may comprise one or more of the following information elements:

- link adaptation parameters for the user-plane (in uplink or downlink) of the wireless communication device(s),
- link adaptation state information.

In one embodiment, the link adaptation assistance information comprises one or more (e.g., estimated or recommended) link adaptation parameters associated to the wireless communication device(s), such as for uplink user-plane transmission and/or downlink user-place transmission. In one embodiment, the link adaptation parameters are additionally associated to a specific radio bearer(s) of the wireless communication device(s).

In one embodiment, the link adaptation parameters associated to the wireless communication user device(s) may comprise one or more of the following:

- a list of link adaptation parameters used by the first network node 1200-1 in one or more communication instances (e.g., in uplink and/or in downlink) with the wireless communication device(s).
- a list of link adaptation parameters estimated or recommended to by the first network node 1200-1 to be used by the second network node 1200-2 for communicating (e.g., in uplink or in downlink data plane) with the wireless communication device(s).

Therefore, in one example, the link adaptation parameters reported to the second network node 1200-2 comprise a list of link adaptation parameters determined by the first network node 1200-1 for one or more communication instances (e.g., transmission in downlink or reception in uplink) with the wireless communication device(s). As such, the reported parameters represent the link adaptation configuration used between the first network node 1200-1 and the wireless communication device(s). In another example, the link adaptation parameters reported to the second network node 1200-2 comprise a list of link adaptation parameters estimated or recommended to be used by the second network node 1200-2 to communicate with the wireless communication device(s) (e.g., in uplink or in downlink). The estimated/recommended link adaptation parameters could be used by the second network node 1200-2, for instance, when initializing a user-plane communication with the wireless communication device(s), when a channel state information (CSI) report may not yet be available for the wireless communication device(s). The estimated/recommended link adaptation parameters for the second network node 1200-2 could be determined by the first network node 1200-1 or by the wireless communication device(s) (in which case the wireless communication device(s) would first report the estimated link adaptation parameters for the second network node 1200-2 to the first network node 1200-1).

Hereafter, we shall adopt the terminology "link adaptation parameters" to broadly refer to either or both the aforementioned types of link adaptation parameters associated to the wireless communication device(s), unless specified otherwise.

In accordance with previous embodiment, the link adaptation parameters may be associated to at least a wireless communication device or a group of wireless communication devices. Additionally, the link adaptation parameters could be associated to:

- at least a communication link between a wireless communication device and the first network node 1200-1, and/or
- at least a communication link between a wireless communication device and the second network node 1200-2.

The link adaptation parameters could be associated to an uplink and/or to a downlink communication between a wireless communication device and a network node.

In particular, the link adaptation parameters associated to a communication link between the wireless communication device and a network node (i.e., the first network node 1200-1 or the second network node 1200-2) may comprise one or more of the following information elements:

- Modulation order
- Code rate
- Modulation and coding scheme (MCS) index
- Transport block size (TBS)
- Information carrying capacity (such as spectral efficiency)
- An indication of the transmission type (e.g., uplink and/or downlink)
- An indication of the transmission number associated to the link adaptation parameters
- an indication of one or more Hybrid Automatic Repeat Request (HARQ) feedback parameters associated to one or more link adaptation parameters The link adaptation assistance information may further comprise, for each or some of the link adaptation parameters, one or more of the following additional information elements:

- an associated probability of success
- an associated uncertainty in the estimated probability of success
- an associated confidence interval for the estimated probability of success In one embodiment, the link adaptation assistance information comprises at least a set of link adaptation parameters associated to a transmission rank value. In one example, different sets link adaptation parameters are associated to different transmission rank values. Examples of link adaptation parameters that can be reported in association with a specific transmission rank may comprise one or more of the following parameters:

- Modulation order
- Modulation and coding scheme (MCS) index
- Code rate
- Transport block size (TBS)
- Information carrying capacity (such as spectral efficiency)

In case the link adaptation assistance information comprises a set of estimated/recommended link adaptation parameters to use for communicating with the wireless communication device, for each link adaptation parameter, the link adaptation assistance information message may comprise a set of estimated/recommended values. In one implementation, this is realized by listing all the estimated/recommended values. In an alternative implementation, this is realized by indicating a range of estimated/recommended values. In one exemplifying case, the set of estimated/recommended values may be represented by a starting value and an ending value. In another example, the set of estimated/recommended values may be represented by a starting value the length of the range of values.

In one embodiment, the link adaptation assistance information may comprise a set of link adaptation parameters (e.g., MCS index value, modulation order, code rate, etc.) reported according to one or more reporting granularity in frequency domain and/or time domain and/or spatial domain, such as:

- Per Wideband
- Per sub-band
- Per physical resource block (PRB)
- Per resource block group (RBG), wherein an RBG may comprise a group of PRBs
- Per resource element (RE)
- Per bandwidth part
- Per bandwidth segment
- Per SSB beam coverage area
- Per CSI-RS beam coverage area
- Per transmission time interval (TTI)| (i.e., one shot)
- Per transmission time window (i.e., the reported information is associated to a certain time interval)
- Per packet transmission
- Per group of packets (e.g., starting packet and number of packets)
- A combination of at least one frequency or spatial or time granularity In one embodiment, the link adaptation assistance information comprises one or more link adaptation state information. In accordance with previous embodiment, the link adaptation state information may be associated to at least a wireless communication device or a group of wireless communication devices. Additionally, the estimates or recommended of link adaptation parameters could be associated to

- at least a communication link between a wireless communication device and the first network node 1200-1, and/or
- at least a communication link between a wireless communication device and the second network node 1200-2.

The link adaptation state information could be associated to an uplink and/or to a downlink communication between a wireless communication device and a network node.

In one embodiment, the link adaptation state information determined by the first network node 1200-1. In alternative, the link adaptation state information is determined partly or entirely by the wireless communication device itself and received by the first network node 1200-1.

In one embodiment, the link adaptation state information characterizes the state of at least a communication link between the wireless communication device and a network node (i.e., the first network node 1200-1 and/or the second network node 1200-2), and may comprise one or more of the following information elements:

- A Channel State Information Measurement (CSI-M) report comprising measurements of channel state for the communication link between the user device and the network node, such as measurements of Channel Quality Indicator (CQI), rank, and precoding matrix indicator (PMI), Signal-to-Noise ratio (SNR), and Signal-to-interference-plus-Noise ratio (SINR). In addition, the Channel State Information Measurement (CSI-M) may comprise at least an indication of one or more uncertainty measure for one or more information elements of the Channel State Information Measurement (CSI-M) report. Examples of uncertainty measurements include, for instance, first and second statistical moments, such as average, variance, and standard deviation.
- A Channel State Information Prediction (CSI-P) report comprising prediction of channel state for the communication link between the user device and the network node, such as predictions of Channel Quality Indicator (CQI), rank, and precoding matrix indicator (PMI), Signal-to-Noise ratio (SNR), and Signal-to-interference-plus-Noise ratio (SINR). Additionally, the Channel State Information Prediction (CSI-P) report may comprise at least an indication of one or more uncertainty measure for one or more information elements of the Channel State Information Prediction (CSI-P) report. Examples of uncertainty measurements include, for instance, first and second statistical moments, such as average, variance, and standard deviation.
- An indication of the wireless communication device mobility state, which may comprise one or more information in the group of as velocity, acceleration, location. The wireless communication device mobility state may further indicate the type of mobility, such as the wireless communication device is a static wireless communication device (e.g., if its velocity is below a certain threshold) low speed wireless communication device (e.g., if its velocity exceeds or is below a second threshold), a medium speed wireless communication device (e.g., if its velocity exceeds or is below a third threshold), a high velocity wireless communication device (e.g., if its velocity exceeds or is below a second threshold), etc. In one example, the type of mobility of the wireless communication device could be indicated by an increasing range of integer number, for instance, with zero indicating a static user and 1, 2, 3 etc. indicating wireless communication devices with increasing velocity.

An indication of the channel fading state experienced by the wireless communication device. For instance, the wireless communication device may report the type of fading experience, such as slow fading, shadow fading or fast fading, the magnitude of the fading event experienced, the length/duration of the fading event, the frequency of the fading event, etc.

An indicator of the interference state experienced by the wireless communication device, which may comprise measurements and or predictions of different types of interference metrics, such as the maximum/peak, minimum, average interference measured over a set of time-frequency resource, as well as second statistical moments of interference measured of predicted, such as standard deviation or variance.

One or more measurements of the downlink data transmission state in at least a previous transmission time interval (TTI) or group of TTIs. The transmission state may include, for instance, an indication of the fraction of successfully or unsuccessfully decoded date in a transmission, and/or one or more cumulative downlink performance indicators associated to the transmission of a group data packets, such as first and second statistical moments of successfully or unsuccessfully decoded date in group of transmissions (e.g., in a group of TTIs). In one example, the state of the downlink data transmission may indicate one or more cumulative downlink performance indicators associated to the transmission of a group data packets including, for instance one or more statistical information of the downlink transmission state in the group of:

- First statistical momentum (e.g., mean, average) of the amount or the fraction of data correctly or incorrectly received or decoded for a group of data packets.
- Second statistical momentum (e.g., standard deviation, variance) of the amount or the fraction of data correctly or incorrectly received or decoded for a group of data packets.
- Maximum and/or minimum amount or fraction of data correctly or incorrectly received or decoded for a group of data packets.

Some embodiments may provide that the one or more link adaptation state information elements may comprise one or more wireless communication device manufacturing information. The wireless communication device manufacturing information may comprise, one or more in the group of: the wireless communication device model, the wireless communication device manufacturer, the wireless communication device receiver type, the wireless communication device receiver hardware, the wireless communication device chipset model, the wireless communication device chipset manufacturer, the wireless communication device processor type, the wireless communication device processor model, the wireless communication device operating system, and the wireless communication device antenna model. Providing such information allow to distinguish between measurements or predictions of link adaptation state information are by different wireless communication devices in terms of hardware and software, which may affect the accuracy and uncertainly of the measurements or predations.

Some embodiments may additionally provide that the one or more link adaptation state information elements may comprise one or more wireless communication device configuration information used for determining any of the link adaptation state information element. In one example, the wireless communication device configuration information can be associated to algorithms used for determining any of the link adaptation state information element, such as the type of algorithms, one or more hyperparameter used to configure the algorithm (including type and value of the hyperparameters). In addition, the wireless communication device configuration information used for determining any of the link adaptation state information element may include the type of filtering operation, and the corresponding configuration values, used to determine measurements and/or estimates of link adaptation state information. This may include, for instance type of filtering and associated configuration for the computation of CSI information (such as filtered CQI), SINR, RSRP, interference measurements, etc.

In addition, each one or more information elements of the link adaptation state information may be reported according to one or more reporting granularity in frequency domain and/or time domain and/or spatial domain such as:

- Per wideband
- Per sub-band
- Per physical resource block (PRB)
- Per resource block group (RBG), wherein an RBG may comprise a group of PRBs
- Per bandwidth part
- Per bandwidth segment
- Per SSB beam coverage area
- Per CSI-RS beam coverage area
- Per transmission time interval (TTI)| (i.e., one shot)
- Per transmission time window (i.e., the reported information is associated to a certain time interval)
- Per packet transmission
- Per group of packets (e.g., starting packet and number of packets)
- A combination of at least one frequency or spatial or time granularity In some embodiments, the procedure of FIG. 12 may further include additional signaling aspects. For example, in one embodiment, the link adaptation assistance information message is sent from the first network node 1200-1 to the second network node 1200-2 as part of a handover preparation procedure. Thus, in one embodiment, the first network node transmits the link adaptation assistance information message to a second network node as part of a handover preparation procedure.

Figure 13:
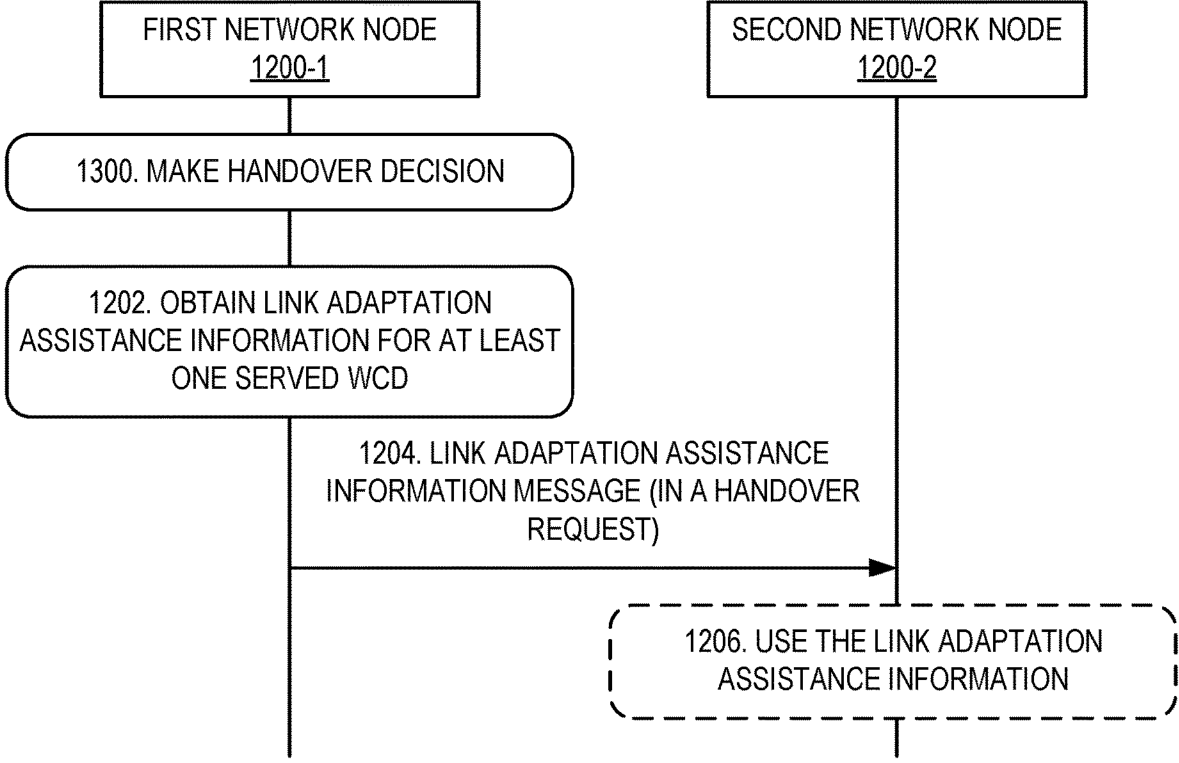
FIG. 13 illustrates the operation of a first network node and a second network node for inter-node exchange of link adaptation assistance information in association with a handover procedure in accordance with an embodiment of the present disclosure.

In one example, as illustrated in FIG. 13, the first network node 1200-1, upon making a decision to handover a wireless communication device to a radio cell of the second network node 1200-2 (step 1300), may transmit the link adaptation assistance information message (of step 1204) in a HANDOVER REQUEST message to the second network node 1200-2. Thus, the handover request message comprises, in addition to the handover request, the link adaptation assistance information message associated to the wireless communication device. Then, in step 1206, the link adaptation assistance information may be used by the second network node 1200-2 to optimize the configuration of the link adaptation parameters for the wireless communication device once a connection is established between the wireless communication device and the second network node 1200-2.

Figures 14, 15:
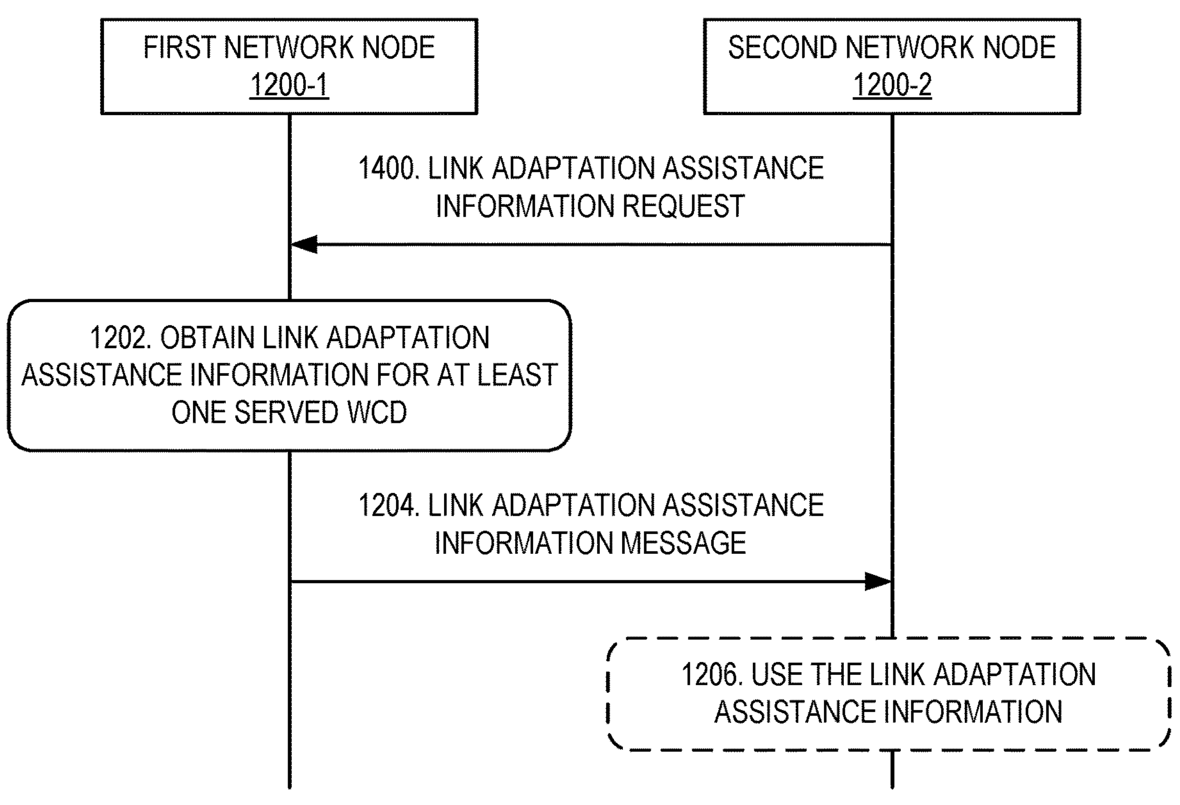
FIG. 14 illustrates the operation of a first network node and a second network node for inter-node exchange of link adaptation assistance information in accordance with another embodiment of the present disclosure.
FIG. 15 illustrates the operation of a first network node and a second network node for inter-node exchange of link adaptation assistance information in association with a handover procedure in accordance with another embodiment of the present disclosure.

FIG. 14 illustrates the operation of the first network node 1200-1 and the second network node 1200-2 in accordance with another embodiment in which the second network node 1200-2 sends a link adaptation assistance information request. Thus, as illustrated in FIG. 14, the procedure of FIG.

12 further includes the first network node 120 receiving a link adaptation assistance information request message from the second network node 1200-2 (step 1400). The first network node transmits the link adaptation assistance information to the second network node 1200-2 responsive to receiving the link adaptation assistance information request. Note that the first network node 1200-1 may obtain the link adaptation assistance information before and/or after receiving the link adaptation assistance information request.

In one embodiment, the first network node 100 can additionally:

- Determine the link adaptation assistance information to be reported to the second network node based the link adaptation assistance information request message (in step 1202).
- Configure the link adaptation assistance information message to be transmitted to the second network node based on the link adaptation assistance information request message (e.g., in step 1202 or in preparation of the link adaptation assistance information message for transmission in step 1204).

Therefore, in one embodiment, the link adaptation assistance information request message configures the first network node 1200-1 to report link adaptation assistance information to the second network node 1200-2. Examples wherein the first network node 1200-1 may or may not fulfill the request are described below.

In one embodiment, the first network node 1200-1 receives the link adaptation assistance information request message as part of a handover preparation procedure. In one example, as illustrated in FIG. 15, the first network node 1200-1, makes a handover decision (step 1500), sends a handover request to the second network node 1200-1 (step 1502), and receives a HANDOVER RESPONSE message from the second network node 1200-2 (step 1504). In this embodiment, the handover response message comprises, in addition to the handover response, a link adaptation assistance information request message for the wireless communication device that the first network node 1200-1 may handover to the second network node 1200-2. In this case, the first network node 1200-1 may therefore transmit the link adaptation assistance information message associated to the wireless communication device to the second network node 1200-2 in step 1204 in a dedicated message upon the completion of or as an extension of the handover preparation procedure. This would enable the second network node 1200-2 use the link adaptation assistance information in step 1206 to optimize the configuration of the link adaptation parameters for the wireless communication device once a connection is established between the wireless communication device and the second network node 1202-2.

In one embodiment, the link adaptation assistance information request message (in either step 1400 of FIG. 14 or step 1504 of FIG. 15) comprises one or more of the following reporting configuration elements:

- An indication to start/stop/pause/resume or modify link adaptation assistance information reporting to the second network node
- An indication of the type reporting required, such as periodic reporting, or aperiodic reporting (one-shot), event triggered reporting.
  - If the first network node is configured to report link adaptation assistance information periodically, the request message may additionally comprise an indication of one or more of
    - A starting time for the reporting, such as a TTI number, a frame identifier etc.
    - An indication of at least one periodicity for link adaptation state reporting.
    - An indication of a stopping criteria for reporting link adaptation assistance information.
    - An indication of the reporting duration. This can be indicated, for instance with a time window expressed in absolute value (e.g., in milliseconds, seconds, minutes, hours etc.), or in number of TTIs, number of radio frames etc.
  - An indication of an event-triggered or event-based reporting, which may comprise, for instance, one or more in the group of:
    - An indication to report link adaptation assistance information prior to initiating a handover event
    - An indication to report link adaptation assistance information during or as part of a handover event
    - An indication to report link adaptation assistance information for specific wireless communication devices, such as
      - For wireless communication devices with low or medium or high traffic demand, wherein different user traffic demands may be defined by one or more traffic thresholds
      - For wireless communication devices with delay sensitive traffic, which may be characterized by one or more latency thresholds
      - For wireless communication devices with specific channel fading conditions, such user devices experiencing fast fading, slow fading, or static channel conditions. To this end, an indication of a time measurement gap and/or a frequency range could be provided to determine the channel fading condition. Channel fading thresholds could also be indicated to trigger the reporting when the measured channel fading condition exceeds or is below a threshold.
      - For wireless communication devices with delay tolerant traffic
      - For wireless communication devices with Ultra-Reliable Low-Latency Communication (URLLC) application
      - For Internet of Things (IoT) type of wireless communication devices
      - For wireless communication devices supporting specific applications, such as, e.g., gaming, augmented reality, self-driving vehicles,
      - For wireless communication devices supporting specific type of communications, such as, e.g., device-to-device communication, side-link communication, dual- or multi-connectivity, enhanced dual connectivity.

In one embodiment, the link adaptation assistance information request message comprises one or more requested types of LINK ADAPTATION STATE INFORMATION from the following types of link adaptation state information:

- A Channel State Information Measurement (CSI-M) report
- A Channel State Information Prediction (CSI-P) report
- An indication of at least one uncertainty measure for one or more information elements of the Channel State Information Measurement (CSI-M) report
- An indication of at least one uncertainty measure for one or more information elements of the Channel State Information Prediction (CSI-P) report
- An indication of the wireless communication device mobility state An indication of the channel fading state experience by the wireless communication device.

An indicator of the measured interference state experience by the wireless communication device.

An indicator of the predicted interference state experience by the wireless communication device One or more measurements of the downlink data transmission state in at least a previous transmission time interval (TTI).

For each requested type of LINK ADAPTATION STATE INFORMATION, an indication of one or more reporting granularity in frequency domain may be indicated. The frequency granularity may be, e.g.:

Per wideband

Per sub-band

Per physical resource block (PRB)

Per resource block group (RBG), wherein an RBG may comprise a group of PRBs

Per bandwidth part

Per bandwidth segment

For each requested type of LINK ADAPTATION STATE INFORMATION, an indication of one or more reporting granularity in spatial domain may be indicated. In one exemplifying case, the spatial granularity of the requested link adaptation state information is defined in association to one or more downlink reference signal, such as, e.g.:

Per Common Reference Signals (CRS)

Per Channel State Information Reference Signals CSI-RS

Per Synchronization Signal Block (SSB) reference signal

In one example, the second network node 1208-2 may request one or more types of LINK ADAPTATION STATE INFORMATION to be reported in association to one or more SSB beam coverage areas and/or one or more CSI-RS beam coverage areas. An SSB beam coverage area (and respectively CSI-RS beam coverage area) can be defined in relation to an SSB beam index (and respectively CSI-RS beam index).

For each requested LINK ADAPTATION STATE INFORMATION, an indication of at least one granularity in time domain for reporting may be included. The indicated at least one granularity in the time domain for reporting may be, e.g.:

per transmission time interval (TTI)| (i.e., one shot)

per transmission time window, wherein the reported information could be aggregated over a certain time interval per packet transmission per group of packets (e.g., starting packet and number of packets)

Figure 16:
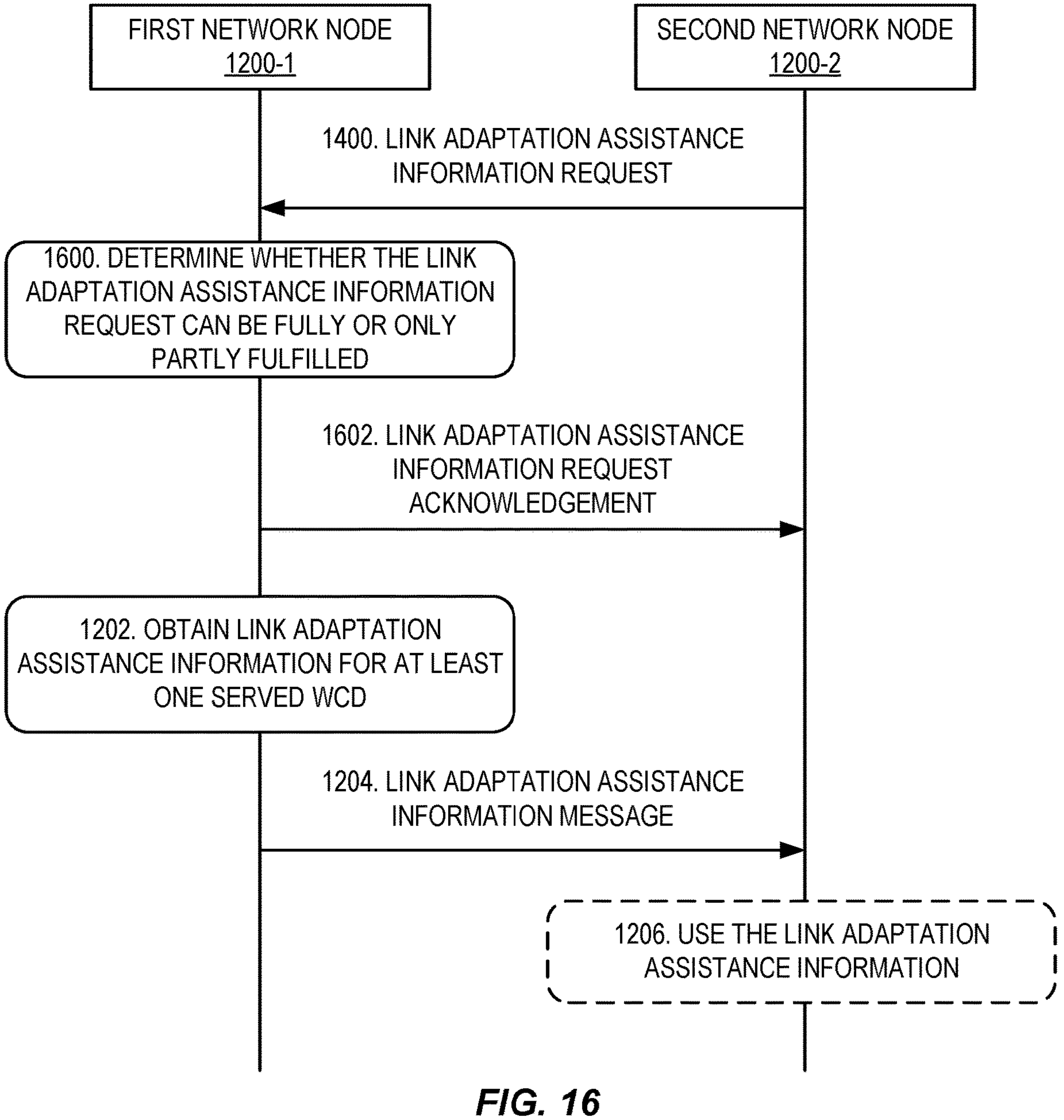
FIG. 16 illustrates the operation of a first network node and a second network node for inter-node exchange of link adaptation assistance information in accordance with another embodiment of the present disclosure.

In one embodiment, as illustrated in FIG. 16, the first network node 1200-1 may additionally:

Determine that the received request for link adaptation assistance information can be fulfilled fully or only partly (step 1600). Note that the request is shown as being received as in step 1400 of FIG. 14 in this illustrated example. However, the request may alternatively be included in a handover response as in step 1504 of FIG. 15.

Transmit a link adaptation assistance information acknowledgment message to the second network node 1200-2 indicating a successful or partly successful initialization of a link adaptation assistance information reporting procedure (step 1602).

Upon acknowledging a successful initialization of the link adaptation assistance information reporting procedure, the first network node 1200-1 may begin transmitting one or more link adaptation assistance information messages either based on the reporting configuration received from the second network node 1200-2 with the link adaptation assistance information request message, or with a modified reporting configuration (reported to the second network node 1200-2 with the link adaptation assistance information acknowledgment message).

In one embodiment, in case the first network node 1200-1 has determined that the received request for link adaptation assistance information can be fulfilled only in part, the link adaptation assistance information acknowledgment message may additionally comprise one or more of the following information:

an indication (e.g., such as a list) of the requested link adaptation assistance information the first network node can successfully report according to the configuration received with the link adaptation assistance information request message from the second network node 1200-2, an indication (e.g., such as a list) of the requested link adaptation assistance information that the first network node 1200-1 can successfully report according to a different configuration compared to the configuration received with the link adaptation assistance information request message from the second network node 1200-2, For instance, a list of link adaptation information elements that were requested by the second network node 1200-2 may be reported with a different format compared to the format requested by the second network node 1200-2, such as different granularity of information (in time and/or frequency and/or spatial domains) different reporting type (e.g., periodic, aperiodic, event-triggered) or different reporting configuration (e.g., different frequency of reporting, different number of users for which reporting can be provided etc.).

an indication (e.g., such as a list) of the link adaptation assistance information that the first network node 1200-1 can successfully report (not necessarily included in the list requested link adaptation assistance information received from the second network node 1200-2) and the associated reporting format or configuration.

Figure 17:
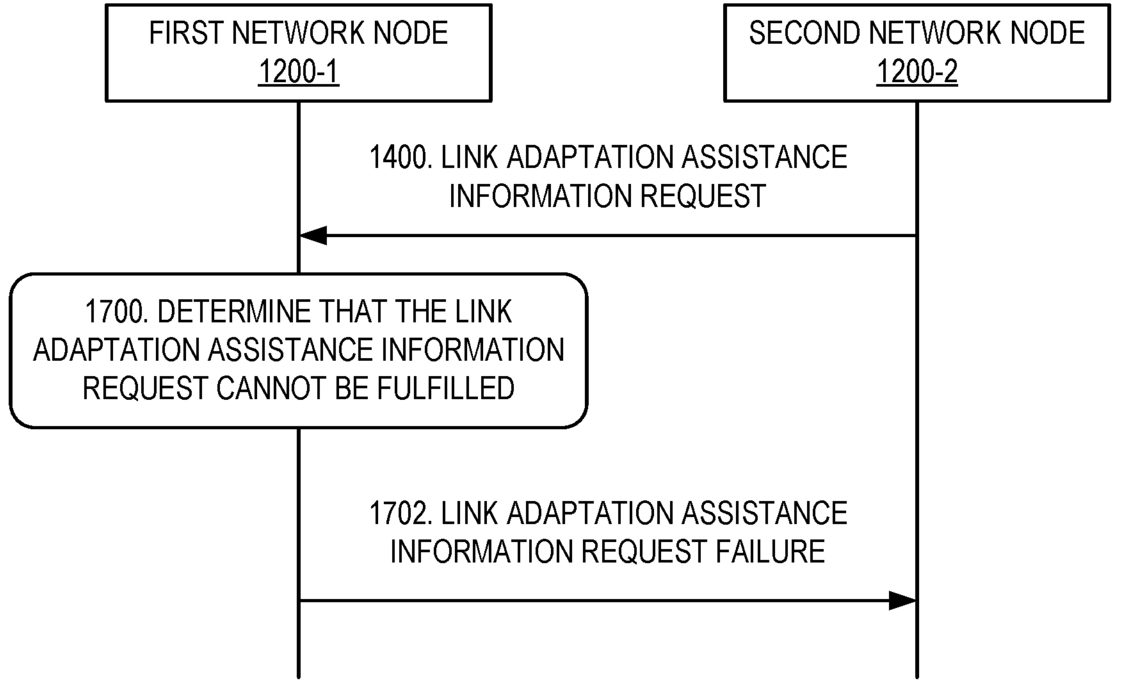
FIG. 17 illustrates the operation of a first network node and a second network node wherein there is a failure of inter-node exchange of link adaptation assistance information in accordance with an embodiment of the present disclosure.

In one embodiment, as illustrated in FIG. 17, the first network node 1200-1 may additionally:

Determine that the received request for link adaptation assistance information cannot be fulfilled (step 1700). Note that the request is shown as being received as in step 1400 of FIG. 14 in this illustrated example. However, the request may alternatively be included in a handover response as in step 1504 of FIG. 15.

Transmit a link adaptation assistance information failure message to the second network node 1200-2 indicating an unsuccessful initialization of a link adaptation assistance information reporting procedure (step 1702).

In one embodiment, the link adaptation assistance information failure message may additionally comprise information indicating the cause of the failure.

Embodiments of a method executed by the second network node 1200-2 are also disclosed herein. In one embodiment, as illustrated in FIG. 12, a method executed by the second network node 1200-2 for inter-node exchange of link adaptation assistance information in a communication network comprises:

receiving a link adaptation assistance information message from the first network node 1200-1 (step 1204), and Optionally using the link adaptation assistance information comprised in the message (step 1206).

Figure 9:
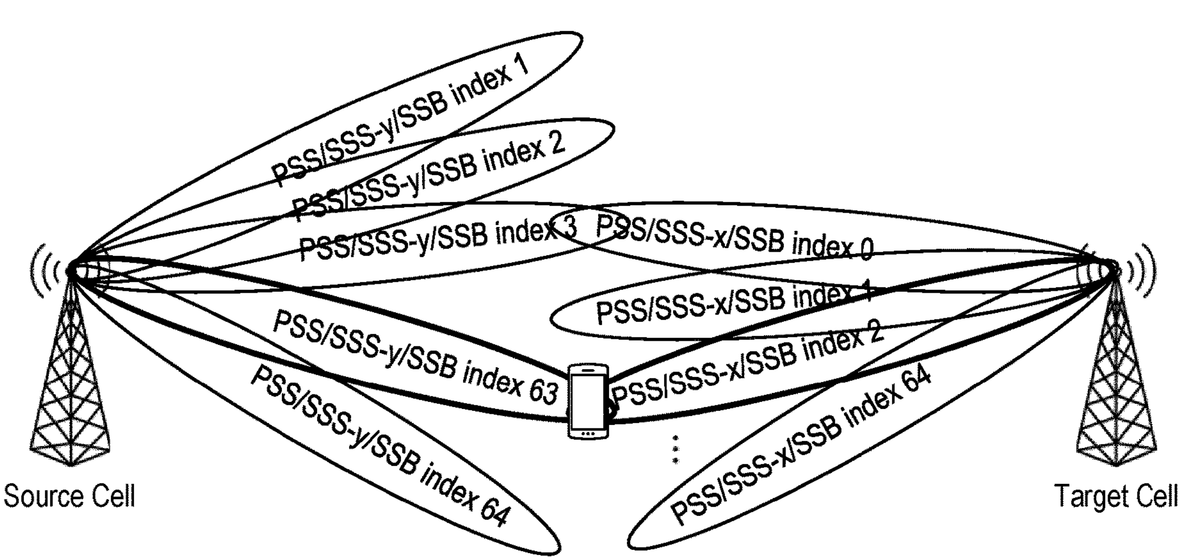
FIG. 9 illustrates an example of beam-level handover decision in a NG-RAN (i.e., NR) system.
Figure 10A:
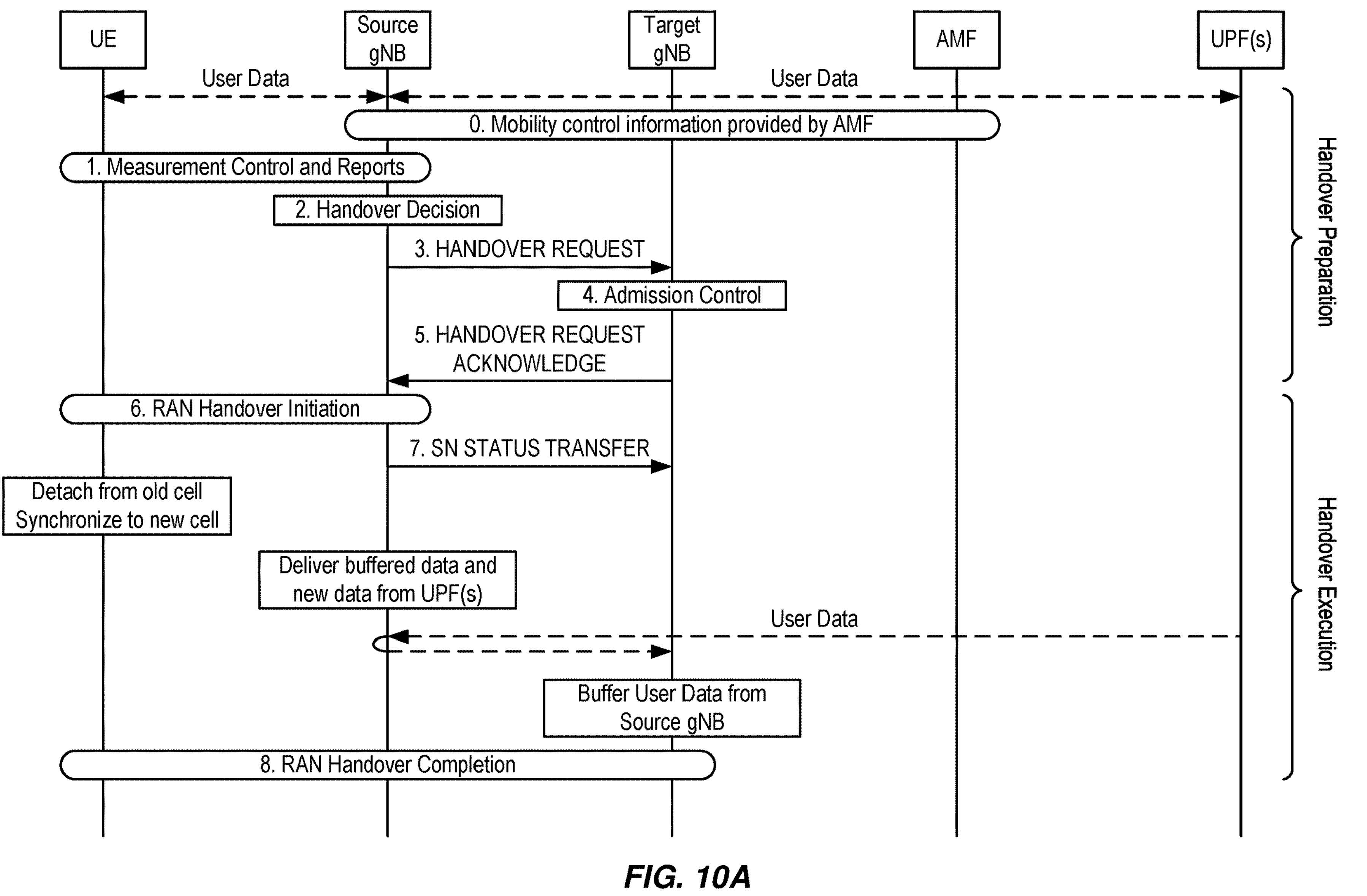
FIGS. 10A and 10B illustrate intra-AMF/UPF handover for 3GPP NG-RAN system.
Figure 10B:
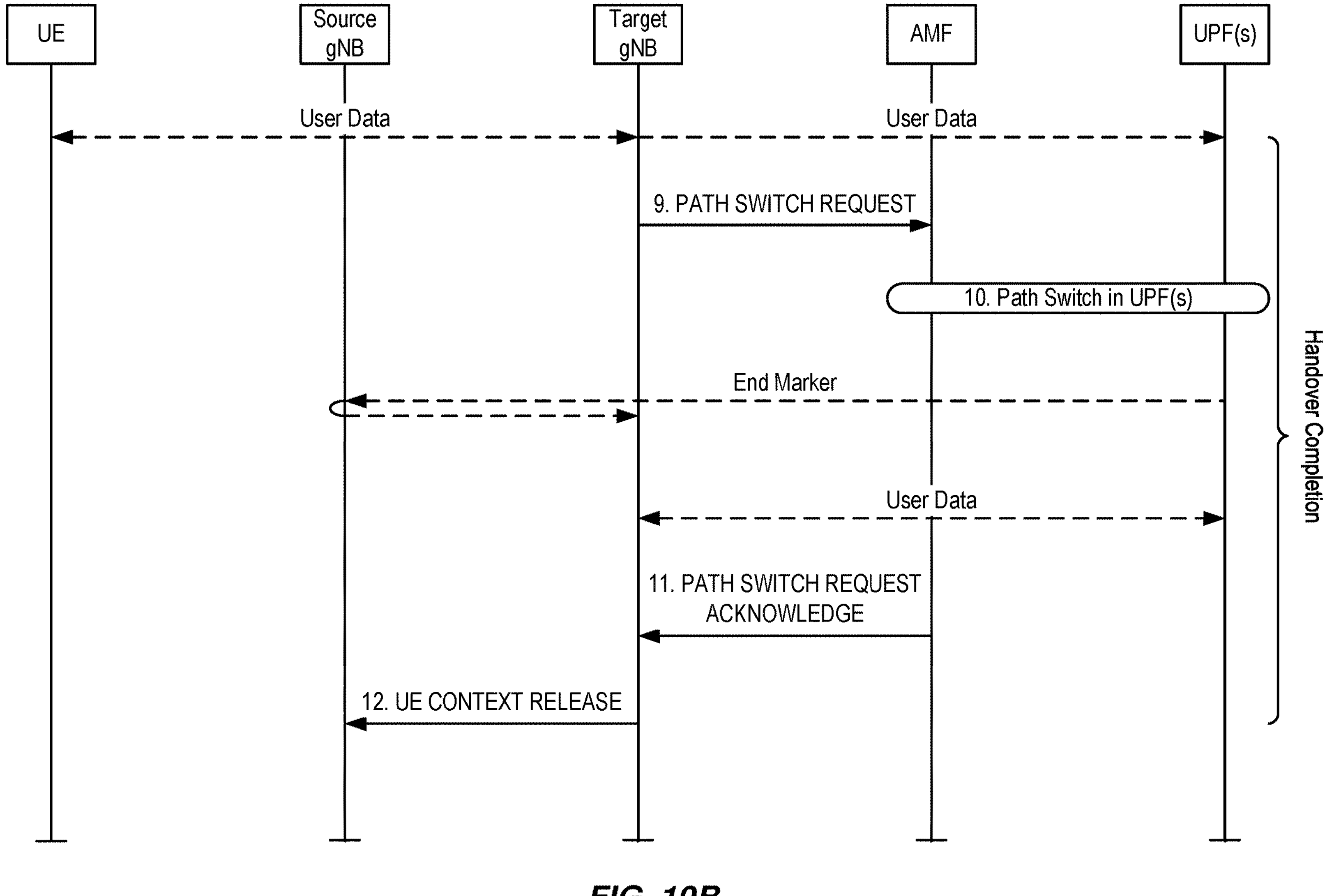

In one embodiment, as illustrated in FIG. 9, the second network node 1200-2 may additionally:

Determine one or more link adaptation assistance information to be requested to the first network node (step 1400), and.

Transmit a link adaptation assistance information request message to the first network node 1200-1 (step 1400).

In one embodiment, the link adaptation assistance information request message configures the first network node 1200-1 to report a link adaptation assistance information to the second network node 1200-2.

The details of the request message are given above.

In one embodiment, the second network node 1200-2 may additionally receive a link adaptation assistance information acknowledge message from the first network node 1200-1 indicating a successful or partly successful initialization of a link adaptation assistance information reporting procedure (see, e.g., step 1602 of FIG. 16). The details of the acknowledge message are given above.

In one embodiment, the second network node 1200-2 may additionally receive a link adaptation assistance information failure message from the first network node 1200-1 indicating an unsuccessful initialization of a link adaptation assistance information reporting procedure (see, e.g., step 1702 of FIG. 17). The details of the acknowledge message are given above.

Methods Involving a Third Network Node

Figure 18:
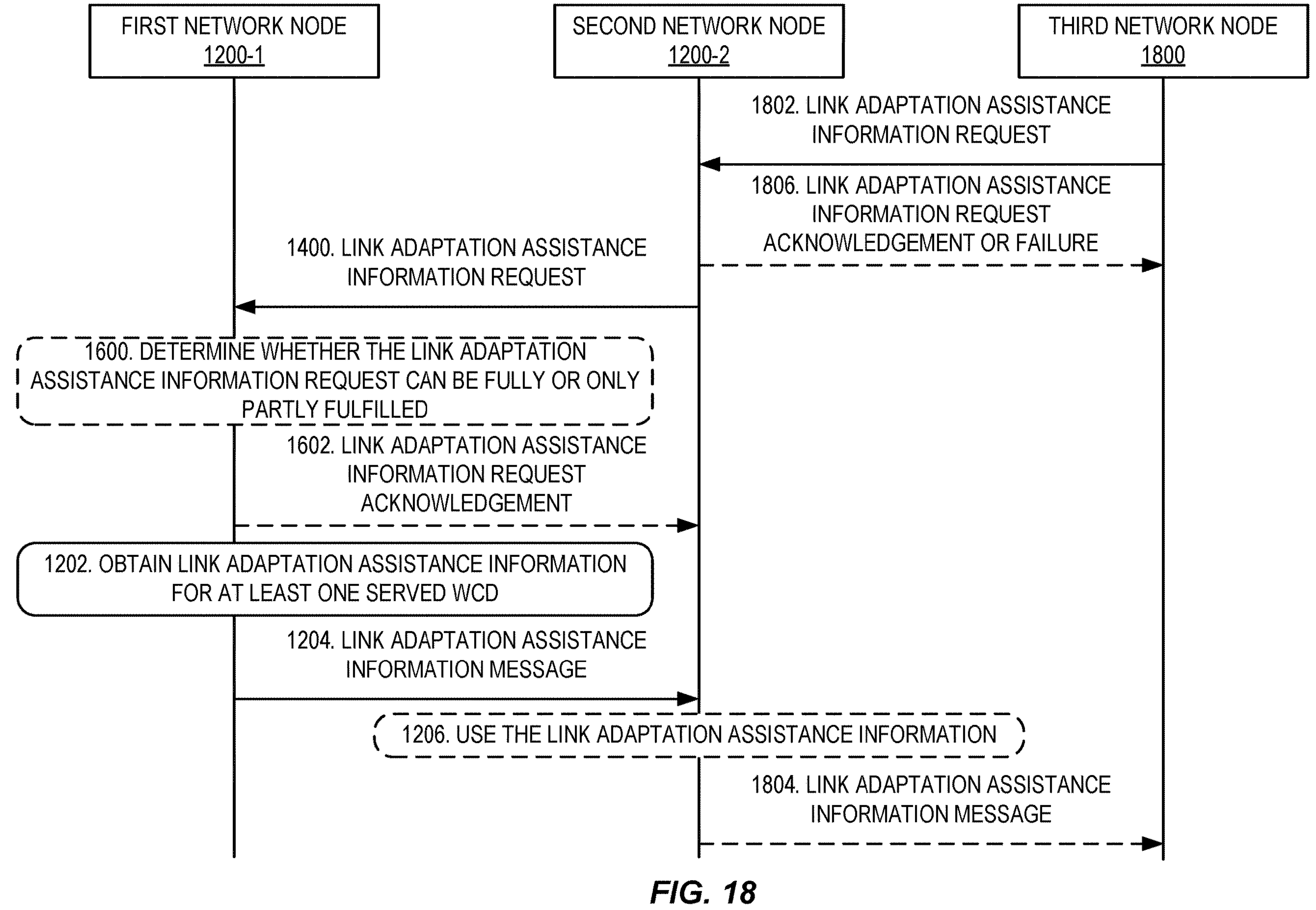
FIG. 18 illustrates the operation of a first network node, a second network node, and a third network node for inter-node exchange of link adaptation assistance information in accordance with an embodiment of the present disclosure.

Embodiments involving a third network node will now be described. For example, operations of the second network node 1200-2 (e.g., determining a link adaptation assistance information request message to send to the first network node 1200-1) may depend on a request message received by the second network node 1200-2 from a third network node. Thus, in one embodiment, as illustrated in FIG. 18, the second network node 1200-2 may additionally:

Receive a link adaptation assistance information request message from a third network node 1800 associated to radio cells or wireless communication devices served by the first network node 1200-1 (step 1802);

Determine the link adaptation assistance information request message for the first network node 1200-1 (step 1400) based on link adaptation assistance information request message received from the third network node 1800.

Figure 21:
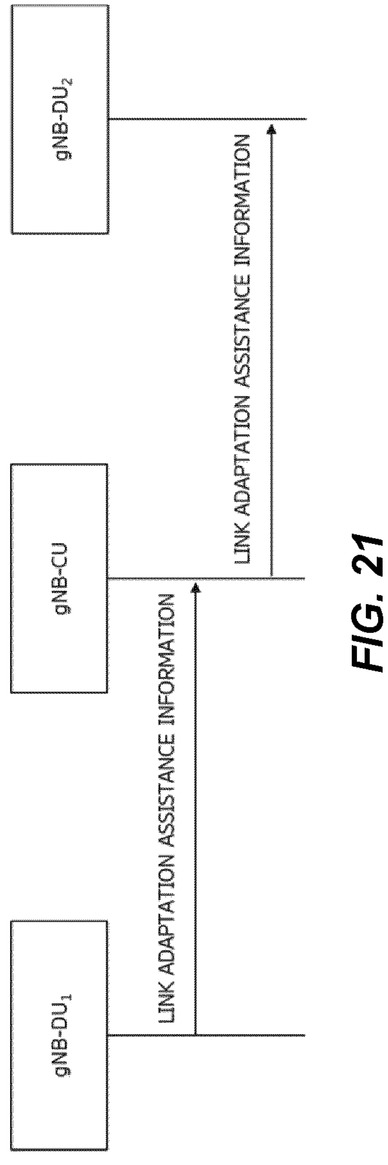
FIG. 21 illustrates an example embodiment in which link adaptation assistance information is exchanged in an NG-RAN system comprising a gNB-CU connected to multiple gNB-DUs.
Figure 23:
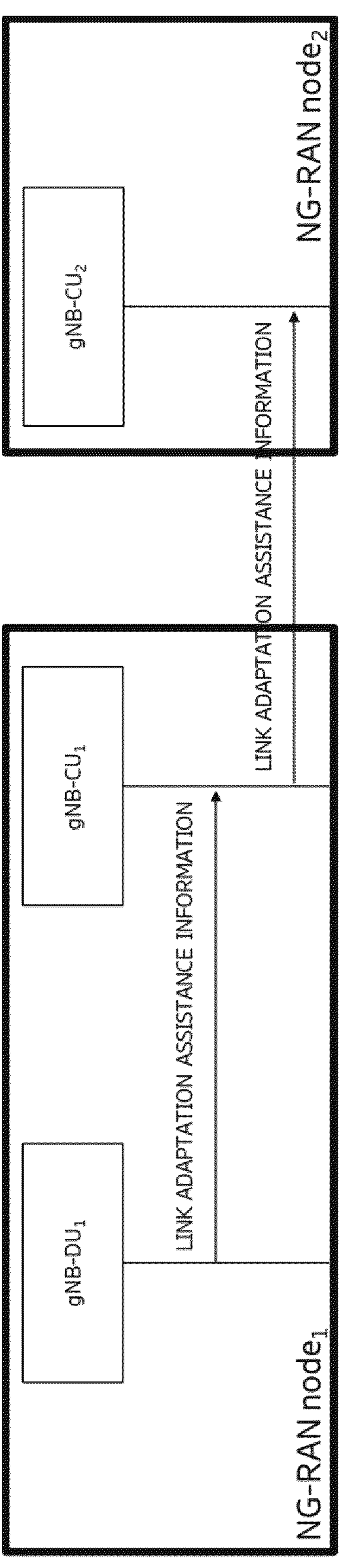
FIG. 23 illustrates an example embodiment in an NG-RAN system wherein link adaptation assistance information is exchanged from units of a first NG-RAN node to units of a second NG-RAN node.
Figure 24:
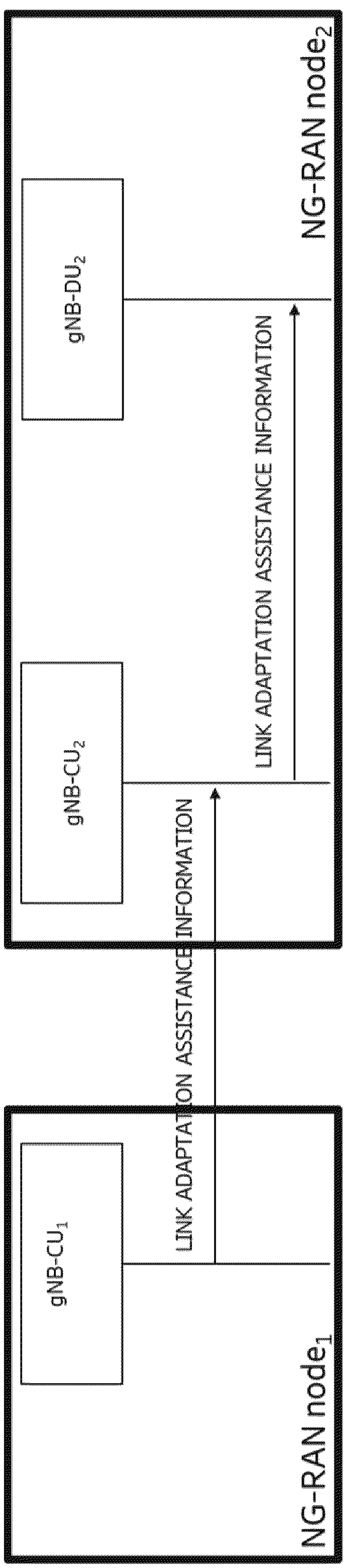
FIG. 24 illustrates an example embodiment in an NG-RAN system wherein link adaptation assistance information is exchanged from units of a first NG-RAN node to units of a second NG-RAN node.

In one example, the second network node 1200-2 is a centralized unit (gNB-CU) of a NG-RAN node with split architecture, and the first network node 1200-1 and the third network node 1800 are decentralized units (i.e., gNB-DU) connected to the gNB-CU via a F1 interface of the NG-RAN system, as illustrated in FIG. 21. In another example, the first and second network nodes 1200-1 and 1200-2 are a gNB-DU and a gNB-CU, respectively, of a first NG-RAN node with split architecture, while the third network node 1800 is centralized unit (i.e., gNB-CU) of a second NG-RAN node as illustrated in FIG. 23. In an alternative example, the first network node 1200-1 is a gNB-CU of a first NG-RAN node with split architecture, while the second network node 1200-2 and the third network node 1800 are a centralized unit (i.e., gNB-CU) and a decentralized unit (gNB-DU), respectively, of a second NG-RAN node as illustrated in FIG. 24.

In one embodiment, as illustrated in FIG. 18, the second network node 1200-2 may additionally:

Determine a link adaptation assistance information message to send to the third network node 1800 based on the link adaptation assistance information message received from the first network node 1200-1 (step 1804), and Transmit the determined link adaptation assistance information message to the third network node 1800 (step 1804).

In an embodiment, in response to the link adaptation assistance information request message received from the third network node 1800, the second network node 1200-2 may additionally:

Transmit a link adaptation assistance information acknowledgment message to the third network node 1800 indicating a successful or partly successful initialization of a link adaptation assistance information reporting procedure (step 1806); OR Transmit a link adaptation assistance information failure message to the third network node 1800 indicating an unsuccessful initialization of a link adaptation assistance information reporting procedure.

Note that, in the case of a failure, the procedure ends upon sending the failure message (i.e., the remaining steps are not performed).

Now, a description of embodiments related to a RAN split architecture for both the first and second network nodes 1200-1 and 1200-2 will be described in more detail. Embodiments listed hereafter are illustrated and explained using the link adaptation assistance information message exchanged between the first network node 1200-1 and the second network node 1200-2. However, it is It is clear to the skilled reader that similar embodiments of the method would apply to:

Transmission/reception of the link adaptation assistance information request message, Transmission/reception of the link adaptation assistance information acknowledgement message, and Transmission/reception of the link adaptation assistance information failure message.

Figure 19:
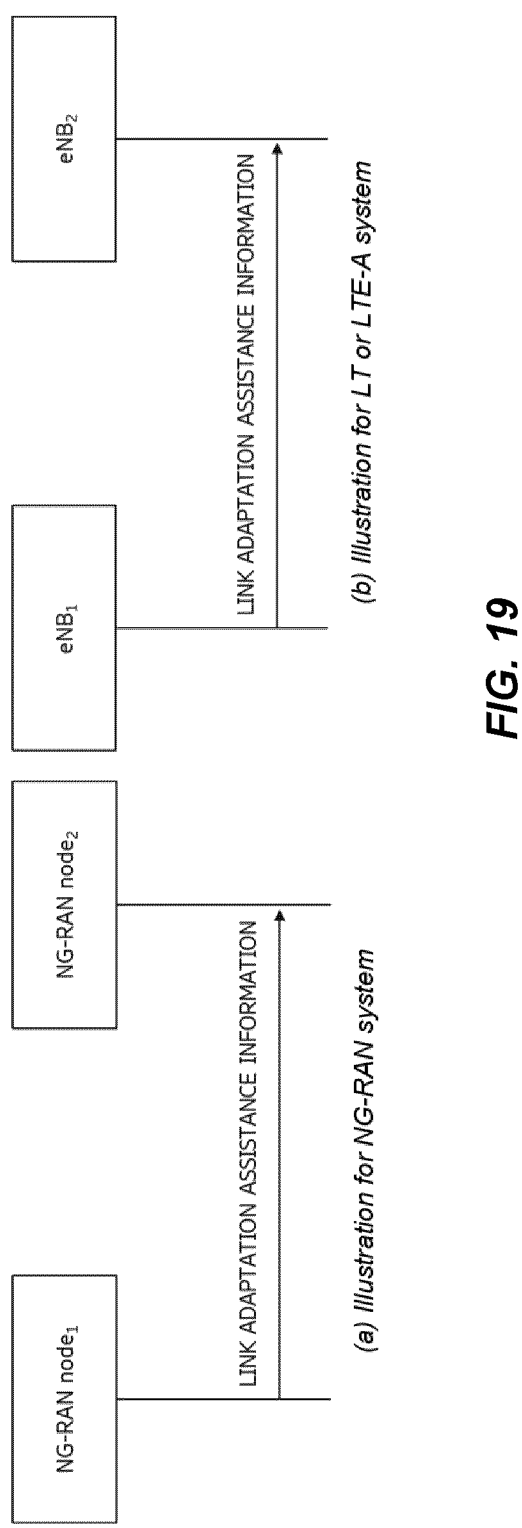
FIG. 19 illustrates example embodiments in which the first and second network nodes are both either NG-RAN nodes (such as gNBs) of an NG-RAN system or eNBs of an LTE or LTE-A system.

In one embodiment, the first network node 1200-1 and the second network node 1200-2 are both NG-RAN nodes of a NG-RAN system, as illustrated in FIG. 19(*a*). In another embodiment, the first network node 1200-1 and the second network node 1200-2 are both eNBs of an LTE or LTE-A system, as illustrated in FIG. 19(*b*).

In case both the first network node 1200-1 and the second network node 1200-2 are NG-RAN nodes, the Xn interface of the NG-RAN system may be used to exchange the link adaptation assistance information among the first network node 1200-1 and the second network node 1200-2. In the case wherein both first network node 1200-1 and the second network node 1200-2 are eNBs, the X2 interface of the E-UTRAN (LTE or LTE-A) system may be used to exchange the link adaptation assistance information among the first network node 1200-1 and the second network node 1200-2.

Figure 20:
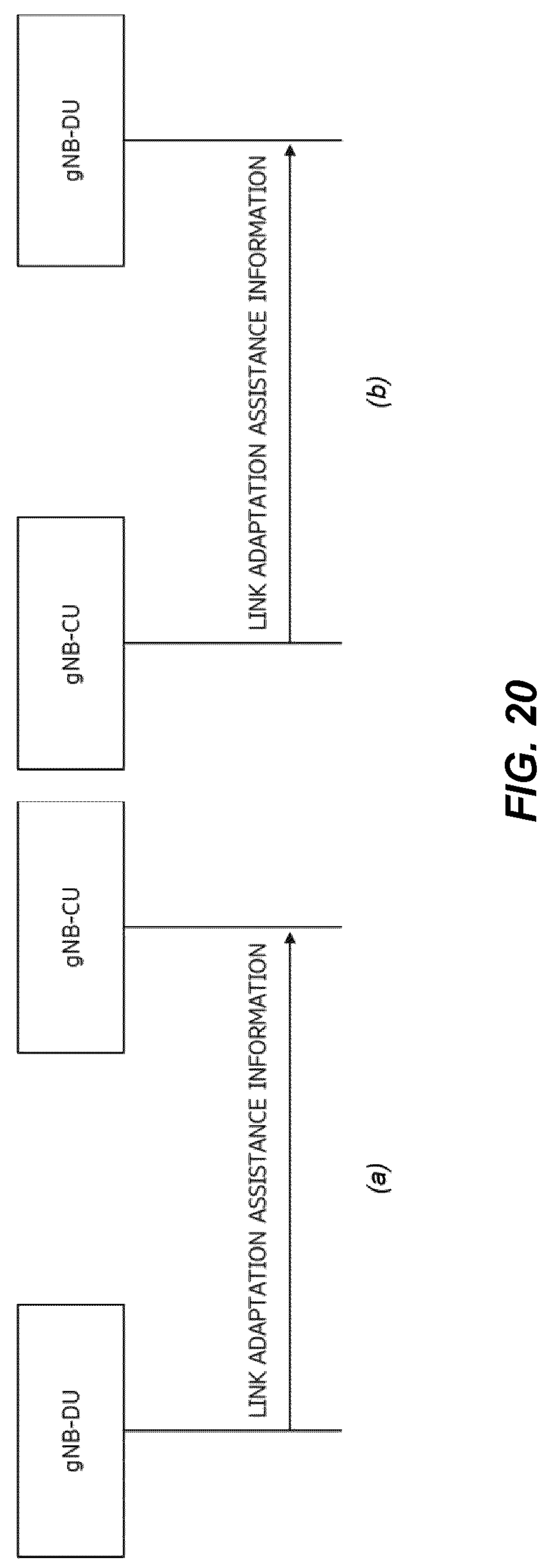
FIG. 20 illustrates example embodiments in which the first network node and/or the second network node are either a distributed unit of an NG-RAN node (gNB-DU) or centralized unit of an NG-RAN node (gNB-CU) of an NG-RAN system.

In one embodiment, the first network node 1200-1 is a gNB-DU of a NG-RAN system and the second network node 1200-2 is a gNB-CU of an NG-RAN system, as illustrated in FIG. 20(*a*).

In one embodiment, the first network node 1200-1 is a gNB-CU of a NG-RAN system and the second network node 1200-2 is a gNB-DU of an NG-RAN system, as illustrated in FIG. 20(*b*).

In both cases, a F1 interface of the NG-RAN system could be to exchange link adaptation assistance information between CU and DU nodes.

In combination with other embodiments, link adaptation assistance information may be exchanged among different decentralized units (DUs) connected to the same centralized unit (CU) of an NG-RAN node (e.g., a gNB), even though DUs do not share a direct communication interface, as illustrated in FIG. 21. In this case, link adaptation between assistance information would be exchanged over the F1 interface of the NG-RAN system. FIG. 21 shows an example wherein:

In a first embodiment, the first network node 1200-1 is a gNB-DU (i.e., gNB-$DU_1$) and the second network node 1200-2 is a gNB-CU; and In a second embodiment, the first network node 1200-1 is a gNB-CU and the second network node 1200-2 is a gNB-DU (i.e., gNB-$DU_2$)

Link adaptation assistance information, in this case, could be exchanged between gNB-DUs through a gNB-CU in order to optimize the link adaptation for a wireless communication device handed over from a serving cell of gNB-$DU_1$ to a target cell of gNB-$DU_2$.

In one embodiment, the first network node 1200-1 may be a gNB-CU-CP node and the second network node 1200-2 is a gNB-DU of an NG-RAN system. In one embodiment, the first network node 1200-1 may be a gNB-DU node and the second network node 1200-2 is a gNB-CU-CP. In this case, link adaptation assistance information could be exchanged over the E1 interface of an NG-RAN system.

Figure 22:
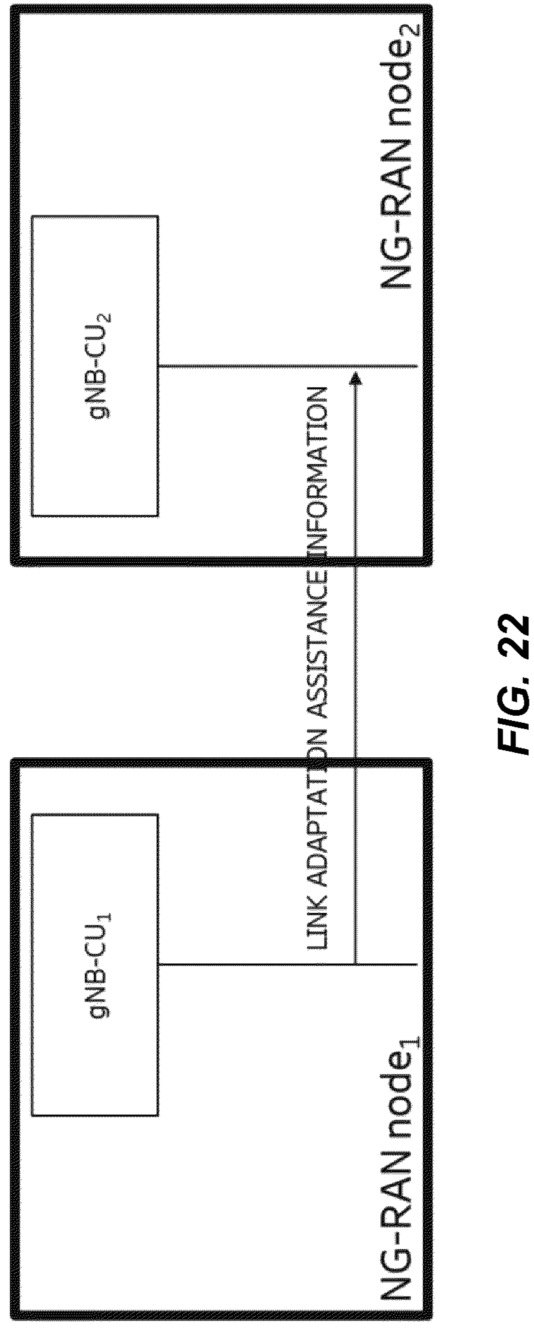
FIG. 22 illustrates an example embodiment in which link adaptation assistance information is exchanged between a gNB-CU of a first NG-RAN node and a gNB-CU of a second NG-RAN node.

In one embodiment, as illustrated in FIG. 22, the first network node 1200-1 is a gNB-CU of a first NG-RAN node and the second network node 1200-2 is a second gNB-CU of an NG-RAN node. In this case, the link adaptation assistance information could be exchanged over the Xn interface of an NG-RAN system.

In combination with other embodiments, link adaptation assistance information may be exchanged from a first gNB-DU (gNB-$DU_1$) of a first NG-RAN node to a gNB-CU (i.e., gNB-$CU_2$) of a second NG-RAN node as illustrated in FIG. 23. In this case, In a first embodiment, the first network node 1200-1 is a gNB-DU (i.e., gNB-$DU_1$) and the second network node 1200-2 is the corresponding a gNB-CU (i.e., gNB-$CU_1$) of the first NG-RAN node. Therefore, link adaptation assistance information is exchanged over the F1 interface of the NG-RAN node; and In a second embodiment, the first network node 1200-1 is the gNB-CU (i.e., gNB-$CU_1$) of the first NG-RAN node, whereas the second network node 1200-2 is a gNB-CU (i.e., gNB-$CU_2$) of the second NG-RAN node. Therefore, link adaptation assistance information is exchanged over the Xn interface of the NG-RAN node In combination with other embodiments, link adaptation assistance information may be exchanged from a first gNB-DU (gNB-$DU_1$) of a first NG-RAN node to a gNB-DU (i.e., gNB-$DU_2$) of a second NG-RAN node as illustrated in FIG. 24 (showing only the missing aspects of FIG. 23 necessary to realize this embodiment).

Figure 25:
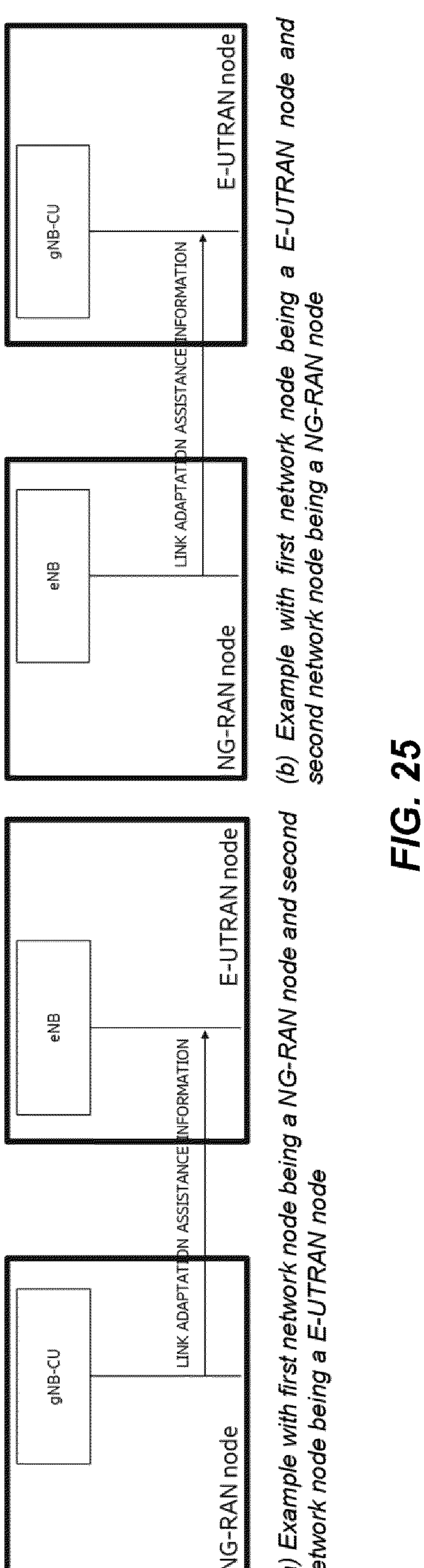
FIG. 25 illustrates example embodiments in which link adaptation assistance information is exchanged between and NG-RAN node and an E-UTRAN node.

In one embodiment, the first network node 1200-1 is a gNB-CU of a NG-RAN system and the second network node 1200-2 is a eNB of an LTE or LTE-A system as illustrated in FIG. 25(*a*), or vice versa, that is, the first network node 1200-1 is an eNB of an LTE or LTE-A system and the second network node 1200-2 is a gNB-CU of a NG-RAN system as illustrated in FIG. 25(*b*). In this case, link adaptation assistance information could be used to support enhanced dual connectivity among a NG-RAN node and an eNB node of an LTE-A system using the X2 interface. In one alternative embodiment, the NG-RAN node and the gNB node may belong to different systems, in which case link adaptation assistance information may be used to support inter-system mobility or inter-system mobility load balancing.

2 Description Related to Embodiments Related to a Logging and Reporting Link Adaptation Assistance Information and Configuration Thereof State of the art link adaptation relies on an outer control loop driven by the HARQ feedback from the UE to adjust a CSI-based estimate of SINR to a pre-defined target BLER. There are several issues with this approach:

Existing link adaptation algorithms are controlled by a fixed Block Error Rate (BLER) target, typically the same for all UEs (at least with the same type of traffic).

Existing link adaptation algorithms have slow convergence, in the order of hundreds of Transmit Time Intervals (TTIs), before the link adaptation parameters can meet the desired BLER target for a specific UE.

Existing link adaptation algorithms rely on a default (safe) configuration of link adaptation parameters when Channel State Information (CSI) feedback for the UE is not yet available (typically the lowest modulation order and lowest Modulation and Coding Scheme (MCS) index are chosen to insure robust communication at the expense of performance).

Existing link adaptation algorithms need to be re-initialized upon mobility decisions.

Link adaptation in existing communication systems, such as the 3GPP LTE and 5G NR systems, traditionally use a fixed BLER target that is common for all UEs with the same type of traffic as a control parameter to select link adaptation parameters for a transmission (i.e., modulation order, code rate, MCS index and allocation of resources). In some implementations, the same BLER target is configured for all UEs in the coverage area of a RAN node regardless of their traffic type. Furthermore, the BLER target is typically not adapted over time, but kept fixed for all links.

This approach can simplify some implementations of a link adaptation algorithm in the radio communication system at the expense of performance due to the non-stationary and rapidly varying channel conditions, both over time and frequency domain. On one hand, configuring the same BLER target for all UEs within the coverage area of a RAN node (or worse, within larger parts of the RAN) can be problematic as different UEs typically experience different channel states and interference. On the other hand, keeping the BLER target fixed within a communication session can only allow tracking of the average channel behavior and therefore does not fully exploit the potential of a communication link.

Another issue with existing link adaptation algorithms that are based on a BLER target is slow convergence to a proper adjustment of the reported channel quality (i.e., CQI). Tens to hundreds of TTIs may be required before link adaptation converges to the desired BLER target. As such, the UE experiences sub-optimal performance for a long period of time (e.g., in terms of throughput). The convergence issue becomes particularly severe for UEs with a small amount of data to transmit/receive since, in this case, the link adaptation algorithm may never converge.

The link adaptation algorithm also relay on CSI feedback as an input feature. However, a UE may also be scheduled to transmit/receive in absence of a CSI feedback, as it may occur at the beginning of a communication session. The lack of a CSI feedback forces the link adaptation algorithm to rely on a default (safe) configuration of link adaptation parameters, wherein typically the lowest modulation order and lowest MCS index are chosen to insure robust communication. However, such robust configuration results in lower throughput for the UE despite a high consumption of radio resources (i.e., Physical Resource Blocks (PRBs)), which in turns lowers the overall system performance since such resources cannot be used by other UEs. This condition is exacerbated in case of UEs with small packets, for which the data to transmit/receive is so small that the transmission of the data may be completed before a CQI index is available.

Finally, a major issue with existing link adaptation algorithms is that they need to be re-instantiated (i.e., from the default configuration) whenever a UE is moved from a source cell to a target cell as part of a handover procedure. In this case, no prior knowledge from the source cell is used to warm-start the link adaptation algorithm.

Slow convergence of the of the link adaptation and the need for re-initialization in case of mobility are the two major problems that can strongly impact the UE throughput and the system spectral efficiency in case of mobility.

Certain aspects of the present disclosure and their embodiments may provide solutions to the aforementioned or other challenges.

First Aspects: First aspects of the present disclosure are described in Section 2.1 below. In the first aspects, systems and methods are disclosed herein that relate to configuring and/or requesting a wireless communication device to report to a second network node (e.g., a target network node for a mobility or handover procedure) a link adaptation assistance information report associated to a first network node (e.g., a source network node for a mobility or handover procedure) to support the optimization of link adaptation for the wireless communication device at the first network node based, for instance, on machine learning (ML) or Artificial Intelligence (AI) techniques.

In one example, the second network node is the target network node of a mobility event involving the wireless communication device, and the first network node is the source network node of the mobility event. Upon or during the mobility event for the wireless communication device, the target network node can configure/request the wireless communication device to report (to the target network node itself) link adaptation assistance information associated to prior communication instances between the wireless communication device and the source network node (e.g., collected prior to the mobility event).

Embodiments of a method executed by a second network node in a communication network for configuring a wireless communication device to report link adaptation assistance information associated to a first network node are disclosed herein. In one embodiment, the method executed by the second network node comprises:

- receiving a link adaptation assistance information report from the wireless communication device, the report comprising link adaptation assistance information associated to a first network node.

In one embodiment, the second network node is the target network node of a mobility event associated to the wireless communication device, whereas the first network node is the source network node of the mobility event.

Further embodiments of the method may additionally include one or more of the following:

- In one embodiment, the second network node transmits a configuration message to the wireless communication device, where the configuration message configures and/or requests for the wireless communication device to report, to the second network node, the link adaptation assistance information associated to the first network node.
  - In one embodiment, the configuration message comprises an indication of a type(s) of link adaptation assistance information to be reported.
  - In one embodiment, for each requested/configured type of link adaptation assistance information to be reported, the configuration message further indicates one or more reporting formats, such as a reporting granularity in the frequency domain and/or the time domain and/or the spatial domain, for the requested/configured type of link adaptation assistance information to be reported.
- In one embodiment, the second network node receives a link adaptation assistance information acknowledgment message (e.g., in response to the configuration message) from the wireless communication device indicating a successful configuration/initialization of link adaptation assistance information reporting.
- In one embodiment, the second network node receives a link adaptation assistance information failure message from the wireless communication device indicating an unsuccessful configuration/initialization of link adaptation assistance information reporting.

Embodiments of a method executed by a wireless communication device in a communication network for reporting link adaptation assistance information to a second network node are also disclosed herein. In one embodiment, the method executed by the wireless communication device comprises:

- transmitting a link adaptation assistance information report to the second network node comprising link adaptation assistance information associated to a first network node.

Further embodiments of the method may additionally include one or more of the following:

- In one embodiment, the wireless communication device receives a configuration message from the second network node, where the configuration message configures or requests for the wireless communication device to report, to the second network node, the link adaptation assistance information associated to the first network node.
- In one embodiment, the wireless communication device transmits a link adaptation assistance information acknowledgment message to the second network node indicating a successful configuration/initialization of link adaptation assistance information reporting.
- In one embodiment, the wireless communication device transmits a link adaptation assistance information failure message to the second network node indicating an unsuccessful configuration/initialization of link adaptation assistance information reporting.

Additional details regarding the embodiments of the method performed by the second network node and the embodiment of the method performed by the wireless communication device are described below in Section 2.1.

Certain embodiments may provide one or more of the following technical advantage(s). Embodiments of the systems and methods disclosed herein aim at solving shortcoming with existing link adaptation procedures by exchanging link adaptation assistance information from a wireless communication device to a network node in support of mobility events.

Embodiments of the systems and methods disclosed herein may allow optimization of the transmission format for transmissions occurring over a communication link between a wireless communication device and a network node compared to the existing solutions. One advantage of the embodiments of the systems and methods disclosed herein is that they enable the target network node of a handover event to acquire link adaptation assistance information associated to one or more wireless communication devices that are handed over by the source network node. As such, the target network node can configure optimal link adaptation parameters for communicating with the wireless communication devices handed over avoiding long transient of the existing link adaptation algorithms, thereby yielding improved spectral efficiency and throughput for the individual wireless communication devices and the system as a whole.

In one example, link adaptation assistance information could be used by the target network node to learn a more general link adaptation algorithm, e.g., by means of machine learning, by using data collected by the target network node from wireless communication devices. This has the advantage to enable the target network node to learn and optimize the configuration of link adaptation parameters (e.g., what modulation order, code rate or MCS index) to configure in communications with any of the wireless communication devices served by its radio cells. When combined with a procedure that optimizes link adaptation by directly choosing modulation order, code rate, and MCS index without aiming to guarantee a specific BLER target, embodiments disclosed herein allow a more accurate and faster configuration of the link adaptation parameters compared to existing solutions, thereby resulting in better performance in terms of throughput and latency.

In another example, link adaptation assistance information can be exchanged as part of a handover procedure and used by the target network node to warm start the link adaptation for the newly acquired wireless communication device. As such, the target network node can configure optimal link adaptation parameters for communicating with the wireless communication devices handed over by avoiding long transient of existing link adaptation solutions and by avoiding reliance on default conservative configurations of link adaptation parameters. Thereby, also in this case, the resulting spectral efficiency and throughput for the individual wireless communication devices and the system as a whole can be improved over existing solutions.

Second Aspects: Second aspects of the present disclosure are described in Section 2.2 below. In the second aspects, systems and methods are disclosed for a first network node to configure a wireless communication device to log/store link adaptation assistance information, associated to the communication with a serving network node, that can be reported to a second network node (i.e., a target network node) after a mobility event. The link adaptation assistance information stored/logged by the wireless communication device can then be used by the second network node (e.g., a target network node) to improve link adaptation parameters selection, e.g., by means of ML/AI algorithm, when starting a communication session with the wireless communication device.

Embodiments of a method executed by a first network node in a communication network for configuring a wireless communication device to store/log link adaptation assistance information are disclosed. In one embodiment, the method comprises:

- Transmitting a configuration message to a wireless communication device, the configuration message configuring the wireless communication device to:
  - Log/store link adaptation assistance information associated to the communication with the first network node; and/or
  - Report the logged/stored link adaptation assistance information to the second network node.

Additional embodiments related to the aforementioned method are described below in Section 2.2. These additional embodiments include:

- Embodiments related to the format of the configuration message,
- Embodiments related to the type of link adaptation assistance information that the wireless communication device can be configured to log/store and/or report to the second network node,
- Embodiments related to how and when the configuration message is transmitted, e.g.
  - The configuration message may be part of the handover initiation procedure, such as part of the RRCReconfiguration message,
- Embodiments in which the configuration message may be a dedicated signaling for link adaptation assistance information configuration.

Embodiments of a method executed by a wireless communication device in a communication network for reporting link adaptation assistance information to a network node are disclosed. In one embodiment, the method comprises:

- Receiving a configuration message from a first network node, the configuration message configuring the wireless communication device to:
  - Log/store link adaptation assistance information associated to the communication with the first network node; and/or
  - Report the logged/stored link adaptation assistance information to a second network node;
- Logging link adaptation assistance information associated to at least a communication link between the wireless communication device and the first network node based on the configuration message.

The method at the wireless communication device may additionally comprise the step of:

- Transmitting a link adaptation assistance information report to the second network node.

Additional details regarding the method executed by the wireless communication device and the associated messages are described below in below in Section 2.2.

Certain embodiments may provide one or more of the following technical advantage(s). Embodiments of the systems and methods disclosed herein aim at solving shortcoming with existing link adaptation algorithms by exchanging link adaptation assistance information from a wireless communication device to a network node in support of mobility events.

Embodiments of the systems and methods disclosed herein allows the source network node of a mobility event for a wireless communication device to configure the wireless communication device to store/log link adaptation assistance information, associated to the communication with the first network node, prior to or during the mobility event. Therefore, one advantage of embodiments disclosed herein is to enable the target network node of a handover event to acquire link adaptation assistance information associated to one or more wireless communication devices that are handed over by the source network node. As such, the target network node can configure optimal link adaptation parameters for communicating with the wireless communication devices handed over avoiding long transient of existing link adaptation algorithms, thereby yielding improved spectral efficiency and throughput for the individual wireless communication devices and the system as a whole.

In one example, link adaptation assistance information could be used by the target network node to learn a more general link adaptation algorithm, e.g., by means of machine learning, by using data collected by other network nodes. This has the advantage to enable the target network node to learn and optimize the configuration of link adaptation parameters (e.g., what modulation order, code rate or MCS index) to configure in communications with any of the wireless communication devices served by its radio cells. When combined with an algorithm that optimizes link adaptation by directly choosing modulation order, code rate and MCS index without aiming to guarantee a specific BLER target, embodiments disclosed herein allow a more accurate and faster configuration of the link adaptation parameters compared to prior art, thereby resulting in better performance in terms of throughput and latency.

Third Aspects: Third aspects of the present disclosure are described in Section 2.3 below. In the third aspects, systems and methods are disclosed herein for two network nodes to negotiate and determine a configuration for enabling link adaptation assistance information (LAAI) storing/logging and/or reporting for a wireless communication device. One application scenario is wireless communication device mobility, such as a generic handover or mobility due to other causes, such as load balancing between radio cells, wherein the source network node and the target network node of a handover event for a wireless communication device can determine whether/how to configure the wireless communication device for LAAI storing/logging and/or reporting prior to, during, and/or after the handover event. In particular, the source network node and the target network node can determine to, e.g.:

- Configure the wireless communication device to log/store LAAI associated to the source network node. In this case, LAAI is collected when the wireless communication device is still connected to the source network node prior to and/or during the handover, and can then be transmitted to the target network node once a new connection is established between the wireless communication device and the target network node, and/or
- Configure the wireless communication device to log/store LAAI associated to the target network node. In this case, the wireless communication device is pre-configured by the source network node to collect LAAI when a connection is established with the target network node, thereby configuring the wireless communication device to collect LAAI during and/or after the handover event. The target network node can then optionally further configure the wireless communication device to report the collected LAAI in specific resources and/or with a specific format.

Embodiments of a method executed by a first network node (e.g., a source network node) in a communication network for configuring link adaptation assistance information (LAAI) logging/storing at a wireless communication device are disclosed herein. In one embodiment, the method comprises:

- Receiving a FIRST CONFIGURATION message from a second network node (e.g., a target network node) associated to the wireless communication device connected to the first network node.
- Determining a LAAI CONFIGURATION for the wireless communication device based on the FIRST CONFIGURATION message.
- Transmitting a LAAI CONFIGURATION message to the wireless communication device comprising the LAAI CONFIGURATION.

Additional signaling embodiments for the first network node:

- Transmitting an indication of one or more device capabilities of the wireless communication device for link adaptation assistance to the second network node.
    - In one embodiment, the indication transmitted as part of a handover request.

Embodiments of a method executed by a second network node (e.g., a target network node) in a communication network for configuring link adaptation assistance information collection at a wireless communication device are also disclosed herein. In one embodiment, the method comprises:

- Transmitting a link adaptation assistance information request to a first network node (e.g., a source network node) associated to a wireless communication device connected to the first network node.

In addition, the method executed by the second network node may further include one or more of the following:

- Receiving an indication of one or more capabilities of the wireless communication device for link adaptation assistance from the first network node.
    - In one embodiment, the indication received as part of a handover preparation (e.g., in the handover request message).
- The request message transmitted as part of a handover response.

Additional details about these methods and the associated messages are described in Section 2.3.

Embodiments of systems and methods for two network nodes to coordinate and determine a configuration for storing/logging and/or reporting LAAI for a wireless communication device, e.g., to support ML/AI-driven link adaptation at the RAN node (e.g., for both training and inference). One application scenario is the case of wireless communication device mobility between a source network node and a target network node. In this case, prior to the mobility event, the source network node and the target network node can negotiate/coordinate a configuration for the wireless communication device to store/log information associated to link adaptation. The wireless communication device can then be configured to log/store LAAI prior to, during, and/or after the mobility event, thereby efficiently collecting LAAI associated to the source network node and/or the target network node, which can be reported to the target network node after successfully completing the mobility event and can be used to, e.g., optimize ML/AI driven link adaptation for the wireless communication device at the target network node.

Certain embodiments may provide one or more of the following technical advantage(s). Embodiments of the systems and methods disclosed herein aim at solving shortcoming with existing link adaptation algorithms by enabling two network nodes to coordinate and determine a configuration for storing/logging and/or reporting Link Adaptation Assistance Information (LAAI) for a wireless communication device to support, e.g., ML/AI-driven link adaptation at the RAN node (for both training and inference).

Embodiments of the systems and methods disclosed herein allow the source network node of a mobility event for a wireless communication device to configure the wireless communication device to store/log link adaptation assistance information, associated to the communication with the first network node, prior to or during the mobility event. Therefore, one advantage of the embodiments disclosed herein is to enable the target network node of a handover event to acquire link adaptation assistance information associated to one or more wireless communication devices that are handed over by the source network node. As such, the target network node can configure optimal link adaptation parameters for communicating with the wireless communication devices handed over avoiding long transient of existing link adaptation algorithms, thereby yielding improved spectral efficiency and throughput for the individual wireless communication devices and the system as a whole.

Another advantage is to enable a network node to collect LAAI from wireless communication devices associated to prior communication links with other network nodes. This enables the network node to use ML/AI to learn a more general link adaptation algorithm by using data associated to wireless communication devices when connected to other network nodes. This has the advantage to enable the network node to learn and optimize the configuration of link adaptation parameters (e.g., what modulation order, code rate or MCS index) to configure in communications with any of the wireless communication devices connected to its radio cells. When combined with an algorithm that optimizes link adaptation by directly choosing modulation order, code rate, and MCS index without aiming to guarantee a specific BLER target, the embodiments disclosed herein allow faster and more accurate configuration of the link adaptation parameters compared to prior art, thereby resulting in better performance in terms of throughput and latency.

Now, a description of various aspects of the present disclosure will be described. While these aspects are described under separate headings, the embodiments described below may be combined in any suitable manner or used separately.

Figure 26:
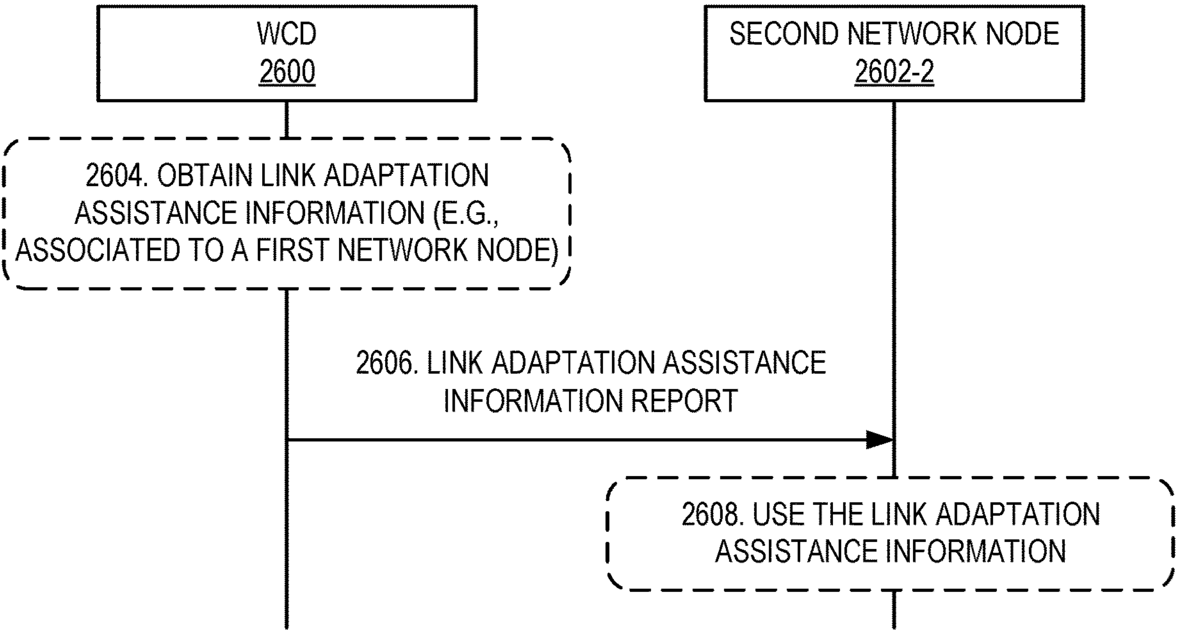
FIG. 26 illustrates the operation of a wireless communication device and a first network node in accordance with some embodiments of the present disclosure.

2.1 Embodiments Related to Reporting Link Adaptation Assistance Information to a Target Network Node 2.1.1 Embodiments at a Network Node FIG. 26 illustrates a procedure in which a wireless communication device 2600 provides link adaptation assistance information associated to a first network node (not show, see, e.g., first network node 2602-1 in FIG. 27) to a second network node 2602-2 in accordance with some embodiments of the present disclosure. Optional steps are represented by dashed lines/boxes. The wireless communication device 2600 may be, e.g., one of the wireless communication devices 1112 of FIG. 11. The second network node 2602-2 may be a RAN node (e.g., a base station 1102 or a network node that performs as least some of the functionality of a base station 1102). In one embodiment, the second network node 2602-2 is a target network node (e.g., a target RAN node) for a mobility event for the wireless communication device 2600. As illustrated, the steps of the procedure of FIG. 26 are as follows:

Step 2604 (Optional): The wireless communication device 2600 obtains link adaptation assistance information associated to a first network node (e.g., a first RAN node). The first network node may be, e.g., a source network node (e.g., a source RAN node) for a mobility event of the wireless communication device 2600. The details of the different types of link additional assistance information that may be obtained are described below. The manner in which the assistance information is obtained by the wireless communication device 2600 may depend on the type(s) of link adaptation assistance information. In one embodiment, the wireless communication device 2600 obtains the link adaptation assistance information during its normal operation in association with the first network node.

Step 2606: The wireless communication device 2600 transmits a link adaptation assistance information report message to the second network node 2602-2, and the second network node 2602-2 receives, the link adaptation assistance information report message from the wireless communication device 2600. The link adaptation assistance information report message comprises link adaptation assistance information associated to the first network node (e.g., includes some if not all of the link adaptation assistance information obtained in step 2604).

Step 2608 (Optional): The second network node 2602-2 uses the link adaptation assistance information. For example, the second network node 2602-2 may use the link adaptation assistance information to learn (e.g., train) a link adaptation model and/or to provide a warm-start for link adaptation for the wireless communication device 2600 in a cell controlled by the second network node 2602-2.

Thus, FIG. 26 provides an illustration of an embodiment of a method in which the second network node 2602-2 receives a link adaptation assistance information report message from the wireless communication device 2600, where this report message comprises link adaptation assistance information associated to a first network node. The reported link adaptation assistance information may comprise, for instance, link adaptation configuration parameters configured by the first network node for user-plane transmission/reception to/from the wireless communication device 2600, as well as one or more indicators of the user-plane transmission/reception performance between the first network node and the wireless communication device associated to the link adaptation parameters selected by the first network node for the wireless communication device.

Figure 27:
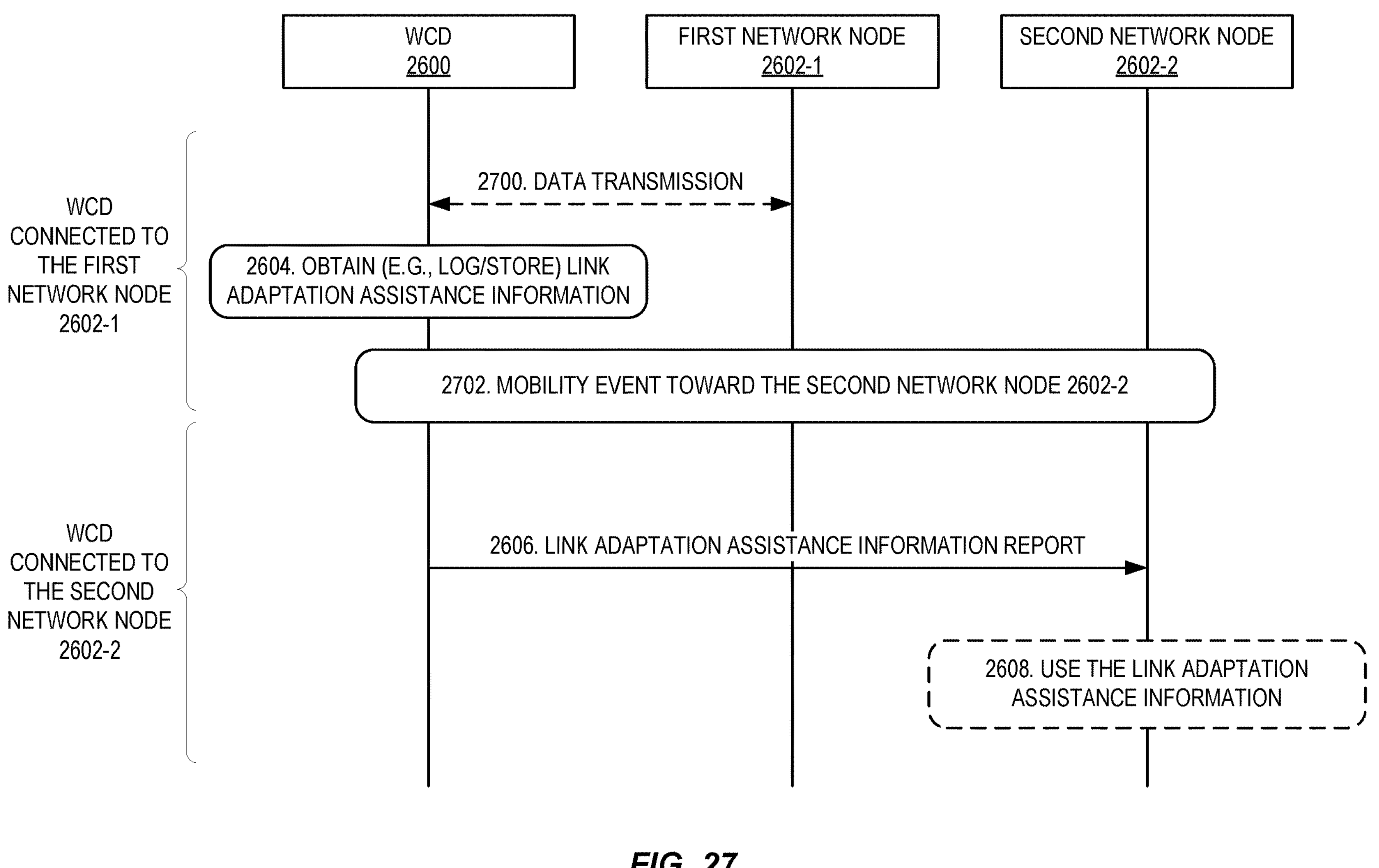
FIG. 27 illustrates another embodiment of the procedure of FIG. 26 in which the link adaptation assistance information report message is sent from the wireless communication device to the first network node during a mobility event in accordance with some embodiments of the present disclosure.

FIG. 27 illustrates another embodiment of the procedure of FIG. 26 in which the link adaptation assistance information report message is sent from the wireless communication device 2600 to the second network node 2602-2 during a mobility event in accordance with some embodiments of the present disclosure. This example embodiment shows that while the wireless communication device 2600 is initially connected to the first network node 2602-1 (e.g., with an active RRC connection), the wireless communication device 2600 may transmit and/or receive user plane data to/from the first network node 2602-1 (step 2700). In addition, the wireless communication device 2600 may obtain link adaptation assistance information by collecting/storing link adaptation assistance information associated to user data plane transmission/reception to/from the first network node 2602-1 (step 2604). In this example, the first network node 2602-1 represents the source network node of a mobility event, whereas the second network node 2602-2 represents the target network node of the mobility event. Upon successfully completing a mobility event toward the second network node 2602-2 (step 2702), the wireless communication device 2600 reports the stored/logged link adaptation assistance information associated to its previous communication with the first network node 2602-1 (step 2606).

The second network node 2602-2 may then use the reported link adaptation assistance information (step 2608), e.g., to efficiently and rapidly optimize the configuration of link adaptation parameters for the wireless communication device 2600. In fact, since the wireless communication device 2600 has logged the reported information prior to and/or during the mobility event, it is reasonable to assume that the reported information is associated to channel conditions that have similarities and correlation with the channel conditions experienced by the wireless communication device 2600 and the second network node 2602-2 immediately after the completion of the mobility event. In one example, machine learning or artificial intelligence (ML/AI) techniques could be used by the second network node 2602-2 to select link adaptation parameters for the wireless communication device 2600 based on the reported link adaptation assistance information associated to the first network node 2602-1. In one example, the reported link adaptation assistance information could be used to specialize, e.g., by means of re-training, a ML/AI algorithm to the data experienced by the wireless communication device 2600. In another example, the reported link adaptation assistance information may be used to provide richer context information for inference of link adaptation parameters for the wireless communication device 2600.

2.1.1.1 Embodiments Related to Additional Signaling Aspects

Figure 28:
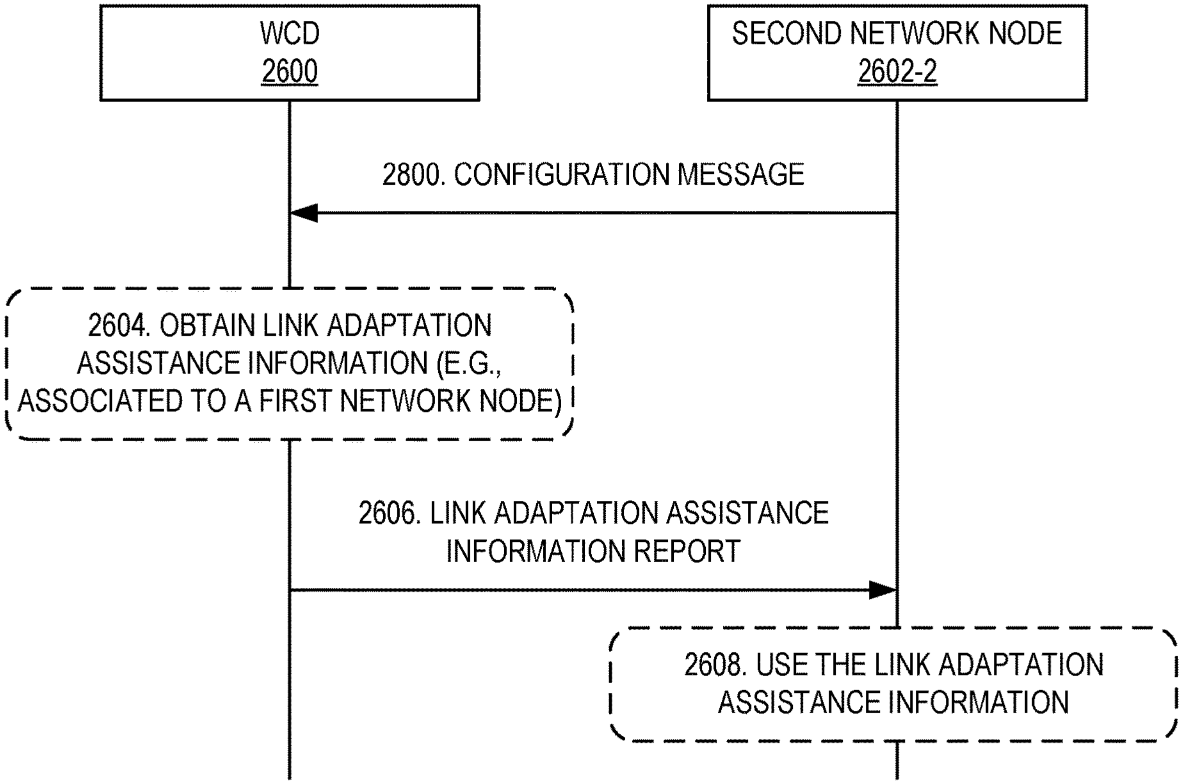
FIG. 28 illustrate another embodiment in which the process of FIG. 26 further includes the first network node sending a configuration message to the wireless communication device.

As illustrated in FIG. 28, in one embodiment, the process of FIG. 26 further comprises:

Step 2800: The second network node 2602-2 transmits a configuration message to the wireless communication device 2600 (and the wireless communication device 2600 receives the configuration message from the second network node 2602-2). The configuration message configures and/or requests the wireless communication device 2600 to report, to the second network node 2602-2, link adaptation assistance information associated to the first network node 2602-1 (not shown in FIG. 28).

Note that while the obtaining step 2604 is illustrated in FIG. 28 as being after step 2800, the procedure is not limited thereto. The obtaining step 2604 may be performed prior to and/or after the reception of the configuration message at the wireless communication device 2600 in step 2800.

Thereby, the second network node 2602-2 may receive the link adaptation assistance information report from the wireless communication device 2600 (step 2606), based on the configuration provided by the configuration message.

Figure 29:
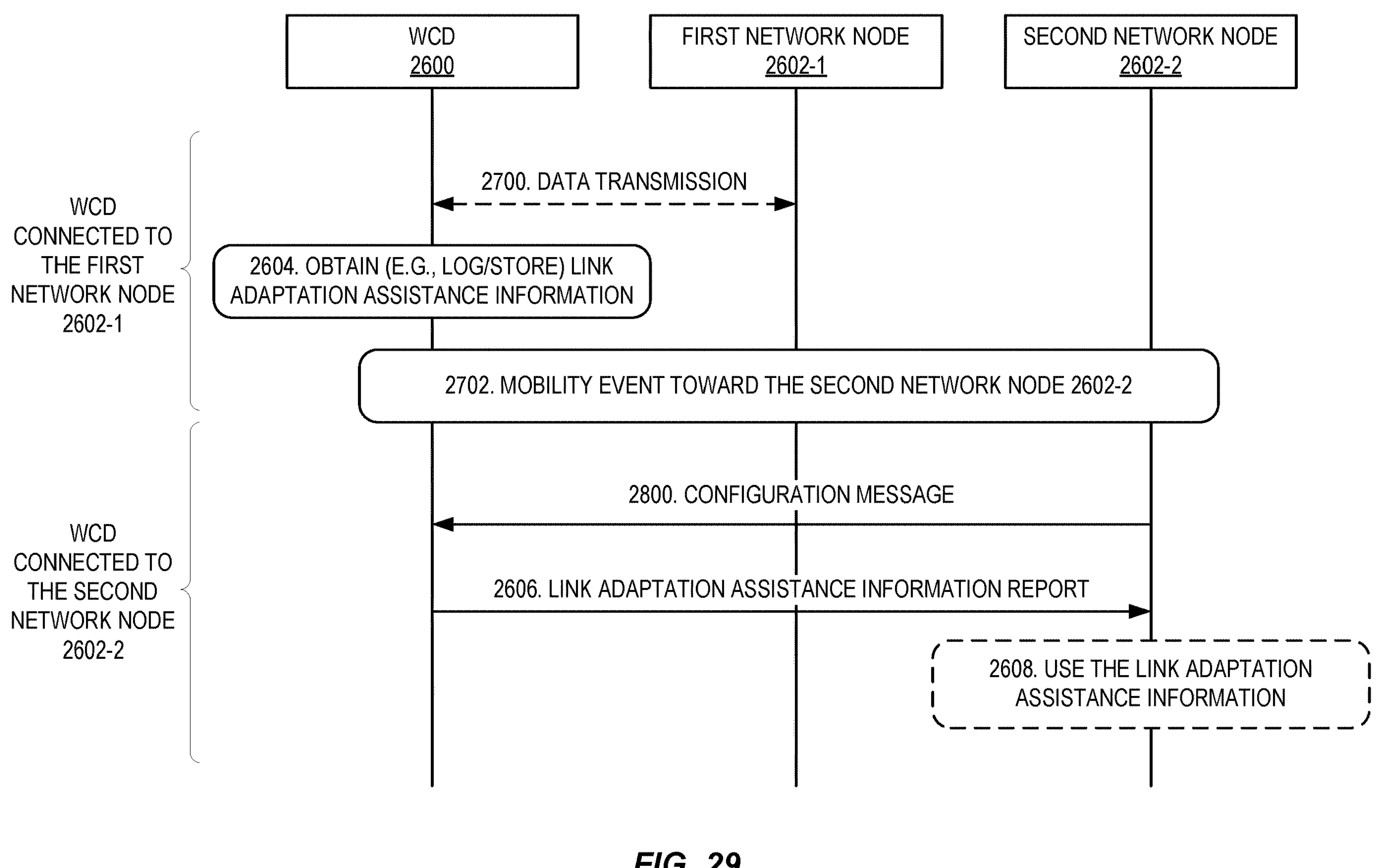
FIG. 29 illustrates another embodiment of the procedure of FIG. 27 that further includes a configuration message sent from the first network node to the wireless communication device.

In one embodiment, the second network node 2602-2 transmits the configuration message as part of a signaling procedure intended to initialize the reporting of link adaptation assistance information from the wireless communication device 2600. This reporting procedure for link adaptation assistance information may be initialized, for instance, upon the successful completion of a mobility event from the first network node (the source network node of the mobility event), as illustrated in FIG. 29. Note that FIG. 29 is a modified version of FIG. 27 that has been modified to further include the configuration message of step 2800. Therefore, in one embodiment, the second network node 2602-2 is the target network node of a mobility event associated to the wireless communication device 2600, and the first network node 2602-1 is the source network node of the mobility event. In this case, the wireless communication device 2600 may obtain (e.g., log/store) link adaptation assistance information associated to the source network node (i.e., the first network node 2602-1) prior to and/or during the mobility event. The target network node (i.e., the second network node 2602-2) can then configure and/or request the wireless communication device 2600 to report link adaptation assistance information associated to the source network node (i.e., the first network node 2602-1) once the wireless communication device has moved or while it is moving to the target network node.

Thereby, in one possible implementation, the reporting procedure for link adaptation assistance information may be initialized by means of pre-existing signaling methods, such as the random-access procedure used by the wireless communication device 2600 to set up a RRC connection with the target network node (i.e., the second network node 2602-2).

In one embodiment, the second network node 2602-2 transmits the configuration message within one or more random-access messages. In one example, the entire or a part of the configuration message is comprised within a PRACH response message (also known as message-2) of the random-access procedure of an LTE-A or NG-RAN system. In an alternative example, all or part of the configuration message is comprised in a RRC connection setup message (also known as message-4) of the random-access procedure of an LTE-A or NG-RAN system. This has the benefit to configure the wireless communication device 2600 to report link adaptation assistance information prior to the start of receiving user data plane transmission, such as PDSCH transmissions, from the first network node 2602-1.

Embodiments characterizing the configuration message are described below.

Figure 30:
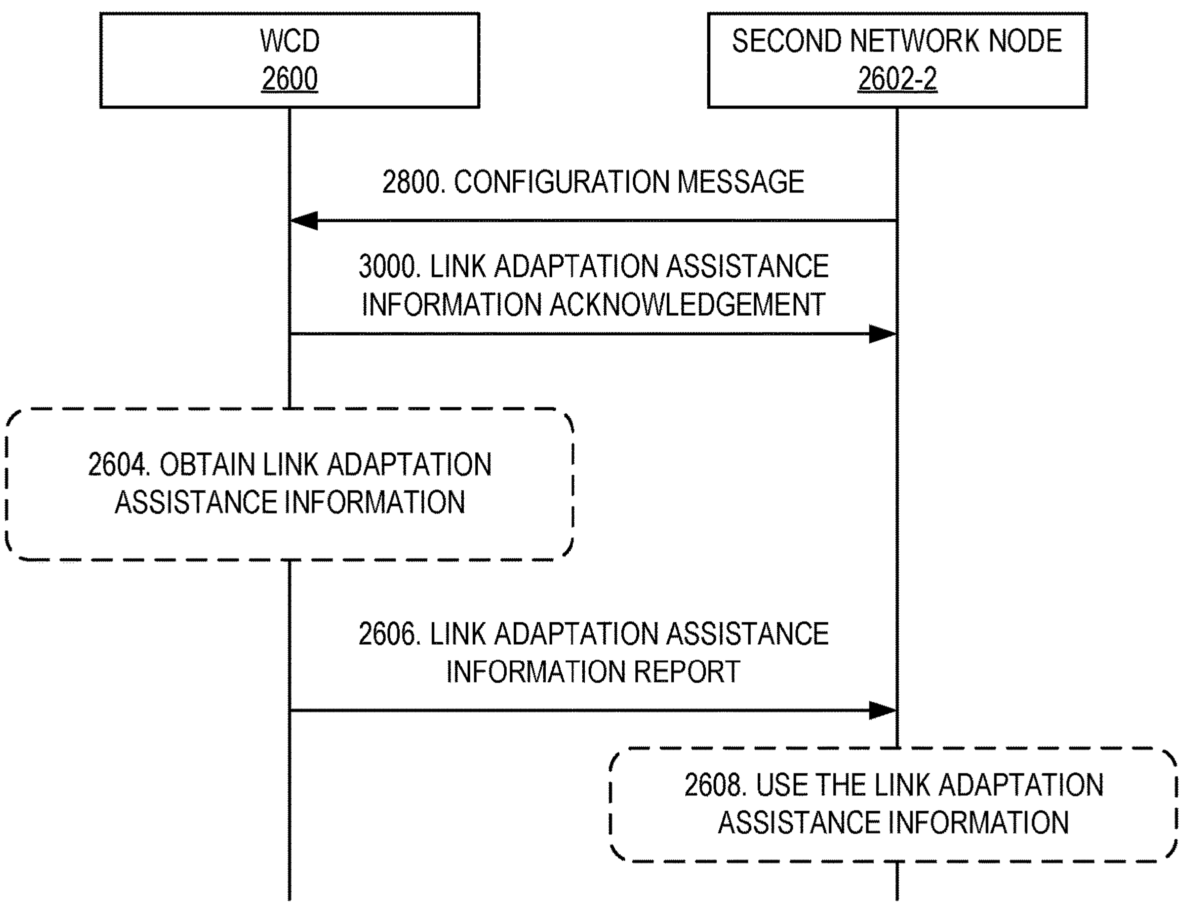
FIG. 30 illustrates another embodiment in which the process of FIG. 28 further includes an acknowledgment message.

In one embodiment, as illustrated in FIG. 30, the second network node 2602-2, upon transmitting the configuration message, may further:

receive a link adaptation assistance information acknowledgement message from the wireless communication device 2600 in response to the configuration message (step 3000).

Note that FIG. 30 is a modified version of FIG. 28 in which the wireless communication device 2600 transmits, and the second network node 2602-2 receives, the link adaptation assistance information acknowledgement message.

In one example embodiment, the link adaptation assistance information acknowledgement message may indicate, to the second network node 2602-2, that the wireless communication device 2600 can fulfil the request or configuration to report link adaptation assistance information (associated to the first network node 2602-1) either fully or at least in part. Fulfilling the request or the configuration only in part may mean that some of the link adaptation assistance information requested or configured by the second network node 2602-2 with the configuration message may not be available at the wireless communication device 2600 and/or that the information is not available in a requested or configured format (e.g., granularity in time and/or frequency and/or spatial domain).

If the request or configuration for reporting of link adaptation assistance information can only be fulfilled in part, the link adaptation assistance information acknowledgement may additionally indicate which link adaptation assistance information the wireless communication device 2600 can report to the second network node 2602-2 and/or what format the wireless communication device 2600 can report the information with (e.g., granularity in time and/or frequency and/or spatial domain).

In embodiment, the second network node 2602-2 receives the link adaptation assistance information acknowledgment message as part of a pre-existing signal/message (such as a legacy signal/message) supporting other operations, procedures, or functions between the second network node 2602-2 and the wireless communication device 2600. In one example, the second network node 2602-2 receives a link adaptation assistance information acknowledgment message as part of a random-access message, such as the RRC connection request message (also known as PRACH message-3) received by the second network node 2602-2 as part of the random-access procedure of an LTE-A or NG-RAN system.

Figure 31:
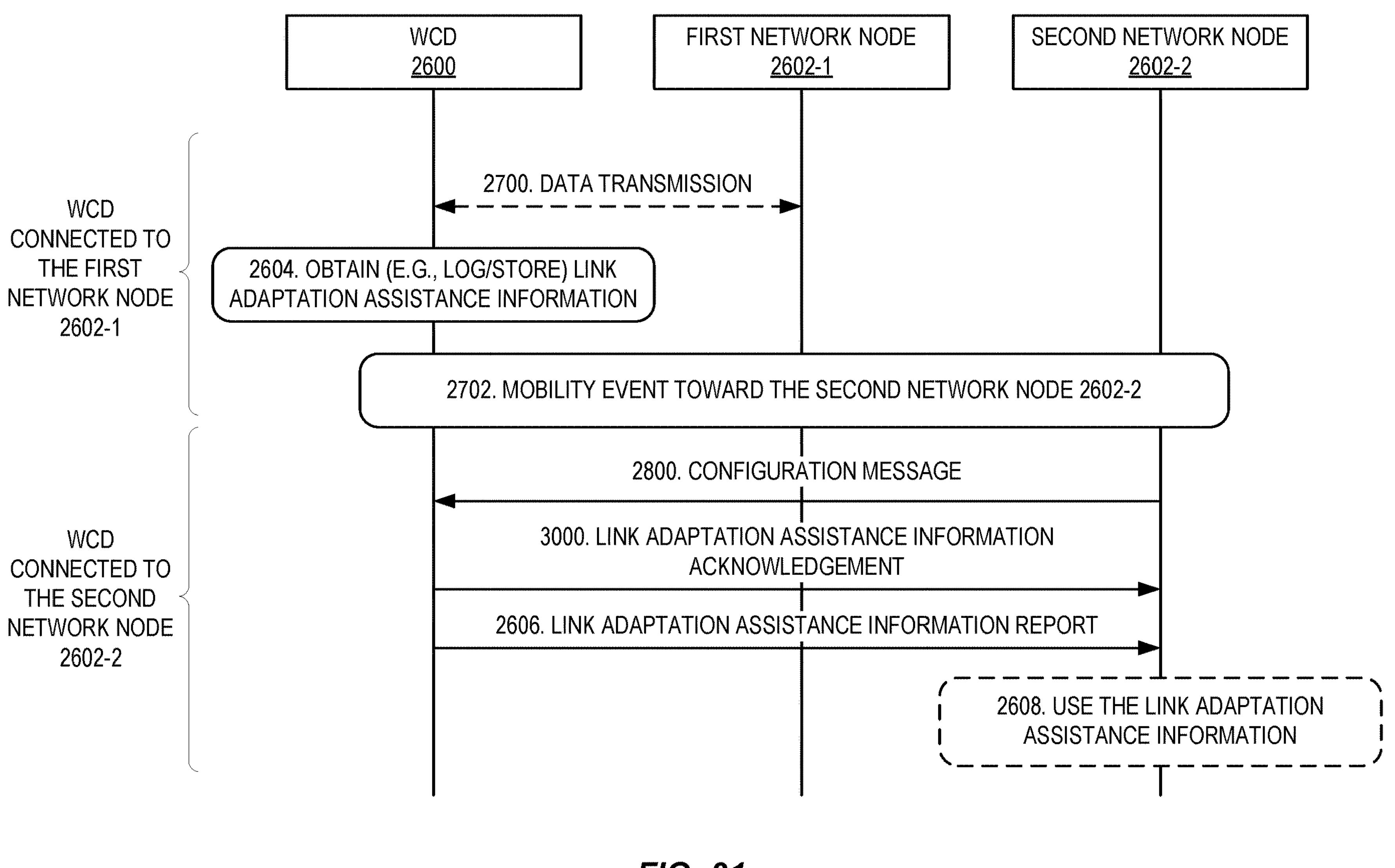
FIG. 31 illustrates another embodiment in which the process of FIG. 29 further includes an acknowledgment message.

FIG. 31 illustrates an example embodiment that is a modified version of the embodiment of FIG. 29 in which the procedure is modified to further include the link adaptation assistance information acknowledgement message of step 3000. More specifically, upon a successful mobility event of the wireless communication device 2600 to the second network node 2602-2 (i.e., the target network node of the mobility event), the second network node 2602-2 transmits a configuration message to the wireless communication device 2600 to configure/request link adaptation assistance information associated to the first network node 2602-1 (i.e., the source network node) (step 2800). The wireless communication device 2600 then transmits, and the second network node 2602-2 then receives, a link adaptation assistance information acknowledgment message (step 3000).

Figure 32:
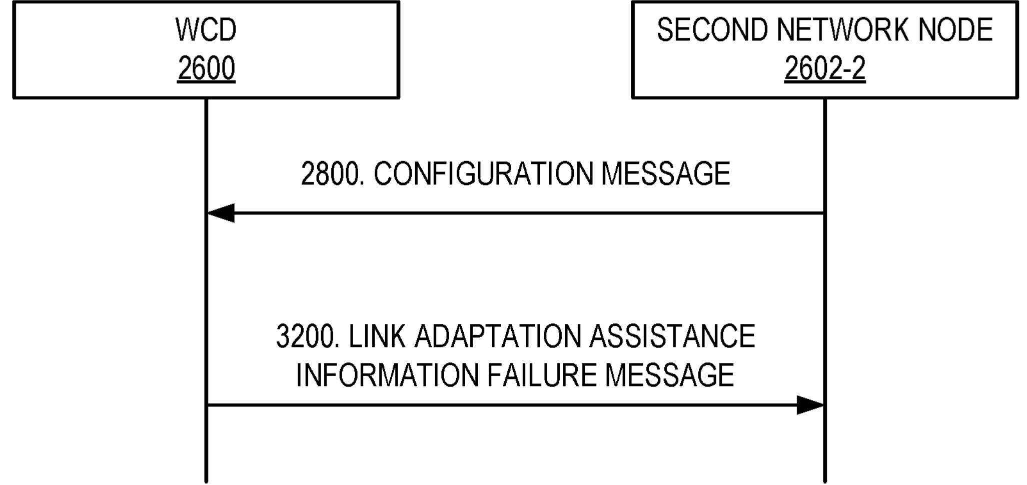
FIG. 32 illustrates another embodiment in which the process of FIG. 28 further includes failure message.

In some embodiment, rather than sending the acknowledgement in step 3000, the wireless communication device 2600 sends a failure message to, e.g., indicate an unsuccessful initialization of a link adaptation assistance information reporting procedure, that is, an unsuccessful configuration of link adaptation assistance information reporting from the wireless communication device 2600. Thus, in one embodiment, as illustrated in FIG. 32, the second network node 2602-2, upon transmitting the configuration message, may further:

- receive a link adaptation assistance information failure message from the wireless communication device 2600 in response to the configuration message (step 3200).

In one example, the link adaptation assistance information failure message may indicate an unsuccessful initialization of a link adaptation assistance information reporting procedure, that is, an unsuccessful configuration of link adaptation assistance information reporting from the wireless communication device 2600. The link adaptation assistance information failure message may further indicate that the wireless communication device 2600 cannot fulfil the request for link adaptation assistance information (associated to the second network node 2602-2), either in full or in part. In one embodiment, the link adaptation assistance information failure message may additionally indicate the cause of the failure, such as that one of (or all) the requested link adaptation assistance information elements are not available or that the requested link adaptation assistance information elements are not available in the format requested by the second network node 2602-2 (e.g., granularity in time and/or frequency and/or spatial domain). In this case, the wireless communication device 2600 shall not transmit any link adaptation assistance information to the first network node 2602-1.

In one implementation of the method, the second network node 2602-2 receives the link adaptation assistance information failure message as part of the link adaptation information report message. In this case, however, the link adaptation assistance information report message shall not comprise any additional link adaptation assistance information.

In one embodiment, the second network node 2602-2 receives a link adaptation assistance information failure message as part of a pre-existing signal/message (such as a legacy signal/message) supporting other operations, procedures, or functions between the second network node 2602-2 and the wireless communication device 2600. In one example, the second network node 2602-2 receives a link adaptation assistance information failure message as part of a random-access message, such as the RRC connection request message (also known as PRACH message-3) received by the second network node 2602-2 as part of the random-access procedure of an LTE-A or NG-RAN system.

2.1.1.2 Embodiments Related to the Configuration Message

In one embodiment, the configuration message configures the wireless communication device 2600 to report to the second network node 2602-2 link adaptation assistance information associated to the first network node 2602-1.

In one embodiment, the configuration message requests the wireless communication device 2600 to report to the second network node 2602-2 link adaptation assistance information associated to the first network node 2602-1.

In one embodiment, the configuration message requests, from the wireless communication device 2600, the availability, at the wireless communication device 2600, of link adaptation assistance information associated to the first network node 2602-1.

Thereby, in one embodiment, the configuration message may comprise one or more of the following:

- a request for availability, at the wireless communication device 2600, of link adaptation assistance information associated to at least a first network node 2602-1,
- a list of requested link adaptation assistance information associated at least another network node, such as the first network node 2602-1, required by the second network node 2602-2,
- a list of configured link adaptation assistance information associated at least another network node, such as the first network node 2602-1, to be reported to the second network node 2602-2,
- a request for availability, at the wireless communication device 2600, of link adaptation assistance information associated to at least the second network node 2602-2,
- a list of requested link adaptation assistance information associated at least the second network node 2602-2 required by the second network node 2602-2,
- a list of configured link adaptation assistance information associated at least the second network node 2602-2 to be reported to the second network node 2602-2,
- one or more resource configuration information to report link adaptation assistance information,
- a configuration format for at least one of the link adaptation assistance information requested or configured by the configuration message.

When the configuration message only comprises a request for availability of link adaptation information at the wireless communication device 2600, the second network node 2602-2 may additionally transmit a second configuration message to the wireless communication device 2600 to configure the wireless communication device 2600 to report link adaptation assistance information.

In one embodiment, the link adaptation assistance information requested or configured with the configuration message may comprise one or more of the following:

- a list of link adaptation parameters associated to at least a communication session/link between the wireless communication device 2600 and the first network node 2602-1,
- a list of one or more link adaptation state information associated to at least a communication session/link between the user device and the first network node 2602-1.

2.1.1.2.1 Configuration of Link Adaptation Parameters to be Reported

In one embodiment, the configuration message requests or configures the wireless communication device 2600 to report one or more link adaptation parameters associated to one or more communication instances with the first network node 2602-1. The one or more link adaptation parameters may include one or more of the following:

- a list of link adaptation parameters configured by the first network node 2602-1 in one or more communication instances (e.g., in uplink and/or in downlink) with the wireless communication device 2600.
- A list of link adaptation parameters estimated or recommended by the wireless communication device 2600 for one or more communication instances with the second network node 2602-2 (e.g., in uplink and/or in downlink).
- A list of link adaptation parameters estimated or recommended by the wireless communication device 2600 for communicating with the first network node 2602-1 (e.g., in uplink and/or in downlink).

Therefore, the link adaptation parameters requested or configured by the second network node 2602-2 with the configuration message could be associated to either or both of:

- At least a communication link (e.g., uplink or downlink) and/or one or more radio bearer between the wireless communication device 2600 and the second network node 2602-2,
- At least a communication link (e.g., uplink or downlink) and/or one or more radio bearer between the wireless communication device 2600 and the first network node 2602-1.

Hereafter, we shall adopt the terminology "link adaptation parameters" to broadly refer to either or all the aforementioned types of link adaptation parameters that the user device can be configured or requested to report, unless specified otherwise.

In one embodiment, the link adaptation parameters requested or configured to be reported may comprise one or more of the following information elements:

- A packet identifier to which the link adaptation parameters are associated to, such as a Packet Data Convergence Protocol (PDCP) identifier of the UMTS/LTE/5G systems.
- Modulation order
- Code rate
- MCS index
- Transport block size (TBS)
- Information carrying capacity (such as spectral efficiency)
- An indication of the transmission type (e.g., uplink and/or downlink)
- An indication of the transmission number such as one of:
  - An indicator indicating whether the link adaptation parameters are associated to a first transmission or to a retransmission.
  - An indicator indicating the transmission counter associated to the link adaptation parameters.

In one example, this can be realized by indicating whether the link adaptation parameters are associated to $1^{st}$ transmission, $1^{st}$ retransmission, $2^{nd}$ retransmission etc. In another example, this can be realized with an integer number in the range 0 . . . N−1, wherein N indicates the maximum number of retransmissions or transmissions for a packet.

The link adaptation assistance information may further comprise, for each or some of the estimated/preferred link adaptation parameters, one or more additional information from the following:

- The associated probability of success
- The associated uncertainty in the estimated probability of success
- The associated confidence interval for the estimated probability of success In one embodiment, the link adaptation assistance information comprises at least a set of link adaptation parameters associated to a transmission rank value. In one example, different sets of link adaptation parameters are associated to different transmission rank values. Examples of link adaptation parameters that can be reported in association with a specific transmission rank may comprise one or more of the following:

- Modulation order
- Modulation and coding scheme (MCS) index
- Code rate
- Transport block size (TBS)
- Information carrying capacity (such as spectral efficiency)

For each link adaptation parameter, the link adaptation assistance information may comprise a set of estimated/recommended values. In one implementation, this is realized by listing all the values. In an alternative implementation, this is realized by indicating a range of estimated/recommended values. In one exemplifying case, the set of estimated/recommended values may be represented by a starting value and an ending value. In another example, the set of estimated/recommended values may be represented by a starting value the length of the range of values.

In one embodiment, the link adaptation assistance information may comprise a set of link adaptation parameters (such as MCS index value, modulation order, code rate, etc.) reported according to one or more reporting granularity in frequency domain and/or time domain and/or spatial domain, such as:

- Per Wideband
- Per sub-band
- Per physical resource block (PRB)
- Per resource block group (RBG), wherein an RBG may comprise a group of PRBs
- Per resource element (RE)
- Per bandwidth part (BWP)
- Per bandwidth segment
- Per SSB beam coverage area
- Per CSI-RS beam coverage area
- Per transmission time interval (TTI), such as for one or a group for TTIs
- Per transmission time window (i.e., the reported information is associated to a certain time interval)
- Per packet transmission
- Per group of packets (e.g., starting packet and number of packets)
- A combination of at least one frequency or spatial or time granularity 2.1.1.2.2 Link Adaptation State Information In one embodiment, the configuration message may configure or request the wireless communication device 2600 to report one or more link adaptation state information associated to

- At least a communication link (e.g., uplink or downlink) and/or one or more radio bearer between the wireless communication device 2600 and the first network node 2602-1.

In one embodiment, the configuration message may configure or request the wireless communication device 2600 to report link adaptation state information comprising one or more measurements and/or predictions/estimates of the channel state between the wireless communication device 2600 and the first network node 2602-1, in the group of:

- Channel Quality Indicator (CQI),
- Transmission rank,
- Precoding matrix indicator (PMI),
- Signal-to-Noise ratio (SNR),
- Signal-to-interference-plus-Noise ratio (SINR).

Quality of experience (QoE)

In addition, configuration message may configure or request the wireless communication device 2600 to report at least an indication of one or more uncertainty measure for one or more measurements and/or predictions of the channel state. Examples of uncertainty metrics include, for instance, first and second statistical moments, such as average, variance, and standard deviation.

In one embodiment, the configuration message may configure or request the wireless communication device 2600 to log/store link adaptation state information comprising one or more indication of the mobility state of the wireless communication device 2600, such as one or more of the following:

Velocity,

Acceleration,

Location,

Mobility indicator,

In one example, the mobility indicator may further indicate the type of mobility, such as whether the wireless communication device 2600 is a static device (e.g., if its velocity is below a certain threshold), a low speed device (e.g., if its velocity exceeds or is below a second threshold), a medium speed device (e.g., if its velocity exceeds or is below a third threshold), a high velocity device (e.g., if its velocity exceeds or is below a second threshold), etc. In one example, the type of mobility of the wireless communication device 2600 could be indicated by an increasing range of integer number, for instance, with zero indicating a static user and 1, 2, 3 etc. indicating users with increasing velocity.

In one embodiment, the configuration message may configure or request the wireless communication device 2600 to report link adaptation state information comprising one or more indication the channel fading experienced by the wireless communication device 2600. For instance, the wireless communication device 2600 may report the type of fading experienced, such as slow fading, shadow fading or fast fading, the magnitude of the fading event experienced, the length/duration of the fading event, the frequency of the fading event, etc.

In one embodiment, the configuration message may configure or request the wireless communication device 2600 to report link adaptation state information comprising one or more indication of the interference experienced by the wireless communication device 2600, which may comprise measurements and or predictions of different types of interference metrics, such as the maximum/peak, minimum, average interference measured over a set of time-frequency resource, as well as second statistical moments of interference measured of predicted, such as standard deviation or variance.

In one embodiment, the configuration message may configure or request the wireless communication device 2600 to report link adaptation state information comprising one or more measurements of the downlink data transmission performance in at least a previous transmission time interval (TTI) or group of TTIs with the first network node 2602-1. The downlink transmission performance measurements may include, for instance, an indication of the fraction of successfully or unsuccessfully decoded date in a transmission, and/or one or more cumulative downlink performance indicators associated to the transmission of a group of data packets, such as first and second statistical moments of successfully or unsuccessfully decoded date in group of transmissions (e.g., in a group of TTIs). In one example, the state of the downlink data transmission may indicate one or more cumulative downlink performance indicators associated to the transmission of a group data packets including, for instance one or more statistical information of the downlink transmission state in the group of:

- First statistical momentum (e.g., mean, average) of the amount or the fraction of data correctly or incorrectly received or decoded for a group of data packets received from the first network node 2602-1.
- Second statistical momentum (e.g., standard deviation, variance) of the amount or the fraction of data correctly or incorrectly received or decoded for a group of data packets received from the first network node 2602-1.
- Maximum and/or minimum amount or fraction of data correctly or incorrectly received or decoded for a group of data packets received from the first network node 2602-1.

In one embodiment, the configuration message may configure or request the wireless communication device 2600 to report one or more user-device manufacturing information for link adaptation purposes. The user-device manufacturing information may comprise, one or more in the group of: the device model, the device manufacturer, the device receiver type, the device receiver hardware, the device chipset model, the device chipset manufacturer, the device processor type, the device processor model, the device operating system, and the device antenna model. Providing such information allow to distinguish between measurements or predictions of link adaptation state information are by different user devices in terms of hardware and software, which may affect the accuracy and uncertainly of the measurements or predations.

In one embodiment, the configuration message may configure or request the wireless communication device 2600 report one or more wireless communication device configuration information elements used for determining any of the link adaptation state information elements. In one example, the wireless communication device configuration information can be associated to algorithms used for determining any of the link adaptation state information element, such as the type of algorithms, one or more hyperparameter used to configure the algorithm (including type and value of the hyperparameters). In addition, the wireless communication device configuration information used for determining any of the link adaptation state information element may include the type of filtering operation, and the corresponding configuration values, used to determine measurements and/or estimates of link adaptation state information. This may include, for instance type of filtering and associated configuration for the computation of CSI information (such as filtered CQI), SINR, RSRP, interference measurements, etc.

2.1.1.2.3 Configuration Format of the Link Adaptation Assistance Information

In one embodiment, the configuration message may configure or request the wireless communication device 2600 to report one or more link adaptation assistance information according to one or more granularity in time and/or frequency and/or spatial domain, in the group of:

- Per Wideband
- Per sub-band
- Per physical resource block (PRB)
- Per resource block group (RBG), wherein an RBG may comprise a group of PRBs
- Per resource element (RE)
- Per bandwidth part (BWP)
- Per bandwidth segment
- Per SSB beam coverage area
- Per CSI-RS beam coverage area

- Per transmission time interval (TTI), such as for one or a group for TTIs
- Per transmission time window (i.e., the reported information is associated to a certain time interval)
- Per packet transmission
- Per group of packets (e.g., starting packet and number of packets)
- A combination of at least one frequency or spatial or time granularity 2.1.2 Embodiments at a Wireless Communication Device Embodiments of a method executed by a wireless communication device (e.g., wireless communication device 2600) in a communication network for reporting link adaptation assistance information to a second network node (e.g., second network node 2602-2) are also disclosed. Thus, as illustrated in, e.g., FIG. 26, the method comprises:

- Optionally obtaining link adaptation assistance information (step 2604), and
- Transmitting a link adaptation assistance information report message to a second network node, the report message comprising link adaptation assistance information associated to a first network node (step 2606).

FIG. 26, which is described in detail above, provides an illustration of the method wherein the wireless communication device 2600 transmits a link adaptation report message to the second network node 2602-2 comprising link adaptation assistance information associated to a first network node (e.g., first network node 2602-1). The reported link adaptation assistance information may comprise, for instance, link adaptation configuration parameters configured by the first network node for user-plane transmission/reception to/from the wireless communication device 2600, as well as one or more indicators of the user-plane transmission/reception performance between the first network node and the wireless communication device 2600 associated to the link adaptation parameters selected by the first network node for the wireless communication device 2600.

2.1.2.1 Embodiments Related to Signaling Aspects for a Wireless Communication Device In one embodiment, as illustrated in FIG. 28 described above, the wireless communication device 2600 can further:

- Receive a configuration message from the second network node 2602-2, the message configuring and or requesting the wireless communication device 2600 to report to, the second network node 2602-2, link adaptation assistance information associated to the first network node (step 2800).

Thereby, the wireless communication device 2600 can additionally

- Determine a link adaptation assistance information report associated to the first network node based on the configuration message received from the second network node 2602-2.

Thereby, the wireless communication device 2600 can determine one or more types of link adaptation assistance information associated to the first network node and to be reported to the second network node 2602-2 based on the configuration message. The wireless communication device 2600 may additionally determine the format to use for reporting link adaptation assistance information based on the configuration message.

As such, the format and type of information comprised in a link adaptation assistance information report message may be configured by the configuration message received from the second network node 2602-2. Thereby, embodiments of the method characterizing the configuration message (cf. Section 2.1.1.2.3) may further characterize the link adaptation assistance information report message in terms of:

- Type of link adaptation assistance information comprised in the report
- Format of the link adaptation assistance information comprised in the report
- Granularity (e.g., in time, frequency and spatial domains) of the link adaptation assistance information comprised in the report.

In one embodiment, the wireless communication device 2600 receives the configuration message as part of a signaling procedure intended to initialize the reporting of link adaptation assistance information from the wireless communication device 2600. This reporting procedure for link adaptation assistance information may be initialized, for instance, upon the successful completion of a mobility event from the first network node 2602-1 (the source network node of the mobility event), as illustrated in FIG. 29. In one possible implementation, the reporting procedure for link adaptation assistance information may be initialized by means of pre-existing signaling methods, such as the random-access procedure used by the wireless communication device 2600 to set up a RRC connection with the target network node (i.e., the second network node 2602-2).

In one embodiment, as illustrated in FIG. 30, the wireless communication device 2600, upon receiving the configuration message from the second network node 2602-2, may further:

- Determine whether the request for link adaptation assistance information associated to the first network node 2602-1 can be fulfilled (based on the second configuration message) (step 3000).
- Transmit a link adaptation assistance information acknowledgement message to the second network node 2602-2 (step 3000).

Embodiments characterizing the link adaptation assistance information acknowledgement message are described in Section 2.1.1.1.

In one embodiment, wireless communication device 2600 transmits a link adaptation assistance information acknowledgement message as part of a pre-existing signal/message (such as a legacy signal/message) supporting other operations, procedures, or functions between the second network node 2602-2 and the wireless communication device 2600. In one example, the wireless communication device 2600 transmits a link adaptation assistance information acknowledgment message as part of a random-access message, such as the RRC connection request message (also known as PRACH message-3) transmitted to the second network node 2602-2 as part of the random-access procedure of an LTE-A or NG-RAN system.

In one embodiment, illustrated in FIG. 32, the wireless communication device 2600, upon receiving the configuration message, may further:

- Transmit a link adaptation assistance information failure message to the first network node (step 3200).

Embodiments characterizing the link adaptation assistance information failure message are described in Section 2.1.1.1.

In one embodiment, the wireless communication device 2600 transmits a link adaptation assistance information failure message as part of a pre-existing signal/message (such as a legacy signal/message) supporting other operations, procedures, or functions between the second network node 2602-2 and the wireless communication device 2600. In one example, the wireless communication device 2600 transmits a link adaptation assistance information failure message as part of a random-access message, such as the RRC connection request message (also known as PRACH message-3) transmitted to the second network node 2602-2 as part of the random-access procedure of an LTE-A or NG-RAN system.

2.2 Embodiments Related to Configuring Link Adaptation Assistance Information Logging at a Wireless Communication Device 2.2.1 Embodiments for a Network Node Embodiments of a method executed by a first network node in a communication network for configuring a wireless communication device to store/log link adaptation assistance information are disclosed herein. In one embodiment, the method executed by the first network node comprises:

- Transmitting a configuration message to a user device, the configuration message configuring the user device to
  - Log/store link adaptation assistance information associated to the communication with the first network node; and/or
  - Report the logged/stored link adaptation assistance information to the second network node.

Figure 33:
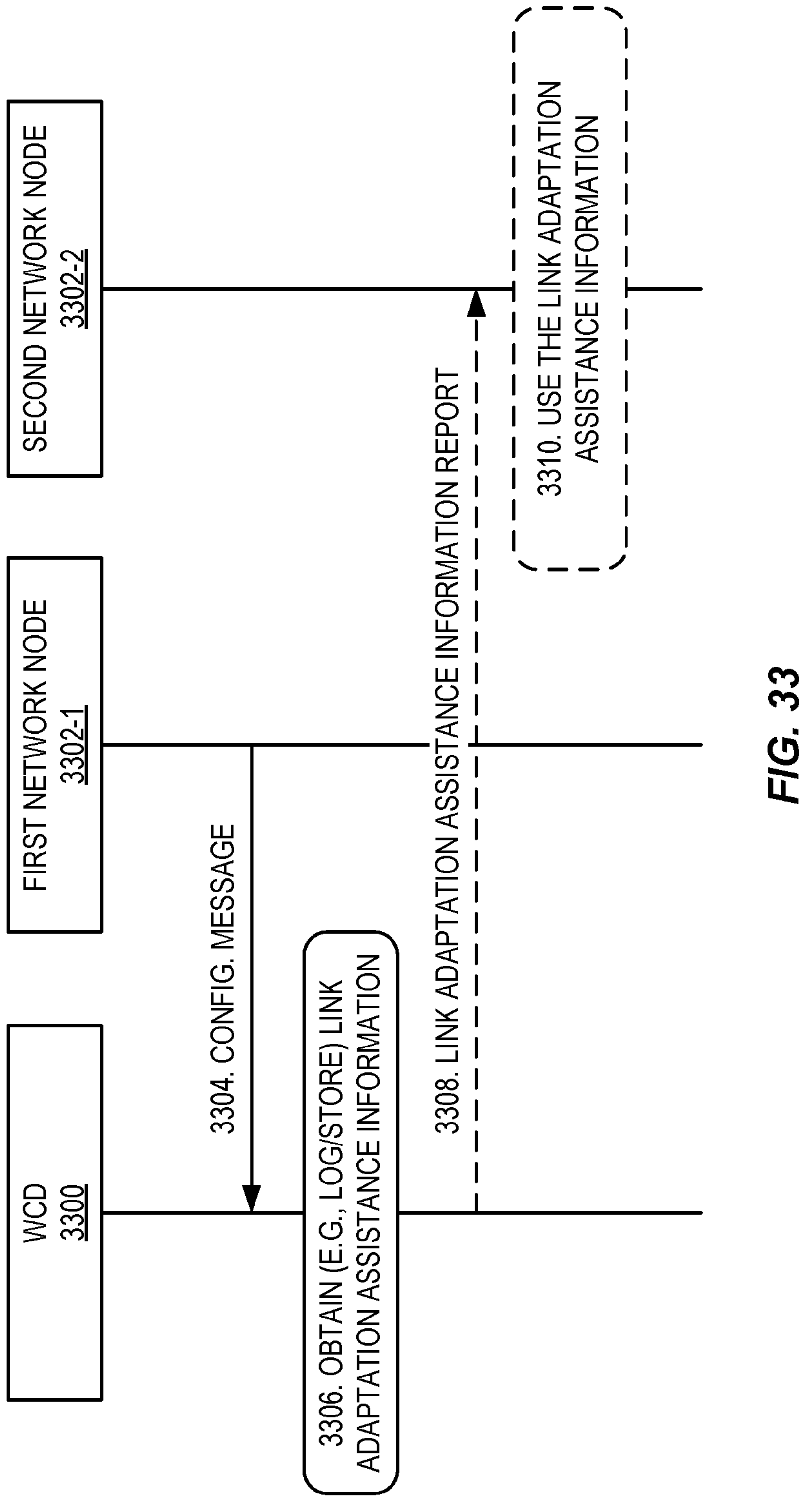
FIG. 33 illustrates the operation of a first network node, a second network node, and a wireless communication device in which the first network node transmits a configuration message to start/stop/pause or modify logging/storing of link adaptation assistance information at the wireless communication device in accordance with some embodiments of the present disclosure.

FIG. 33 illustrates the operation of a first network node 3302-1, a second network node 3302-2, and a wireless communication device 3300 in which the first network node 3302-1 transmits a configuration message to start/stop/pause or modify logging/storing of link adaptation assistance information at the wireless communication device 3300 in accordance with some embodiments of the present disclosure. In general, the link adaptation assistance information is data associated to link adaptation configuration parameters for user-plane transmission/reception to/from the first network node 3302-1. As illustrated, the first network node 3302-1 transmits, and the wireless communication device 3300 receives, a configuration message (step 3304). The configuration message configures the wireless communication device 3300 to log or store link adaptation assistance information associated to communication between the wireless communications device 3300 and the first network node 3302-1.

In addition, the configuration message configures the wireless communication device 3300 to report the logged/stored link adaptation assistance information to a second network node 3302-2. In one example, the first network node 3302-1 may configure the wireless communication device 3300, for instance, initiate the collection of data associated to link adaptation information in subsequent user-plane transmission/reception to/from the first network node 3302-1, as well as performance of user-plane transmission/reception to/from the wireless communication device 3300 associated to link adaptation parameters selected by the first network node 3302-1 for the wireless communication device 3300. In another example, the first network node 3302-1 may transmit the configuration message to modify a previous configuration associated to data collection for link adaptation related information.

The wireless communication device 3300 logs or stores the link adaptation assistance in accordance with the configuration message (step 3306). The wireless communication device 3300 sends a link adaptation assistance information report that includes some if not all of the logged/stored link adaptation assistance information to the second network node 3302-2 (step 3308). The second network node 3302-2 may use the reported link adaptation assistance information as described herein (step 3310).

In one embodiment, the first network node 3302-1 configures the wireless communication device 3300 to report the logged/stored link adaptation assistance information to the second network node 3302-2 upon a successful mobility event (such as a handover) toward the second network node 3302-2. In this way, the second network node 3302-2 (i.e., the target network node of a mobility event) is enabled to receive link adaptation assistance information from the wireless communication device 3300 which characterizes the configuration of link adaptation parameters used by the first network node 3302-1 (i.e., the source network node of the mobility event) to communicate with the wireless communication device 3300 in the last transmissions prior to the mobility event. Since during the mobility event the wireless communication device 3300 is in a transition area where the signal strength of the target network node became better than the signal strength of the source network node, the target network node can benefit from the reported link adaptation information since it can use it to optimize future communication with the wireless communication device 3300.

2.2.1.1 Embodiments Related to Signaling Aspects with First Network Node

In one embodiment, the first network node 3302-1 may transmit the configuration message to the wireless communication device 3300 based on a handover decision associated to the user device. The configuration message is therefore used to initialize the logging and storage of data associated to link adaptation configuration parameters in subsequent user-plane transmission/reception to/from the wireless communication device 3300, as well as performance of user-plane transmission/reception, prior to the handover takes place. Such information can then help the target network node of the handover event to optimize the configuration of link adaptation parameters for the wireless communication device 3300 once the handover event is successfully completed.

In one embodiment, the method executed by the first network node 3302-1 may further comprise:

- Determining whether a condition to trigger a logging/storing operation for link adaptation assistance information for the wireless communication device 3300 is fulfilled.
- Transmitting the configuration message to the wireless communication device 3300 if the condition is fulfilled.

Figure 34:
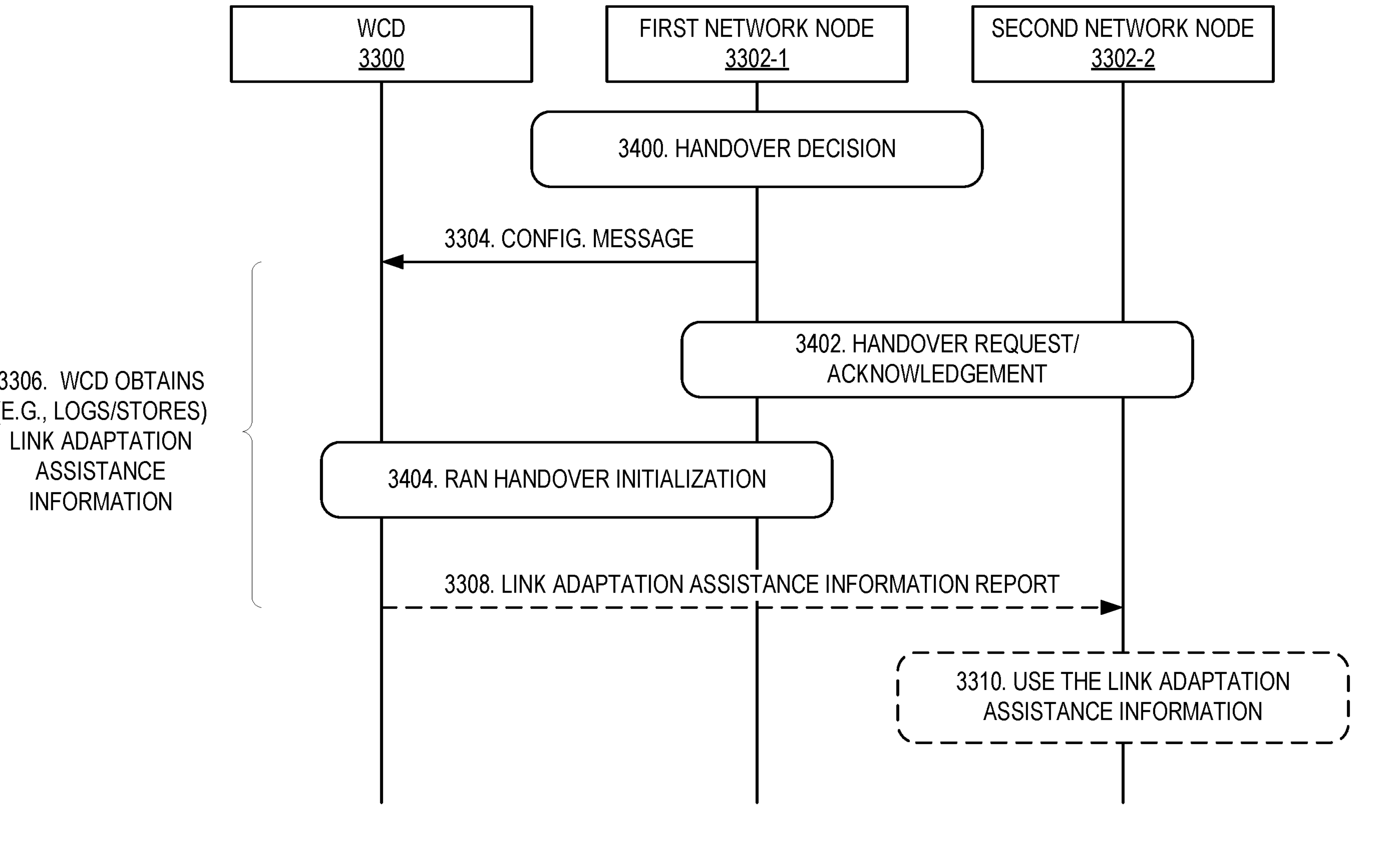
FIGS. 34 and 35 illustrate two embodiments in which the configuration message of FIG. 33 is communicated in relation to a handover event.
Figure 35:
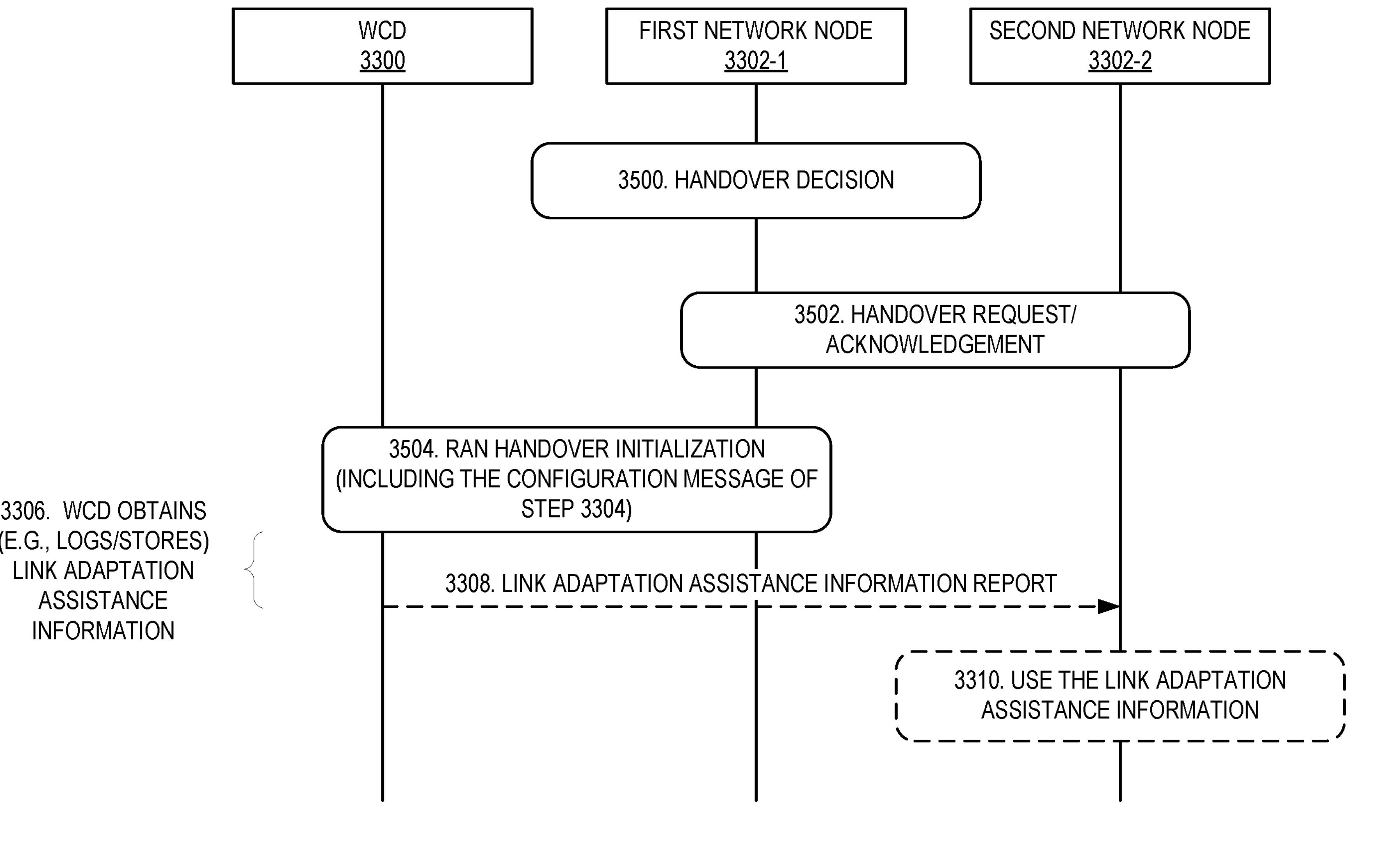

Examples of this are illustrated in FIGS. 34 and 35.

In one embodiment, the condition to trigger a logging/storing operation of link adaptation assistance information for the wireless communication device 3300 is a handover decision for the wireless communication device 3300. In other words, if the wireless communication device 3300 fulfils the conditions to trigger a handover toward a target network node (i.e., the second network node 3302-2), the first network node 3302-1 determines that the wireless communication device 3300 also fulfils the condition to trigger a logging/storing operation for link adaptation assistance information. In another embodiment, the first network node 3302-1 uses a dedicated triggering criteria to configure a logging/storing operation for link adaptation assistance information for the wireless communication device 3300. For instance, the dedicated triggering condition could allow the first network node 3302-1 to configure the logging/storing operation for link adaptation assistance information for the wireless communication device 3300 prior the conditions for a handover are met.

In one embodiment, as illustrated in FIG. 34, the method of FIG. 33 is modified to further include additional steps related to handover. As illustrated, the first network node 3302-1 makes a handover decision where it decides that the wireless communication device 3300 is to be handed over from the first network node 3302-1 to the second network node 3302-2 (step 3400). Upon making the handover decision, the first network node 3302-1 transmits the configuration message of step 3304 to the wireless communication device 3300 prior to transmitting any connection reconfiguration signal to the wireless communication device 3300 associated to a RAN handover initialization, such as a RRCReconfiguration message. This allows the first network node to configure the wireless communication device 3300 to log and store link adaptation assistance information for a longer time prior to the execution of a handover towards the second network node 3302-2 (i.e., the target network node). Thus, the wireless communication device 3300 is able to log/store link adaptation assistance information in step 3306 while a handover request and acknowledgement are sent/received between the first network node 3302-1 and the second network node 3302-2 (step 3402) and while a RAN handover initialization procedure is performed (step 3404).

In another embodiment, as illustrated in FIG. 35, the method of FIG. 33 is modified to further include additional steps related to handover. As illustrated, the first network node 3302-1 makes a handover decision where it decides that the wireless communication device 3300 is to be handed over from the first network node 3302-1 to the second network node 3302-2 (step 3500). Upon making the handover decision, the first network node 3302-1 communications with the second network node 3302-2 to send a handover request and receive a handover acknowledgement (step 3502). Then, the first network node 3302-1 transmits the configuration message of step 3304 as part of a RAN handover initialization signaling (step 3504). For instance, the first network node 3302-1 may transmit the configuration message may as part of a RRCReconfiguration message transmitted to the wireless communication device 3300 to initialize a handover event toward the second network node 3302-2.

2.2.1.2 Embodiments Related to the Configuration Message

In one embodiment, the configuration message of step 3304 configures the wireless communication device 3300 to log/store link adaptation assistance information associated to at least a communication session/link with the first network node 3302-1 (such as UL or DL user plane, and/or specific radio bearers). The configuration message may additionally configure the wireless communication device 3300 to report the logged/stored link adaptation assistance information to at least the second network node 3302-2.

The configuration message may comprise one or more of the following configuration information elements:

- the identity of at least the second network node 3302-2 to which the wireless communication device 3300 is to report the link adaptation assistance information associated to the first network node 3302-1,
- a list of link adaptation parameters associated to at least a communication session/link between the wireless communication device 3300 and the first network node 3302-1 to be logged/stored,
- a list of one or more link adaptation state information associated to at least a communication session/link between the wireless communication device 3300 and the first network node 3302-1 to be logged/stored,
- a configuration format for at least one of the link adaptation assistance information elements configured to be logged/stored.

2.2.1.2.1 Configuration of Link Adaptation Parameters to be Reported

In one embodiment, the configuration message of step 3304 configures the wireless communication device 3300 to log/store and/or report one or more link adaptation parameters. These one or more link adaptation parameters may include one or more of the following:

- a list of link adaptation parameters configured by the first network node 3302-1 in one or more communication instances (e.g., in uplink and/or in downlink) with the wireless communication device 3300,
- a list of link adaptation parameters estimated or recommended by the wireless communication device 3300 for one or more communication instances with the first network node 3302-1 (e.g., in uplink and/or in downlink),
- a list of link adaptation parameters estimated or recommended by the wireless communication device 3300 for communicating with the second network node 3302-2 (e.g., in uplink and/or in downlink).

Therefore, the link adaptation parameters configured to be logged/stored and/or reported could be associated to one or more of the following:

- at least a communication link (e.g., uplink or downlink) and/or one or more radio bearer between the wireless communication device 3300 and the first network node 3302-1,
- at least a communication link (e.g., uplink or downlink) and/or one or more radio bearer between the wireless communication device 3300 and the second network node 3302-2.

The terminology "link adaptation parameters" is adopted herein to broadly refer to either or all the aforementioned types of link adaptation parameters that the wireless communication device 3300 can be configured to log/store and/or report, unless specified otherwise.

In one embodiment, the link adaptation parameters configured be logged/stored and/or reported may comprise one or more of the following information elements:

- A packet identifier to which the link adaptation parameters are associated to, such as a Packet Data Convergence Protocol (PDCP) identifier of the UMTS/LTE/5G systems.
- Modulation order
- Code rate
- MCS index
- Transport block size (TBS)
- Information carrying capacity (such as spectral efficiency)
- An indication of the transmission type (e.g., uplink and/or downlink)
- An indication of the transmission number such as one of:
  - An indicator indicating whether the link adaptation parameters are associated to a first transmission or to a retransmission
  - An indicator indicating the transmission counter associated to the link adaptation parameters.

In one example, this can be realized by indicating whether the link adaptation parameters are associated to $1^{st}$ transmission, $1^{st}$ retransmission, $2^{nd}$ retransmission etc. In another example, this can be realized with an integer number in the range 0 . . . N−1, wherein N indicates the maximum number of retransmissions or transmissions for a packet.

The link adaptation assistance information may further comprise, for each or some of the estimated/preferred link adaptation parameters, one or more additional information in the group:

- The associated probability of success
- The associated uncertainty in the estimated probability of success
- The associated confidence interval for the estimated probability of success In one embodiment, the link adaptation assistance information comprises at least a set of link adaptation parameters associated to a transmission rank value. In one example, different sets of link adaptation parameters are associated to different transmission rank values. Examples of link adaptation parameters that can be reported in association with a specific transmission rank may comprise one or more of the following:

- Modulation order
- Modulation and coding scheme (MCS) index
- Code rate
- Transport block size (TBS)
- Information carrying capacity (such as spectral efficiency)

For each link adaptation parameter, the link adaptation assistance information may comprise a set of estimated/recommended values. In one implementation, this is realized by listing all the values. In an alternative implementation, this is realized by indicating a range of estimated/recommended values. In one exemplifying case, the set of estimated/recommended values may be represented by a starting value and an ending value. In another example, the set of estimated/recommended values may be represented by a starting value the length of the range of values.

In one embodiment, the link adaptation assistance information may comprise a set of link adaptation parameters (such as MCS index value, modulation order, code rate, etc.) reported according to one or more reporting granularity in frequency domain and/or time domain and/or spatial domain, such as:

- Per Wideband
- Per sub-band
- Per physical resource block (PRB)
- Per resource block group (RBG), wherein an RBG may comprise a group of PRBs
- Per resource element (RE)
- Per bandwidth part (BWP)
- Per bandwidth segment
- Per SSB beam coverage area
- Per CSI-RS beam coverage area
- Per transmission time interval (TTI), such as for one or a group for TTIs
- Per transmission time window (i.e., the reported information is associated to a certain time interval)
- Per packet transmission
- Per group of packets (e.g., starting packet and number of packets)
- A combination of at least one frequency or spatial or time granularity 2.2.1.2.2 Link Adaptation State Information In one embodiment, the configuration message configures the wireless communication device 3300 to log/store and/or report one or more link adaptation state information associated to:

- At least a communication link (e.g., uplink or downlink) and/or one or more radio bearer between the wireless communication device 3300 and the first network node 3302-1; and/or
- At least a communication link (e.g., uplink or downlink) and/or one or more radio bearer between the wireless communication device 3300 and the second network node 3302-2.

In one embodiment, the configuration message configures the wireless communication device 3300 to log/store and/or report link adaptation state information comprising one or more measurements and/or predictions/estimates of the channel state between the wireless communication device 3300 and the first network node 3302-1 and/or the second network node 3302-2. This may include one or more of the following:

- Channel Quality Indicator (CQI),
- Transmission rank,
- Precoding matrix indicator (PMI),
- Signal-to-Noise ratio (SNR),
- Signal-to-interference-plus-Noise ratio (SINR).
- Quality of experience (QoE)

In addition, in one embodiment, the configuration message configures the wireless communication device 3300 to log/store and/or report at least an indication of one or more uncertainty measure for one or more the stored/logged (and/or reported) measurements and/or predictions of the channel state. Examples of uncertainty metrics include, for instance, first and second statistical moments, such as average, variance, and standard deviation.

In one embodiment, the configuration message configures the wireless communication device 3300 to log/store and/or report link adaptation state information comprising one or more indications of a mobility state of the wireless communication device 3300, such as, e.g., one or more of the following:

- Velocity,
- Acceleration,
- Location,
- Mobility indicator.

In one example, the mobility indicator may further indicate the type of mobility, such as whether the wireless communication device 3300 is a static device (e.g., if its velocity is below a certain threshold), a low speed device (e.g., if its velocity exceeds or is below a second threshold), a medium speed device (e.g., if its velocity exceeds or is below a third threshold), a high velocity device (e.g., if its velocity exceeds or is below a second threshold), etc. In one example, the type of mobility of the wireless communication device 3300 could be indicated by an increasing range of integer number, for instance, with zero indicating a static user and 1, 2, 3 etc. indicating devices with increasing velocity.

In one embodiment, the configuration message configures the wireless communication device 3300 to log/store and/or report link adaptation state information comprising one or more indication the channel fading experienced by the wireless communication device 3300. For instance, the wireless communication device 3300 may report the type of fading experienced, such as slow fading, shadow fading, or fast fading, the magnitude of the fading event experienced, the length/duration of the fading event, the frequency of the fading event, etc.

In one embodiment, the configuration message configures the wireless communication device 3300 to log/store and/or report link adaptation state information comprising one or more indication of the interference experienced by the wireless communication device 3300, which may comprise measurements and or predictions of different types of interference metrics, such as the maximum/peak, minimum, average interference measured over a set of time-frequency resource, as well as second statistical moments of interference measured of predicted, such as standard deviation or variance.

In one embodiment, the configuration message configures the wireless communication device 3300 to log/store and/or report link adaptation state information comprising one or more measurements of the downlink data transmission performance in at least a previous transmission time interval (TTI) or group of TTIs with the first network node 3302-1.

The downlink transmission performance measurements may include, for instance, an indication of the fraction of successfully or unsuccessfully decoded date in a transmission, and/or one or more cumulative downlink performance indicators associated to the transmission of a group data packets, such as first and second statistical moments of successfully or unsuccessfully decoded date in group of transmissions (e.g., in a group of TTIs). In one example, the state of the downlink data transmission may indicate one or more cumulative downlink performance indicators associated to the transmission of a group of data packets including, for instance one or more statistical information of the downlink transmission state in the group of:

- First statistical momentum (e.g., mean, average) of the amount or the fraction of data correctly or incorrectly received or decoded for a group of data packets.
- Second statistical momentum (e.g., standard deviation, variance) of the amount or the fraction of data correctly or incorrectly received or decoded for a group of data packets.
- Maximum and/or minimum amount or fraction of data correctly or incorrectly received or decoded for a group of data packets.

In one embodiment, the configuration message configures the wireless communication device 3300 to log/store and/or report one or more user-device manufacturing information for link adaptation purposes. The user-device manufacturing information may comprise, one or more in the group of: the user device model, the user device manufacturer, the user device receiver type, the user device receiver hardware, the user device chipset model, the user device chipset manufacturer, the user device processor type, the user device processor model, the user device operating system and the user device antenna model. Providing such information allow to distinguish between measurements or predictions of link adaptation state information are by different user devices in terms of hardware and software, which may affect the accuracy and uncertainly of the measurements or predations.

In one embodiment, the configuration message configures the wireless communication device 3300 to log/store and/or report one or more wireless communication device configuration information used for determining any of the link adaptation state information element. In one example, the wireless communication device configuration information can be associated to algorithms used for determining any of the link adaptation state information element, such as the type of algorithms, one or more hyperparameter used to configure the algorithm (including type and value of the hyperparameters). In addition, the wireless communication device configuration information used for determining any of the link adaptation state information element may include the type of filtering operation, and the corresponding configuration values, used to determine measurements and/or estimates of link adaptation state information. This may include, for instance type of filtering and associated configuration for the computation of CSI information (such as filtered CQI), SINR, RSRP, interference measurements, etc.

2.2.1.2.3 Configuration Format of the Link Adaptation Assistance Information to be Logged/Stored In one embodiment, the configuration message configures the wireless communication device 3300 to log/store and/or report one or more link adaptation assistance information according to one or more granularity in time and/or frequency and/or spatial domain, in the group of:

- Per Wideband
- Per sub-band
- Per physical resource block (PRB)
- Per resource block group (RBG), wherein an RBG may comprise a group of PRBs
- Per resource element (RE)
- Per bandwidth part (BWP)
- Per bandwidth segment
- Per SSB beam coverage area
- Per CSI-RS beam coverage area
- Per transmission time interval (TTI), such as for one or a group for TTIs
- Per transmission time window (i.e., the reported information is associated to a certain time interval)
- Per packet transmission
- Per group of packets (e.g., starting packet and number of packets)
- A combination of at least one frequency or spatial or time granularity 2.2.2 Embodiments related to the Wireless Communication Device Embodiments of a method executed by a wireless communication device in a communication network for reporting link adaptation assistance information to a network node are also disclosed. In one embodiment, the method executed by the wireless communication device comprises:

- Receiving a configuration message from a first network node (see, e.g., step 3306 of FIG. 33), the configuration message configuring the wireless communication device to:
  - Log/store link adaptation assistance information associated to the communication with the first network node; and/or
  - Report the logged/stored link adaptation assistance information to a second network node.
- Logging link adaptation assistance information associated to at least a communication link between the wireless communication device and the first network node based on the configuration message.

FIG. 33 provides an illustration of one embodiment of this method. The detail of FIG. 33 are descried above. However, upon receiving the configuration message, the wireless communication device 3300 initializes the logging and storage operation link adaptation assistance information associated to link adaptation configuration parameters in subsequence user-plane transmission/reception to/from the first network node 3302-1, as well as performance of user-plane transmission/reception to/from the user device associated to the link adaptation parameters selected by the first network node 3302-1 for the wireless communication device 3300.

2.2.2.1 Embodiments Related to Signaling Aspects for the Wireless Communication Device In one embodiment, as illustrated in FIG. 34, when there is a handover event, the wireless communication device 3300 receives the configuration message prior to a connection reconfiguration signal associated to a RAN handover initialization, such as a RRCReconfiguration message received from the first network node 3302-1 to indicate the beginning of a handover. In this example, the configuration message is received when first network node 3302-1 determines that the wireless communication device 3300 meets the conditions to initiate a handover event. In an alternative example, the configuration message could be received before the wireless communication device 3300 meets the conditions to trigger a handover event. This allows the wireless communication device 3300 to log and collect link adaptation assistance information prior to the execution of a handover towards the target node.

In one embodiment, as illustrated in FIG. 35, the wireless communication device 3300 receives the configuration message as part of the RAN handover initialization signaling. For instance, the wireless communication device 3300 may receive the configuration message may as part of a RRCReconfiguration message that initializes a handover event toward the second network node 33092-2.

In one embodiment, the wireless communication device 3300 may additionally:

- Transmit a link adaptation assistance information report to the second network 3302-2, as illustrated in step 3308 of FIG. 33, 34, or 35.

To this end, the configuration message received from the first network node 33092-1 may additionally instruct the wireless communication device 3300 to report link adaptation assistance information to the second network node 3302-2.

2.2.2.2 Embodiments Related to Link Adaptation Assistance Information Report

The wireless communication device 3300 may additionally transmit a link adaptation assistance information report to the second network node 3302-2 comprising one or more of the link adaptation assistance information that the first network node 3302-1 configured the wireless communication device 3300 to store/log.

As such, the format and type of information comprised in a link adaptation assistance information report message may be configured by the configuration message received from the first network node 3302-1. Thereby, embodiments of the method characterizing the configuration message (cf. Section 2.2.1.2.3) may further characterize the link adaptation assistance information report message in terms of:

- Type of link adaptation assistance information comprised in the report
- Format of the link adaptation assistance information comprised in the report
- Granularity (e.g., in time, frequency and spatial domains) of the link adaptation assistance information comprised in the report 2.3 Embodiments Related to Inter-Node Configuration of Link Adaptation Assistance Information Configuration 2.3.1 Embodiments for a Network Node Systems and methods are disclosed for two network nodes to coordinate and determine a configuration for storing/logging and/or reporting Link Adaptation Assistance Information (LAAI) for a wireless communication device to, e.g., support ML/AI-driven link adaptation at the RAN node (for both training and inference). One application scenario is the case of wireless communication device mobility between a source network node and a target network node. In this case, prior to the mobility event, the source and target network nodes negotiate/coordinate a configuration for the wireless communication device to store/log information associated to link adaptation.

Figure 36:
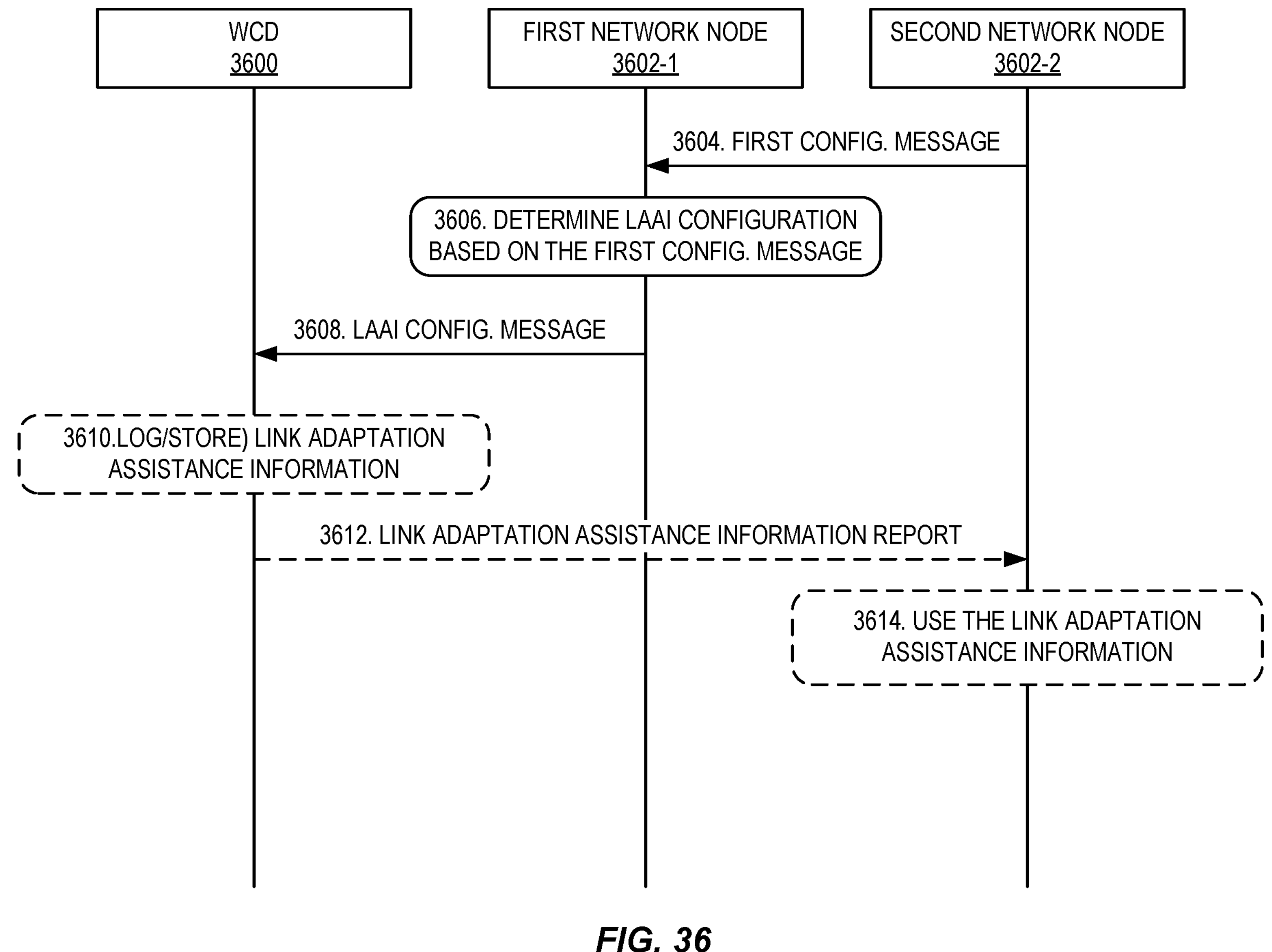
FIG. 36 illustrates the operation of a wireless communication device, a first network node, and a second network node in which the first network node and the second network node coordinate and determine a configuration for storing or logging and/or reporting of link adaptation assistance information for the wireless communication device in accordance with some embodiments of the present disclosure.

FIG. 36 illustrates the operation of a wireless communication device 3600, a first network node 3602-1, and a second network node 3602-2 in which the first network node 3602-1 and the second network node 3602-1 coordinate and determine a configuration for storing or logging and/or reporting of LAAI for the wireless communication device 3600 in accordance with some embodiments of the present disclosure. Note that optional steps are represented by dashed lines/boxes. As illustrated, this procedure includes the following:

- Step 3604: The second network node 3602-2 sends a FIRST CONFIGURATION message to the first network node 3602-1, and the first network node 3602-1 receives the FIRST CONFIGURATION message from the second network node 3602-2. The FIRST CONFIGURATION message is associated to the wireless communication device 3600, which is connected to the first network node 3602-1. The FIRST CONFIGURATION message comprises one or more information elements related to configuring the wireless communication device 3600 to store or log LAAI and/or one or more information elements related to configuring the wireless communication device 3600 to report (the stored or logged) LAAI, e.g., to the second network node 3602-1.
- Step 3606: The first network node 3602-1 determines a LAAI CONFIGURATION for the wireless communication device 3600 based on the FIRST CONFIGURATION message.
- Step 3608: The first network node 3602-1 transmits a LAAI CONFIGURATION message, which comprises the LAAI CONFIGURATION, to the wireless communication device 3600.
- Step 3610: The wireless communication device 3600 stores or logs LAAI (e.g., in accordance with the LAAI CONFIGURATION in embodiments in which the LAAI CONFIGURATION message includes information elements related to storing or reporting LAAI).
- Step 3612: The wireless communication device 3600 transmits a LAAI report to, in this example, the second network node 3602-2 (e.g., in accordance with the LAAI CONFIGURATION in embodiments in which the LAAI CONFIGURATION message includes information elements related to storing or reporting LAAI).
- Step 3614: The second network node 3602-2 may use the reported LAAI as described herein (e.g., to train or develop a ML or AI scheme for link adaptation, to warm-start the link adaptation parameters after a mobility event in which the wireless communication device 3600 is handed over to the second network node 3602-2, or the like).

Detailed descriptions of the FIRST CONFIGURATION message and the LAAI CONFIGURATION are described below in Section 2.3.1.3 and 2.3.1.4, respectively.

In an exemplifying case, the wireless communication device 3600 can be considered connected to the first network node 3602-1 if one or more of the following conditions are satisfied:

- The wireless communication device 3600 is in has a RRC connection with the first network node 3602-1. For example, the wireless communication device 3600 may be in RRC_CONNECTED state upon successfully completing a random-access procedure in one radio cell of the first network node 3602-1. The RRC connection with the first network node 3602-1 may additionally be active or inactive.
- The wireless communication device 3600 is camping in the coverage area of a radio cell controlled by the first network node 3602-1, wherein the coverage area of a radio cell is defined, for instance by the coverage area of at least one downlink reference signal transmitted by the first network node 3602-1. In alternative, the wireless communication device 3600 may be considered as camping in the coverage area of a cell of the first network node 3602-1 if the first network node 3602-1 can receive at least an uplink reference signal from the wireless communication device 3600.
- The wireless communication device 3600 has a user plane connection with the first network node 3602-1.

The wireless communication device 3600 is served by the first network node 3602-1.

In one embodiment, the first network node 3602-1 may additionally:

transmit a SECOND CONFIGURATION message to the second network node 3602-2, where the SECOND CONFIGURATION message comprises information associated to configuring the wireless communication device 3600 connected to the first network node 3602-1 for LAAI logging/storing and/or LAAI reporting. In one embodiment, the SECOND CONFIGURATION message indicates the capability of the wireless communication device 3600 to store/log and/or report LAAI.

Figure 37:
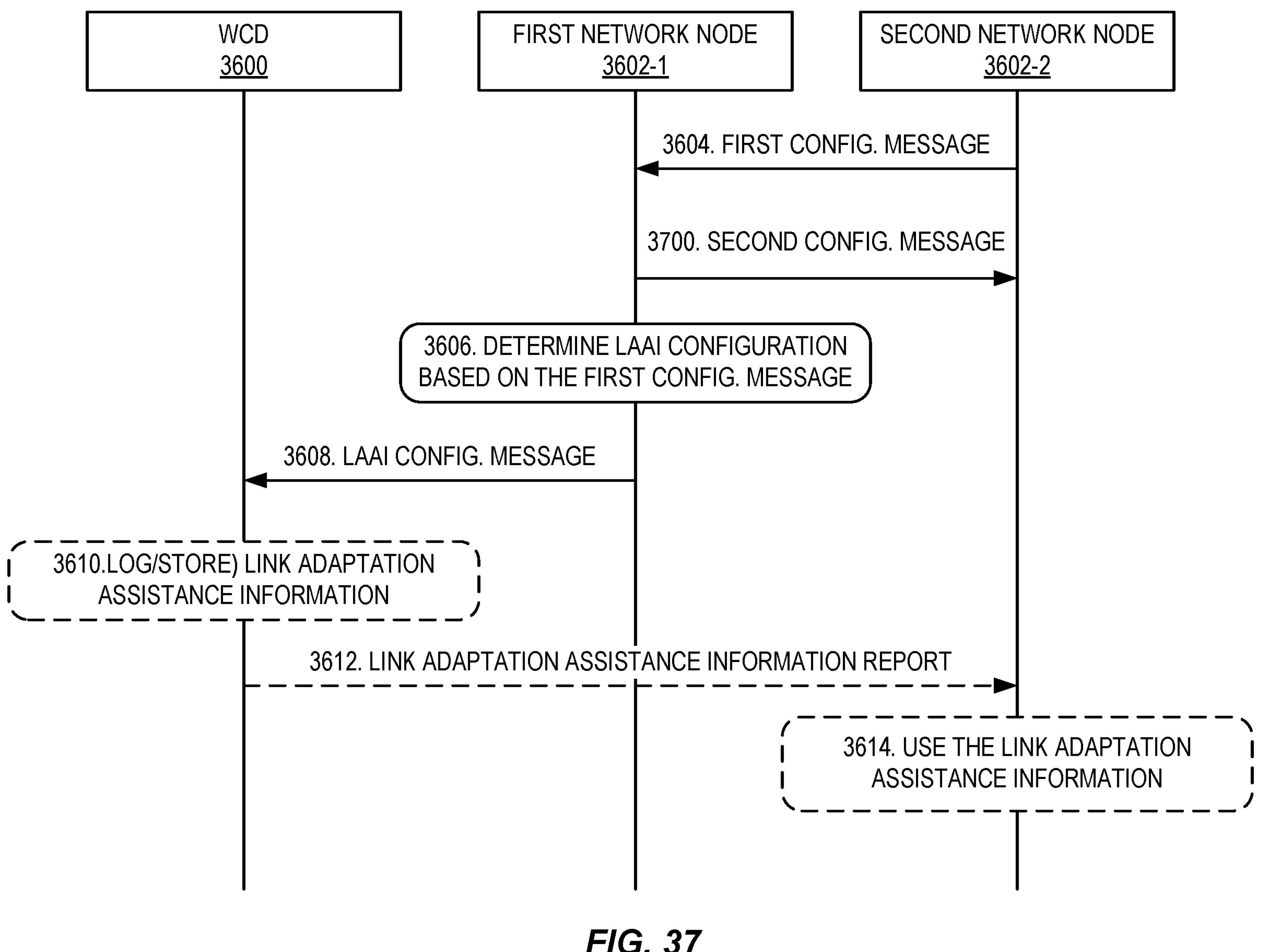
FIGS. 37 and 38 illustrate two embodiments in which the procedure of FIG. 36 further includes transmission of a second configuration message from the first network node to the second network node.

In one embodiment, as illustrated in FIG. 37, the first network node 3602-1 may transmit the SECOND CONFIGURATION message to the second network node 3602-2 upon receiving the FIRST CONFIGURATION message from the second network node 3602-2 (step 3700). In one example, the first network node 3602-1 may transmit the SECOND CONFIGURATION message to acknowledge, reject, and/or modify part or all the information received in the FIRST CONFIGURATION message from the second network node 3602-2. A possible application scenario for this embodiment is illustrated in FIG. 39(*a*) and described below.

A detailed description of the SECOND CONFIGURATION message is deferred to Section 2.3.1.2 below.

Figure 38:
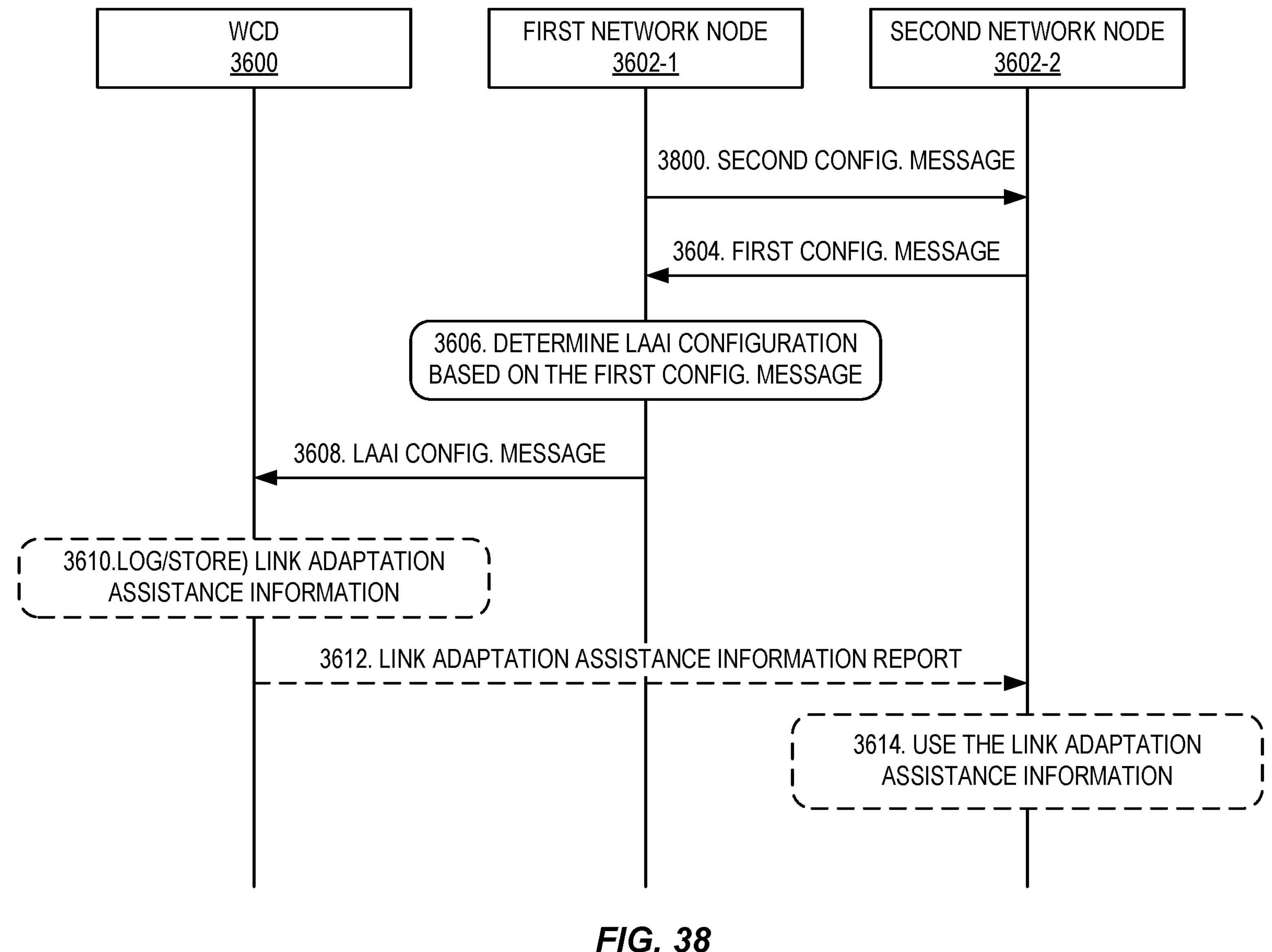

In another embodiment, as illustrated in FIG. 38, the first network node 3602-1 transmits the SECOND CONFIGURATION message prior to receiving the FIRST CONFIGURATION message (step 3800). In this case, the SECOND CONFIGURATION message may be used to initiate a handshake between the first network node 3602-1 and the second network node 3602-2 for coordinating the configuration of the wireless communication device 3600, connected to the first network node 3602-1, to store/log and/or report LAAI. The LAAI handshake may be initiated, for instance, upon the first network node 3602-1 making a handover decision for the wireless communication device 3600 towards a radio cell controlled by the second network node 3602-2. Therefore, the SECOND CONFIGURATION message may comprise, for instance, an indication of availability and/or capability, associated to at least the wireless communication device 3600 connected to the first network node 3602-1, to store/log and/or report LAAI. A possible application scenario for this embodiment is illustrated in FIG. 39(*b*) and described below 2.3.1.1 Embodiments Related to LAAI in Mobility Procedures In one embodiment, the first network node 3602-1 is the source network node of a mobility event associated to the wireless communication device 3600 (which connected to the first network node 3602-1) and the second network node 3602-2 is the target network node of the mobility event. Therefore, the method provides signaling support to enable the source network node and the target network node of the mobility event to coordinate and/or negotiate how to configure the wireless communication device 3600 for storing/logging and/or reporting LAAI. Therefore, the wireless communication device 3600 may be configured to store/log and/or report LAAI prior to initiating the mobility event between the source network node and the target network node. In addition, the wireless communication device 3600 configuration to store/log LAAI may be associated to storing/logging LAAI prior to, and/or during, and/or after the mobility event between the source network node and the target network node.

Figure 39A:
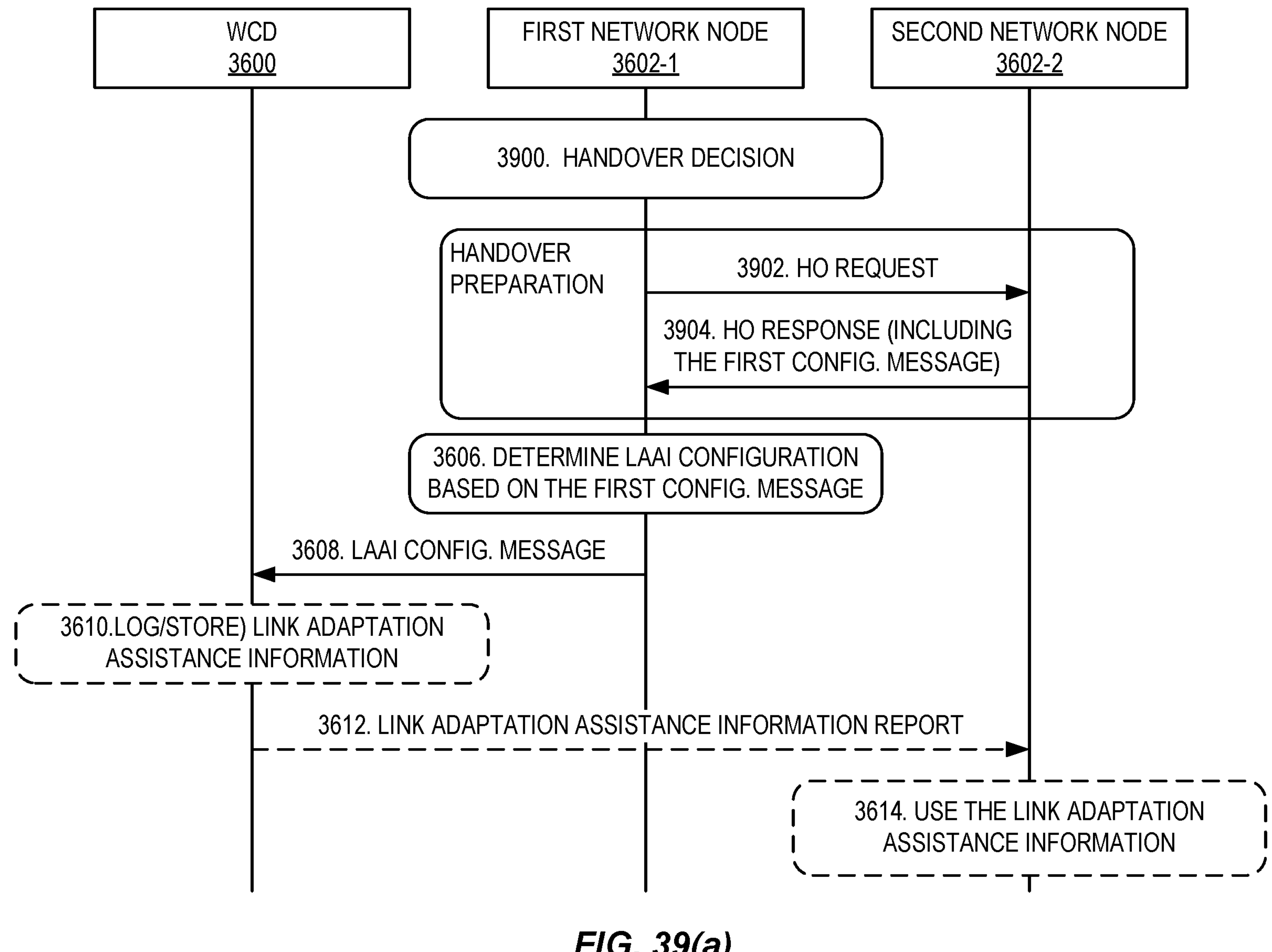
FIGS. 39(*a*) and 39(*b*) illustrate embodiments in which the first configuration message FIG. 36 and optionally the second configuration message of FIG. 37/38 are communicated in relation to a handover event.
Figure 39B:
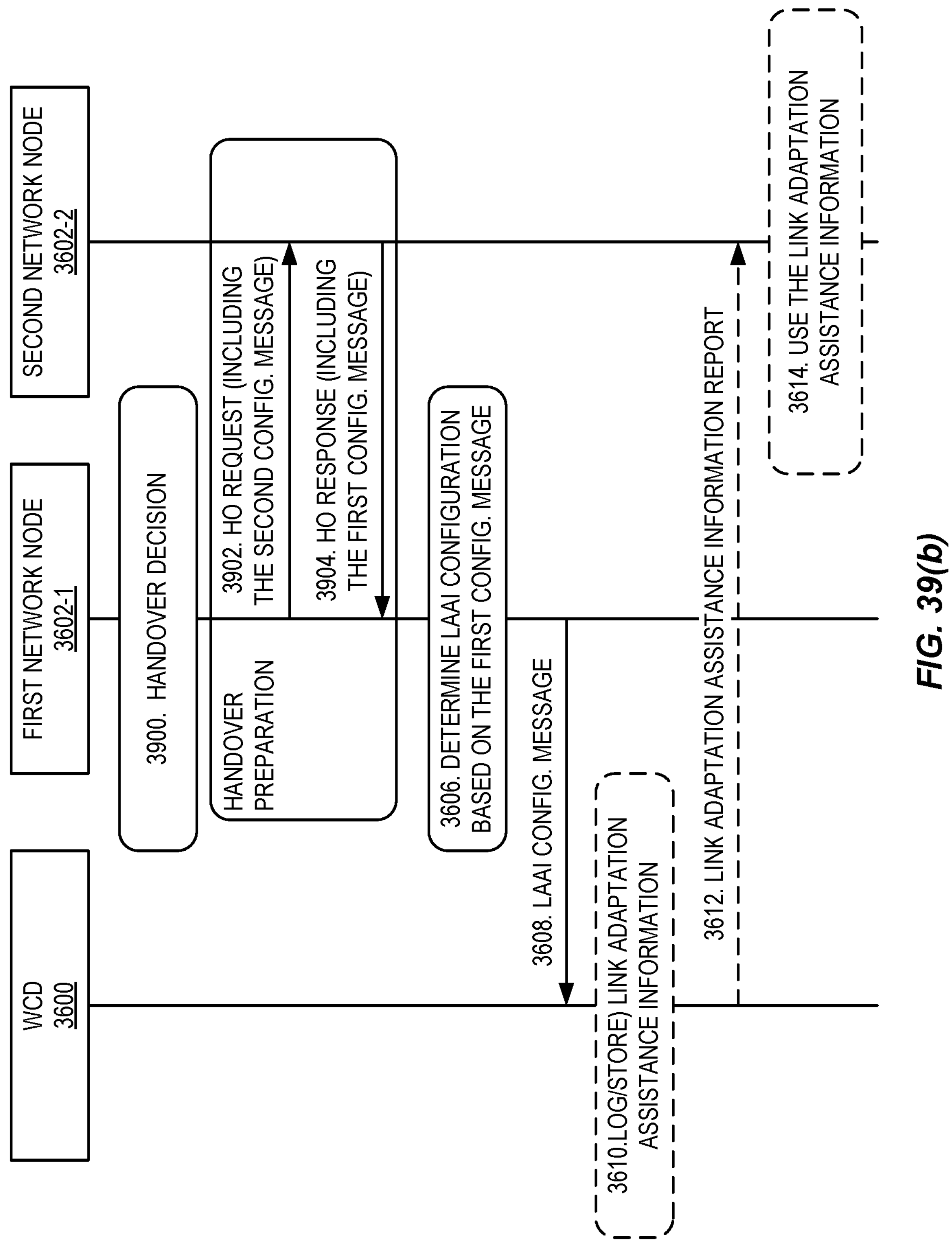

In one embodiment, as illustrated in FIG. 39(*a*), the first network node 3602-1 makes a handover decision (step 3900) and receives the FIRST CONFIGURATION message from the second network node 3602-2 as part of a handover preparation procedure for the wireless communication device 3600. More specifically, in the illustrated example, the first network node 3602-1 sends a handover request to the second network node 3602-1 (3902) and receives the FIRST CONFIGURATION message from the second network node 3602-2 as part of a HANDOVER RESPONSE message transmitted by the second network node 3602-2 to acknowledge the handover decision of the first network node 3602-1 (step 3904). In this case, the first network node 3602-1 may optionally transmit a SECOND CONFIGURATION message to the second network node 3602-2 in response to the FIRST CONFIGURATION message. The first network node 3602-1 may transmit the SECOND CONFIGURATION message to acknowledge, deny, and/or modify part or all the information received with the FIRST CONFIGURATION message from the second network node 3602-2. A detailed description of the SECOND CONFIGURATION message for this case is described below in Section 2.3.1.2.

In another embodiment, as illustrated in FIG. 39(*b*), both the SECOND CONFIGURATION message and the FIRST CONFIGURATION message can be transmitted/received as part of the HANDOVER (HO) PREPARATION signaling procedure between the source network node and the target network node, triggered by the source network node for the wireless communication device 3600 that should be moved from a cell of the first network node 3602-1 to a cell of the second network node 3602-2. In the example illustrated in FIG. 39(*b*), the source network node (the first network node 3602-1) transmits the SECOND CONFIGURATION message to the target network node (the second network node 360202) as part of the HO REQUEST message associated to at least the wireless communication device 3600 connected to the source network node (step 3902). The source network node may the receive the FIRST CONFIGURATION message from the target network node as part of the HO RESPONSE message (step 3904).

2.3.1.2 Embodiments Related to the SECOND CONFIGURATION Message

In one embodiment, the first network node 3602-1 may transmit a SECOND CONFIGURATION message to the second network node 3602-2 to trigger and/or coordinate the configuration of a LAAI procedure for at least the wireless communication device 3600 connected to the first network node 3602-1. As such, the SECOND CONFIGURATION message may comprise one or more of the following information elements:

One or more wireless communication device identities (e.g., one or more C-RNTIs) including the identity of the wireless communication device 3600;

An indication of the LAAI capabilities associated to the wireless communication device 3600 or a group of wireless communication devices including the wireless communication device 3600. The indication may indicate, for example, whether the wireless communication device 3600 is capable of storing/logging and/or reporting LAAI. This enables the second network node 3602-2 to request that the first network node 3602-1 configures the wireless communication device 3600 for LAAI storing/logging and/or reporting.

- An indication of one or more types of LAAI that the wireless communication device 3600 can be configured to store/log and/or report. A description of types of LAAI is provided below in Section 2.3.1.4.
- An indication, for at least a type of LAAI supported by the wireless communication device 3600, of one or more formats that can be configured to store/log and/report the LAAI, such as one or more granularity in frequency, and/or time, and/or spatial domain. A description of reporting granularities for LAAI is provided below in Section 2.3.1.4.

In another embedment, the SECOND CONFIGURATION message may comprise one or more LAAI configurations associated to at least the wireless communication device 3600 connected to the first network node 3602-1. In one example, the first network node 3602-1 may transmit the SECOND CONFIGURATION message to inform the second network node 3602-2 of configuration of the wireless communication device 3600 for storing/logging and/or reporting LAAI. The SECOND CONFIGURATION message may additionally indicate whether the LAAI is active or inactive at the wireless communication device 3600. In another example, the first network node 3602-1 may transmit the SECOND CONFIGURATION message to inform the second network node 3602-2 of one or more LAAI configurations that can be used to configure the wireless communication device 3600 to store/log and/or report LAAI. For instance, one or more available LAAI configurations for the wireless communication device 3600, and/or one or more recommended LAAI configurations for the wireless communication device 3600. The first network node 3602-1 may transmit the SECOND CONFIGURATION message to inform the second network node 3602-2 that the wireless communication device 3600 is or will be configured to store/log LAAI prior to a mobility event towards the second network node 3602-2.

The LAAI configuration may additionally be associated to one or both of the following:

- the wireless communication device 3600 when connected to the first network node 3602-1,
- the wireless communication device 3600 when connected to the second network node 3602-2 (e.g., upon a successful mobility event from the first network node 3602-1 to the second network node 3602-1).

A more detailed description of LAAI CONFIGURATION is provided below in Section 2.3.1.4.

Thereby, the SECOND CONFIGURATION message may indicate one or more LAAI configurations for the wireless communication device 3600 to the second network node 3602-2 prior to a mobility event of the wireless communication device 3600 towards a radio cell of the second network node 3602-2. If the configuration is associated to the wireless communication device 3600 when connected to the first network node 3602-1, upon the mobility event the second network node 3602-2 may configure the wireless communication device 3600 to report the logged/stored LAAI associated to the last communication with the first network node 3602-1. The second network node 3602-2 can then use this information to optimize the selection of link adaptation parameters for communicating with the wireless communication device 3600.

On the other hand, if the configuration is associated to the wireless communication device 3600 when connected to the second network node 3602-2, the first network node 3602-1 may pre-configure the wireless communication device 3600 to store/log and/or report LAAI associated to the communication with the second network node 3602-2 after a mobility event. Thereby, the second network node 3602-2 may configure the wireless communication device 3600 to report the logged/stored LAAI associated to the new connection with the wireless communication device 3600.

Thus, upon a successful mobility event, the second network node 3602-2 may further configure the wireless communication device 3600 to report, to the second network node 3602-2, one or more LAAI associated to prior communication (in uplink and/or downlink) with the first network node 3602-1 once the wireless communication device 3600 is moved from a cell of the first network node 3602-1 to a cell of the second network node 3602-2. A detailed description of the LAAI configuration provided below in Section 2.3.1.4.

In another embedment, the first network node 3602-1 may transmit the SECOND CONFIGURATION message to acknowledge, reject, and/or modify part or all the information received with the FIRST CONFIGURATION message from the second network node 3602-2. In this case, the first network node 3602-1 may receive the FIRST CONFIGURATION message from the second network node 3602-2 prior to transmitting the SECOND CONFIGURATION message, as illustrated in FIG. 39(*a*). Thereby, the SECOND CONFIGURATION message may comprise a positive acknowledgment (ACK) or a negative acknowledgment (NACK) in response to receiving (from the second network node 3602-2) the FIRST CONFIGURATION message associated to the wireless communication device 3600 connected to the first network node 3602-1.

In one embodiment, the ACK/NACK response may be associated to a request, received from the second network node 3602-2 as part of the FIRST CONFIGURATION message, to configure the wireless communication device 3600 to store/log and/or report LAAI. In one example, the first network node 3602-1 may transmit the SECOND CONFIGURATION message comprising an ACK if the request of the second network node 3602-2 is granted (i.e., the wireless communication device 3600 can be and/or will be configured to store/log LAAI). In addition, the SECOND CONFIGURATION message may comprise the configuration used for the wireless communication device 3600 to store/log and/or report LAAI.

In an alternative example, the first network node may transmit the SECOND CONFIGURATION message comprising a NACK if the request of the second network node 3602-2 cannot granted (i.e., the wireless communication device 3600 cannot be and/or will not be configured to store/log LAAI). In addition, the SECOND CONFIGURATION message may comprise the information related to the cause of the rejected request.

In one embodiment, the ACK/NACK response may be associated to a requested and/or recommended LAAI configuration for the wireless communication device 3600 received from the second network node 3602-2 as part of the FIRST CONFIGURATION message. In one example, the first network node 3602-1 may transmit the SECOND CONFIGURATION message to partially acknowledge and/or to modify requested and/or recommended LAAI configuration for the wireless communication device 3600. In one example, the SECOND CONFIGURATION message may additionally comprise a configuration used for the wireless communication device 3600 to store/log and/or report LAAI, which replaces requested and/or recommended LAAI configuration for the wireless communication device 3600. In one example, the SECOND CONFIGURATION message may additionally comprise a modified configuration used for the wireless communication device 3600 to store/log and/or report LAAI, based on the requested and/or recommended LAAI configuration for the wireless communication device 3600.

2.3.1.3 Embodiments Related to FIRST CONFIGURATION Message

In one embodiment, the FIRST CONFIGURATION message may comprise a positive acknowledgment (ACK) or a negative acknowledgment (NACK) in response to the SECOND CONFIGURATION message associated to the wireless communication device 3600 connected to the first network node 3602-1.

In one embodiment, the ACK/NACK response may be associated to an indication of LAAI capabilities associated to the wireless communication device 3600 received by the second network node 3602-2 with the SECOND CONFIGURATION message. In one example, the second network node 3602-2 may transmit the FIRST CONFIGURATION message comprising an ACK to inform the first network node 3602-1 that the SECOND CONFIGURATION message is correctly received, in which case the first network node 3602-1 may determine an LAAI configuration for the wireless communication device 3600. In another example, the second network node 3602-2 may transmit the FIRST CONFIGURATION message comprising an ACK and a recommended LAAI configuration for the wireless communication device 3600 to the first network node 3602-1. Thereby the FIRST CONFIGURATION message transmitted by the second network node 3602-2 may indicate:

- One or more types of link adaptation assistance information to be configured for the wireless communication device 3600 when connected to the first network node 3602-1, and/or
- One or more types of link adaptation assistance information to be configured for the wireless communication device 3600 when connected to the second network node 3602-2 (e.g., upon a successful mobility event to the second network node 3602-2).

In one example, the ACK/NACK response may be associated to at least one LAAI configuration indicated by the SECOND CONFIGURATION message for at least the wireless communication device 3600 connected to the first network node 3602-1. The LAAI configuration may be associated to

- The wireless communication device 3600 when connected to the first network node 3602-1,
- The wireless communication device 3600 when connected to the second network node 3602-2 (e.g., upon a successful mobility event from the first network node 3602-1 to the second network node 3602-2), or
- both.

In other words, the FIRST CONFIGURATION message may indicate whether one or more LAAI configurations received for at least the wireless communication device 3600 are correctly received and/or accepted by the second network node 3602-2.

In one embodiment, the FIRST CONFIGURATION message may comprise at least one requested and/or recommended LAAI configuration for at the wireless communication device 3600 connected to the first network node 3602-1. The requested and/or recommended LAAI configuration may additionally be associated to:

- The wireless communication device 3600 when connected to the first network node 3602-1,
- The wireless communication device 3600 when connected to the second network node 3602-2 (e.g., upon a successful mobility event from the first network node 3602-1 to the second network node 3602-2), or
- both Thereby, the FIRST CONFIGURATION message may comprise an identity for at least a LAAI configuration, the wireless communication device 3600, and an indication of a network node to which the configuration is associated to.

In combination with previous embodiments, the FIRST CONFIGURATION message may comprise a negative acknowledgment (NACK) in response to the SECOND CONFIGURATION message comprising at least one LAAI configuration for at the wireless communication device 3600 connected to the first network node 3602-1. In addition, the FIRST CONFIGURATION message may indicate at least a modified and/or recommended LAAI configuration for at least the wireless communication device 3600 connected to the first network node 3602-1. The negative acknowledgment and the modified and/or recommended LAAI configuration may additionally be associated to a LAAI configuration for:

- The wireless communication device 3600 when connected to the first network node 3602-1,
- The wireless communication device 3600 when connected to the second network node 3602-2 (e.g., upon a successful mobility event from the first network node 3602-1 to the second network node 3602-2), or
- both.

In one embodiment, the FIRST CONFIGURATION message may comprise a request to configure the wireless communication device 3600 connected to the first network node 3602-1 to store/log LAAI. In one example, as illustrated in FIG. 39(*a*), the second network node 3602-2, upon receiving a handover request from the first network node 3602-1 associated to the wireless communication device 3600, transmits the LAAI request message to the first network node 3602-1 comprising a request to configure the wireless communication device 3600 connected to the first network node 3602-1 to store/log link adaptation assistance information. The request for configuring the wireless communication device 3600 to store/log LAAI, may additionally be related to

- The wireless communication device 3600 when connected to the first network node 3602-1,
- The wireless communication device 3600 when connected to the second network node 3602-2 (e.g., upon a successful mobility event from the first network node 3602-1 to the second network node 3602-2), or
- both.

2.3.1.4 Embodiments Related to LAAI CONFIGURATION

In one embodiment of the method, the first network node 3602-1 determines a LAAI CONFIGURATION for the wireless communication device 3600 to log/store LAAI based on the FIRST CONFIGURATION message received from the second network node 3602-2. According to other embodiments, when the FIRST CONFIGURATION message comprises at least one requested and/or recommended LAAI configuration for at least the wireless communication device 3600 connected to the first network node 3602-1, the first network node 3602-1 may use this information to determine the LAAI CONFIGURATION for the wireless communication device 3600. In one example, the first network node 3602-1 may configure the wireless communication device 3600 with the LAAI CONFIGURATION received from the second network node 3602-2. In another example, the first network node 3602-1 may add one or more information elements of the requested and/or recommended LAAI configuration received from the second network node 3602-2 to the LAAI CONFIGURATION determined for the wireless communication device 3600. In one example, the first network node 3602-1 may modify the LAAI CONFIGURATION of the wireless communication device 3600 based on the requested and/or recommended LAAI configuration received from the second network node 3602-2.

In one embodiment, the first network node 3602-1 determines a LAAI CONFIGURATION for the wireless communication device 3600 to log/store link adaptation assistance information associated to at least a communication session/link with the first network node 3602-1 (such as UL or DL user plane, and/or specific radio bearers).

In this case, the LAAI CONFIGURATION may comprise one or more types of LAAI configured for the wireless communication device 3600 when connected to the first network node 3602-1.

The first network node 3602-1 may additionally determine the LAAI CONFIGURATION for the wireless communication device 3600, based on the FIRST CONFIGURATION message received from the second network node 3602-2. In this case, the FIRST CONFIGURATION message may indicate one or more types of LAAI preferred/requested by the second network node 3602-2 that the first network node 3602-1 could configure the wireless communication device 3600 for logging/storing while still connected to the first network node 3602-1. In case of a mobility event of the wireless communication device 3600 from the first network node 3602-1 to the second network node 3602-2, this enables the wireless communication device 3600 to store/log LAAI associated with the first network node 3602-1 prior to the mobility handover event. Such information can then be reported to the second network node 3602-2 once a connection is established with the wireless communication device 3600.

In one embodiment, the first network node 3602-1 determines a LAAI CONFIGURATION for the wireless communication device 3600 to log/store link adaptation assistance information associated to at least a communication session/link with the second network node 3602-2 (such as UL or DL user plane, and/or specific radio bearers).

In this case, the LAAI CONFIGURATION may comprise one or more types of LAAI configured for the wireless communication device 3600 when connected to the second network node 3602-2.

The first network node 3602-1 may additionally determine the LAAI CONFIGURATION for the wireless communication device 3600, based on the FIRST CONFIGURATION message received from the second network node 3602-1. In this case, the FIRST CONFIGURATION message may indicate one or more types of LAAI preferred/requested by the second network node 3602-2 that the first network node 3602-1 could configure the wireless communication device 3600 for logging/storing when connected to the second network node 3602-2. In case of a mobility event of the wireless communication device 3600 from the first network node 3602-1 to the second network node 3602-2, this enables the wireless communication device 3600 to store/log LAAI associated with the second network node 3602-2 during and immediately after the mobility handover event without the need to receive a new configuration LAAI message from the second network node 3602-2.

In one embodiment, the first network node 3602-1 determines a LAAI CONFIGURATION for the wireless communication device 3600 comprising both one or more types of LAAI configured for the wireless communication device 3600 when connected to the first network node 3602-1, and one or more types of LAAI configured for the wireless communication device 3600 when connected to the second network node 3602-2 (e.g., upon a successful mobility event to the second network node 3602-2).

In one embodiment, the first network node 3602-1 determines a LAAI CONFIGURATION for the wireless communication device 3600 comprising one or more of the following configuration information elements:

The identity of at least a network node, such as the first network node 3602-1 and/or the second network node 3602-1, to which the LAAI CONFIGURATION for storing/logging LAAI is associated to.

The identity of at least the second network node 3602-2 to which the wireless communication device 3600 is to report the LAAI.

A list of link adaptation parameters associated to at least a communication session/link between the wireless communication device 3600 and the first network node 3602-1 (e.g., to be included in the LAAI).

A list of link adaptation parameters associated to at least a communication session/link between the wireless communication device 3600 and the second network node 3602-2 (e.g., to be included in the LAAI).

A list of one or more link adaptation state information associated to at least a communication session/link between the wireless communication device 3600 and the first network node 3602-1 (e.g., to be included in the LAAI).

A list of one or more link adaptation state information associated to at least a communication session/link between the wireless communication device 3600 and the second network node 3602-2 (e.g., to be included in the LAAI).

A configuration format for at least one or more types of LAAI configured to be logged/stored.

2.3.1.4.1 Configuration of Link Adaptation Parameters to be Reported

According to a previous embodiment, the first network node 3602-1 determines a LAAI CONFIGURATION comprising at least a list of link adaptation parameters associated to at least a communication session/link between the wireless communication device 3600 and the first network node 3602-1 and/or associated to at least a communication session/link between the wireless communication device 3600 and the second network node 3602-2. Hereafter, a list of link adaptation parameters that can be configured for the wireless communication device 3600 to be stored/logged for any communication session with any network node.

In one embodiment, the first network node 3602-1 determines a LAAI CONFIGURATION comprising at least a list of link adaptation parameters to log/store, where the list of link adaptation parameters includes one or more of the following:

A list of link adaptation parameters configured for one or more communication instances (e.g., in uplink and/or in downlink) between the wireless communication device 3600 and the first network node 3602-1.

A list of link adaptation parameters configured for one or more communication instances (e.g., in uplink and/or in downlink) between the wireless communication device 3600 and the second network node 3602-2.

A list of link adaptation parameters estimated or recommended by the wireless communication device 3600 for one or more communication instances (e.g., in uplink and/or in downlink) with the first network node 3602-1.

A list of link adaptation parameters estimated or recommended by the wireless communication device 3600 for one or more communication instances (e.g., in uplink and/or in downlink) with the second network node 3602-2.

Therefore, the link adaptation parameters configured to be logged/stored and/or reported could be associated to one or more of:

At least a communication link (e.g., uplink or downlink) and/or one or more radio bearer between the wireless communication device 3600 and the first network node 3602-1, At least a communication link (e.g., uplink or downlink) and/or one or more radio bearer between the wireless communication device 3600 and the second network node 3602-2.

The terminology "link adaptation parameters" broadly refers to either or all the aforementioned types of link adaptation parameters that the wireless communication device 3600 can be configured to log/store and/or report, unless specified otherwise.

In one embodiment, the LAAI CONFIGURATION may additionally configure the wireless communication device 3600 to store/log and/or report one or more link adaptation parameters in the group of:

A packet identifier to which the link adaptation parameters are associated to, such as a Packet Data Convergence Protocol (PDCP) identifier of the UMTS/LTE/5G systems.

Modulation order

Code rate

MCS index

Transport block size (TBS)

Information carrying capacity (such as spectral efficiency)

An indication of the transmission type (e.g., uplink and/or downlink)

An indication of the transmission number such as one of:

An indicator indicating whether the link adaptation parameters are associated to a first transmission or to a retransmission.

An indicator indicating the transmission counter associated to the link adaptation parameters. In one example, this can be realized by indicating whether the link adaptation parameters are associated to 1st transmission, 1st retransmission, $2^{nd}$ retransmission etc. In another example, this can be realized with an integer number in the range 0 . . . N−1, wherein N indicates the maximum number of retransmissions or transmissions for a packet.

The LAAI CONFIGURATION may additionally configure the wireless communication device 3600 to store/log and/or report, for each or some of the estimated/preferred link adaptation parameters, one or more additional information in the group:

The associated probability of success

The associated uncertainty in the estimated probability of success

The associated confidence interval for the estimated probability of success

In one embodiment, LAAI CONFIGURATION may additionally configure the wireless communication device 3600 to store/log and/or report at least a set of link adaptation parameters associated to a transmission rank value. Thus, link adaptation parameters may be configurable parameters enabling matching of the modulation and coding scheme, modulation order, code rate, and/or the like and/or other signal and protocol related parameters (e.g., the allocation of PRBs) to the conditions on the radio link. In one example, different sets of link adaptation parameters are associated to different transmission rank values. Examples of link adaptation parameters that can be reported in association with a specific transmission rank may comprise one or more in the group of:

Modulation order

Modulation and coding scheme (MCS) index

Code rate

Transport block size (TBS)

Information carrying capacity (such as spectral efficiency)

For each link adaptation parameter, the LAII CONFIGURATION may configure the wireless communication device 3600 to store/log and/or report a set of estimated/recommended values. In one implementation, this is realized by listing all the values. In an alternative implementation, this is realized by indicating a range of estimated/recommended values. In one exemplifying case, the set of estimated/recommended values may be represented by a starting value and an ending value. In another example, the set of estimated/recommended values may be represented by a starting value the length of the range of values.

In one embodiment, the All CONFIGURATION may configure the wireless communication device 3600 to store/log and/or report a set of link adaptation parameters (such as MCS index value, modulation order, code rate, etc.) reported according to one or more reporting granularity in frequency domain and/or time domain and/or spatial domain, such as:

Per Wideband

Per sub-band

Per physical resource block (PRB)

Per resource block group (RBG), wherein an RBG may comprise a group of PRBs

Per resource element (RE)

Per bandwidth part (BWP)

Per bandwidth segment

Per SSB beam coverage area

Per CSI-RS beam coverage area

Per transmission time interval (TTI), such as for one or a group for TTIs

Per transmission time window (i.e., the reported information is associated to a certain time interval)

Per packet transmission

Per group of packets (e.g., starting packet and number of packets)

A combination of at least one frequency or spatial or time granularity 2.3.1.4.2 Link Adaptation State Information In one embodiment, the LAAI CONFIGURATION may additionally configure the wireless communication device 3600 to store/log and/or report one or more link adaptation state information associated to At least a communication link (e.g., uplink or downlink) and/or one or more radio bearer between the wireless communication device 3600 and the first network node 3602-1; and/or At least a communication link (e.g., uplink or downlink) and/or one or more radio bearer between the wireless communication device 3600 and the second network node 3602-2.

In one embodiment, the LAAI CONFIGURATION may additionally configure the wireless communication device 3600 to log/store and/or report link adaptation state information comprising one or more measurement and/or predictions/estimates of the channel state between the wireless communication device 3600 and the first network node 3602-1 and/or the second network node 3602-2, in the group of:

Channel Quality Indicator (CQI),
Transmission rank,
Precoding matrix indicator (PMI),
Signal-to-Noise ratio (SNR),
Signal-to-interference-plus-Noise ratio (SINR).
Quality of experience (QoE)

In addition, the LAAI configuration may configure the wireless communication device 3600 to log/store and/or report at least an indication of one or more uncertainty measures for one or more the stored/logged (and/or reported) measurements and/or predictions of the channel state. Examples of uncertainty metrics include, for instance, first and second statistical moments, such as average, variance, and standard deviation.

In one embodiment, the LAAI configuration may configure the wireless communication device 3600 to log/store and/or report link adaptation state information comprising one or more indication of the mobility state of the wireless communication device 3600, such as Velocity,
Acceleration
Location
Mobility indicator In one example, the mobility indicator may further indicate the type of mobility, such as whether the wireless communication device 3600 is a static device (e.g., if its velocity is below a certain threshold), a low speed device (e.g., if its velocity exceeds or is below a second threshold), a medium speed device (e.g., if its velocity exceeds or is below a third threshold), a high velocity device (e.g., if its velocity exceeds or is below a second threshold), etc. In one example, the type of mobility of the wireless communication device 3600 could be indicated by an increasing range of integer number, for instance, with zero indicating a static user and 1, 2, 3 etc. indicating wireless communication devices with increasing velocity.

In one embodiment, the LAAI CONFIGURATION may configure the wireless communication device 3600 to log/store and/or report link adaptation state information comprising one or more indication the channel fading experienced by the wireless communication device 3600. For instance, the wireless communication device 3600 may report the type of fading experienced, such as slow fading, shadow fading or fast fading, the magnitude of the fading event experienced, the length/duration of the fading event, the frequency of the fading event, etc.

In one embodiment, the LAAI CONFIGURATION may configure the wireless communication device 3600 to log/store and/or report link adaptation state information comprising one or more indication of the interference experienced by the wireless communication device 3600, which may comprise measurements and or predictions of different types of interference metrics, such as the maximum/peak, minimum, average interference measured over a set of time-frequency resource, as well as second statistical moments of interference measured of predicted, such as standard deviation or variance.

In one embodiment, the LAAI CONFIGURATION may configure the wireless communication device 3600 to log/store and/or report link adaptation state information comprising one or more measurements of the downlink data transmission performance in at least a previous transmission time interval (TTI) or group of TTIs with the first network node 3602-1. The downlink transmission performance measurements may include, for instance, an indication of the fraction of successfully or unsuccessfully decoded date in a transmission, and/or one or more cumulative downlink performance indicators associated to the transmission of a group data packets, such as first and second statistical moments of successfully or unsuccessfully decoded date in group of transmissions (e.g., in a group of TTIs). In one example, the state of the downlink data transmission may indicate one or more cumulative downlink performance indicators associated to the transmission of a group data packets including, for instance one or more statistical information of the downlink transmission state in the group of:

First statistical momentum (e.g., mean, average) of the amount or the fraction of data correctly or incorrectly received or decoded for a group of data packets.
Second statistical momentum (e.g., standard deviation, variance) of the amount or the fraction of data correctly or incorrectly received or decoded for a group of data packets.
Maximum and/or minimum amount or fraction of data correctly or incorrectly received or decoded for a group of data packets.

In one embodiment, the LAAI CONFIGURATION may configure the wireless communication device 3600 to log/store and/or report one or more user-device manufacturing information for link adaptation purposes. The user-device manufacturing information may comprise, one or more in the group of: the user device model, the user device manufacturer, the user device receiver type, the user device receiver hardware, the user device chipset model, the user device chipset manufacturer, the user device processor type, the user device processor model, the user device operating system and the user device antenna model. Providing such information allow to distinguish between measurements or predictions of link adaptation state information are by different user devices in terms of hardware and software, which may affect the accuracy and uncertainly of the measurements or predations.

In one embodiment, the LAAI CONFIGURATION may configure the wireless communication device 3600 to log/store and/or report one or more wireless communication device configuration information used for determining any of the link adaptation state information element. In one example, the wireless communication device configuration information can be associated to algorithms used for determining any of the link adaptation state information element, such as the type of algorithms, one or more hyperparameter used to configure the algorithm (including type and value of the hyperparameters). In addition, the wireless communication device configuration information used for determining any of the link adaptation state information element may include the type of filtering operation, and the corresponding configuration values, used to determine measurements and/or estimates of link adaptation state information. This may include, for instance type of filtering and associated configuration for the computation of CSI information (such as filtered CQI), SINR, RSRP, interference measurements, etc.

2.3.1.4.3 Configuration Format of the Link Adaptation Assistance Information to be Logged/Stored In one embodiment, the first network node 3602-1 determines a LAAI CONFIGURATION configuring the wireless communication device 3600 to log/store and/or report one or more link adaptation assistance information according to one or more granularity in time and/or frequency and/or spatial domain, in the group of:

- Per Wideband
- Per sub-band
- Per physical resource block (PRB)
- Per resource block group (RBG), wherein an RBG may comprise a group of PRBs
- Per resource element (RE)
- Per bandwidth part (BWP)
- Per bandwidth segment
- Per SSB beam coverage area
- Per CSI-RS beam coverage area
- Per transmission time interval (TTI), such as for one or a group for TTIs
- Per transmission time window (i.e., the reported information is associated to a certain time interval)
- Per packet transmission
- Per group of packets (e.g., starting packet and number of packets)
- A combination of at least one frequency or spatial or time granularity 2.3.2 Example Realizations Section 2.3.1 provides a generic system description comprising the first network node 3602-1 and the second network node 3602-2. Hereafter, some non-limiting examples of realizations of the system are described.

In one embodiment, the first network node 3602-1 and the second network node 3602-2 are eNBs of a 3GPP E-UTRAN system. In this case, the SECOND CONFIGURATION message and the FIRST CONFIGURATION message can be exchanged using a X2 interface of the E-UTRAN system (e.g., LTE and/or LTE-A).

In one embodiment, the first network node 3602-1 and the second network node 3602-2 are NG-RAN nodes (e.g., gNB) of a 3GPP NG-RAN system (also knowns as NR system). In this case, the SECOND CONFIGURATION message and the FIRST CONFIGURATION message can be exchanged using a Xn interface of the NG-RAN system.

In one embodiment, the first network node 3602-1 is a distributed unit (DU) of an NG-RAN node (e.g., a gNB-DU), while the second network node 3602-2 is a centralized unit (CU) of an NG-RAN node (e.g., a gNB-CU). In this case, the SECOND CONFIGURATION message and the FIRST CONFIGURATION message can be exchanged using a F1 interface of the NG-RAN system.

In one embodiment, the first network node 3602-1 is a first centralized unit (CU) of a first NG-RAN node (e.g., a gNB-$CU_1$), while the second network node 3602-2 is a second centralized unit (CU) of a second NG-RAN node (e.g., a gNB-$CU_2$). In this case, the SECOND CONFIGURATION message and the FIRST CONFIGURATION message can be exchanged using a Xn interface of the NG-RAN system.

In one embodiment, the first network node 3602-1 is a first centralized unit (CU) of a NG-RAN node (e.g., gNB-CU), while the second network node 3602-2 is a second decentralized unit (DU) of a NG-RAN node (e.g., a gNB-CU). In this case, the SECOND CONFIGURATION message and the FIRST CONFIGURATION message can be exchanged using a F1 interface of the NG-RAN system.

In one embodiment, the first network node 3602-1 is an NG-RAN node of an NG-RAN system, while the second network node 3602-2 is eNB (i.e., eNB or en-eNB) of an E-UTRAN system. In this case, the SECOND CONFIGURATION message and the FIRST CONFIGURATION message can be exchanged using a X2 interface between the E-UTRAN system and NG-RAN system.

Figure 40:
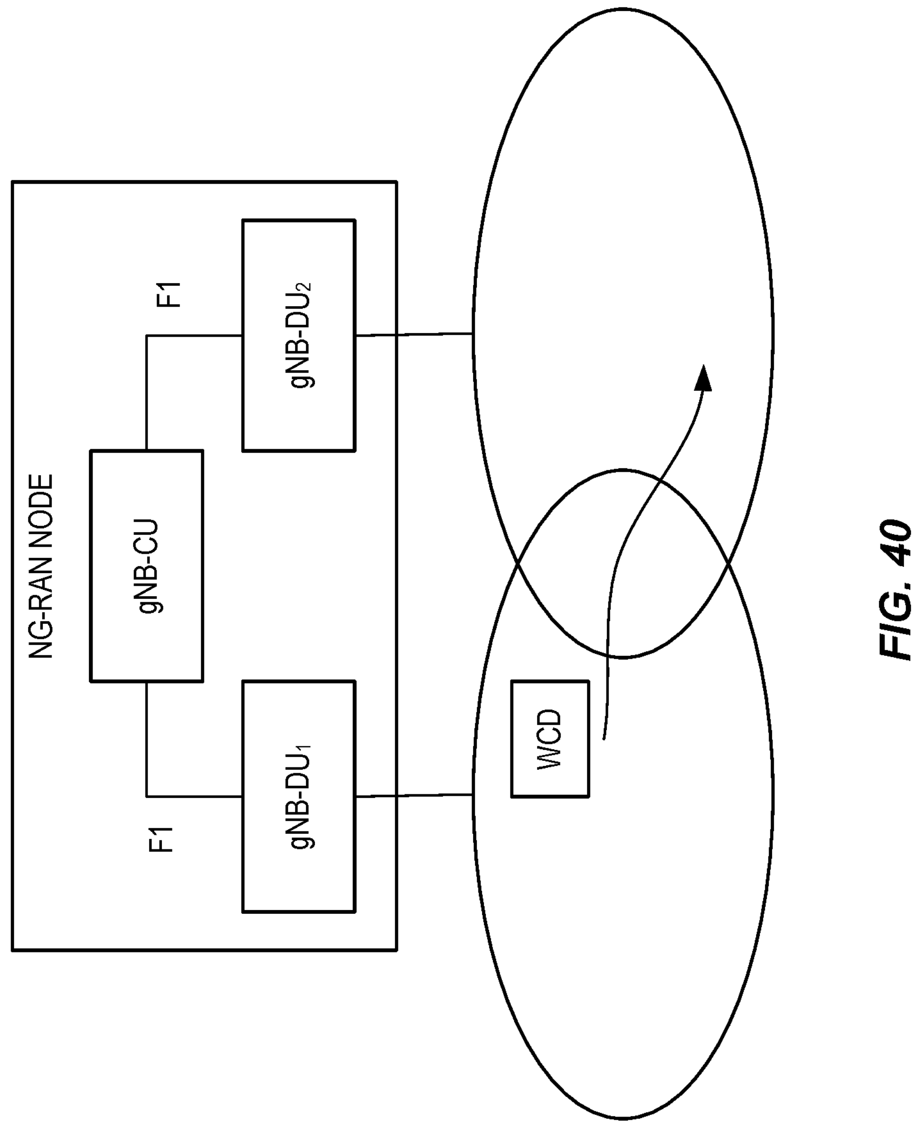
FIG. 40 illustrates how one or more of the embodiments can be applied to configure a user device to store/log and/or report LAAI in the case of mobility events between radio cells controlled by different distributed units (DUs) of a NG-RAN node with split architecture.

FIG. 40 illustrates how one or more of the embodiments can be applied to configure a user device to store/log and/or report LAAI in the case of mobility events between radio cells controlled by different distributed units (DUs) of a NG-RAN node with split architecture.

Figure 41:
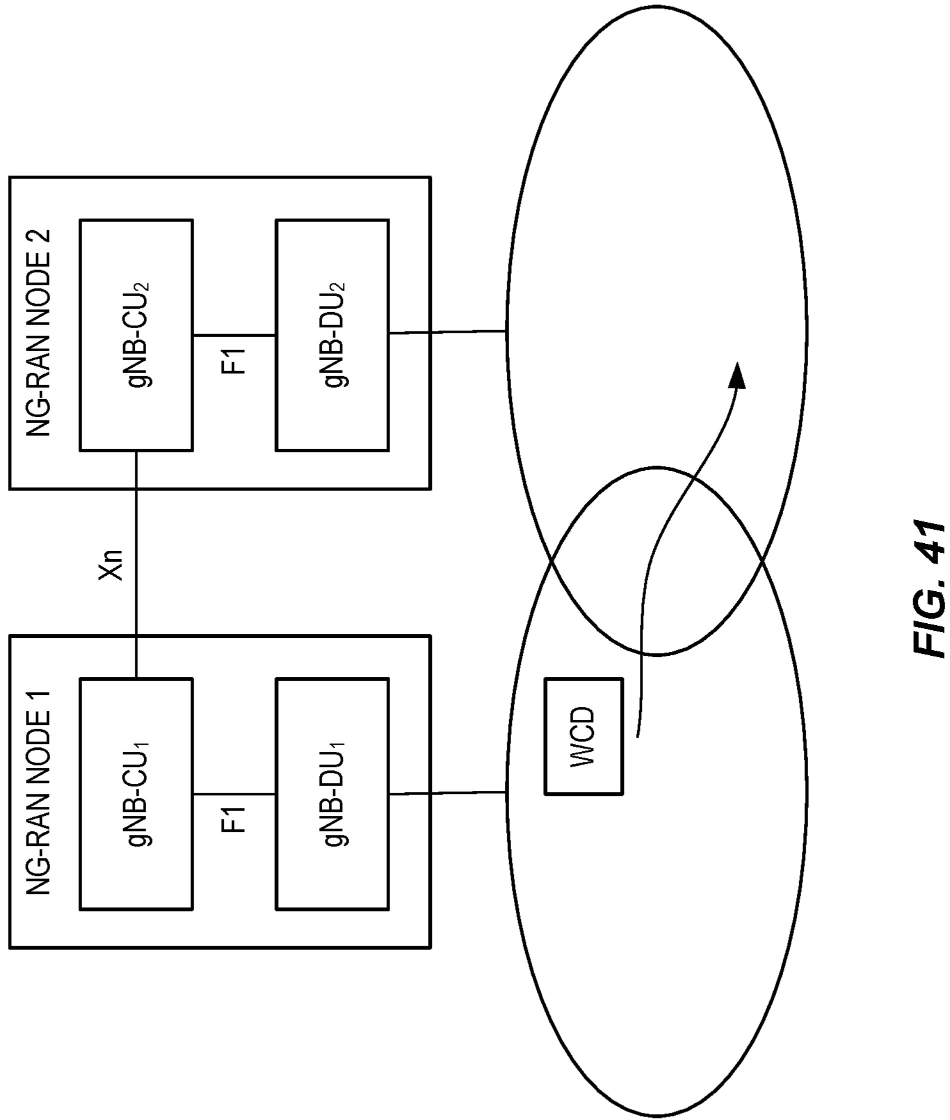
FIG. 41 illustrates how one or more of the embodiments can be applied to configure a user device to store/log and/or report LAAI in the case of mobility events between radio cells controlled by different distributed units (DUs) belonging to two different NG-RAN nodes with split architecture.

FIG. 41 illustrates how one or more of the embodiments can be applied to configure a user device to store/log and/or report LAAI in the case of mobility events between radio cells controlled by different distributed units (DUs) belonging to two different NG-RAN nodes with split architecture.

Figure 42:
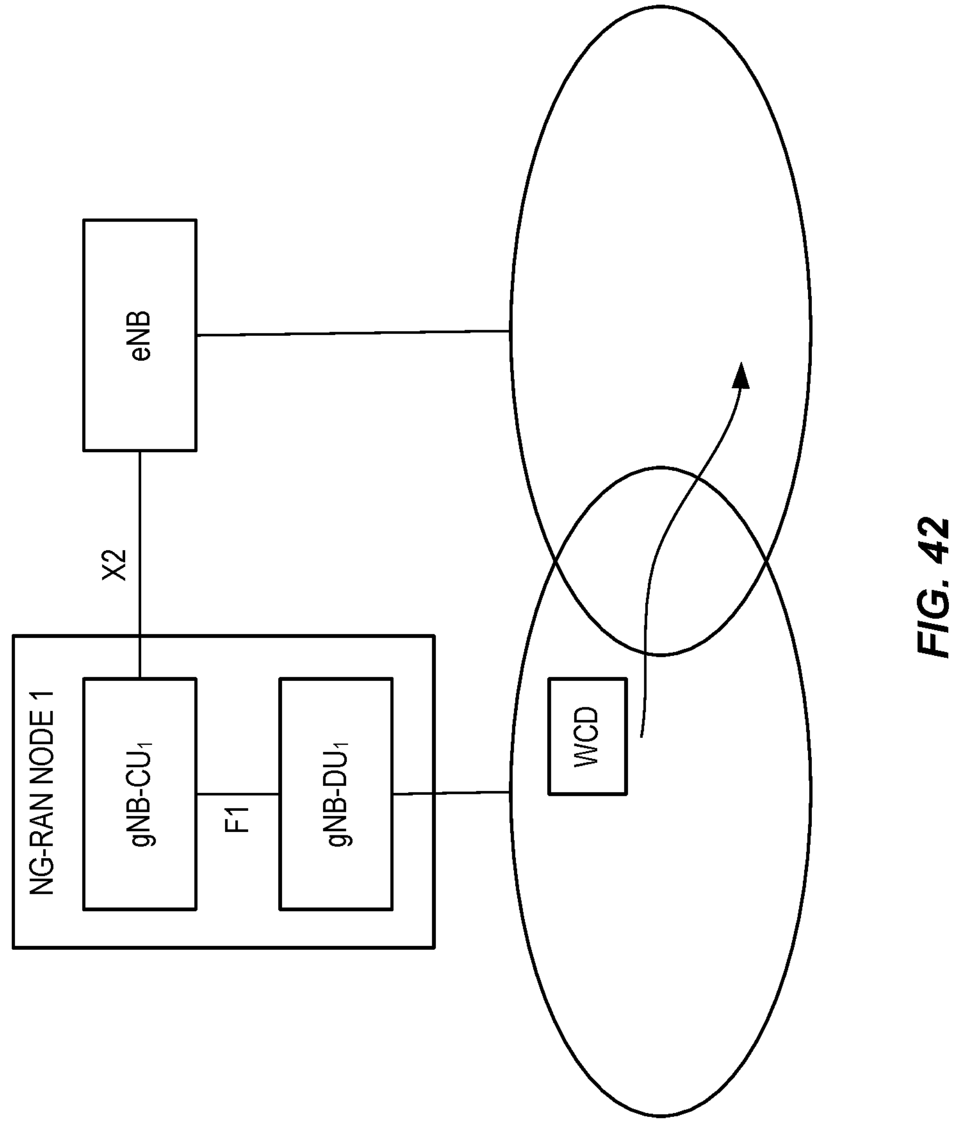
FIG. 42 illustrates how one or more of the embodiments can be applied to configure a user device to store/log and/or report LAAI in the case of mobility events between radio cells controlled by a NG-RAN nodes with split architecture and an eNB.

FIG. 42 illustrates how one or more of the embodiments can be applied to configure a user device to store/log and/or report LAAI in the case of mobility events between radio cells controlled by a NG-RAN nodes with split architecture and an eNB.

2.4 Summary of Example Embodiments Related to Inter-Node Configuration of Link Adaptation Assistance Information Configuration Systems and methods related to reporting of link adaptation assistance information, and the configuration thereof, in a communication system are disclosed herein. In one embodiment, a method performed by a communication device comprises obtaining link adaptation assistance information associated to a first network node and transmitting a link adaptation assistance information report to a second network node, the link adaptation assistance information report comprising the link adaptation assistance information. By reporting the link adaptation assistance information to the second network node, link adaptation at the second network node can be improved.

In one embodiment, the first network node is a source network node for a mobility event of the communication device, and the second network node to which the link adaptation assistance information report is transmitted is a target network node for the mobility event of the communication device.

In one embodiment, the link adaptation assistance information associated to the first network node comprises: (i) one or more link adaptation parameters, (ii) one or more link adaptation state information elements, or (iii) both (i) and (ii).

In one embodiment, the method further comprises receiving, from the second network node, a configuration message related to configuration of the link adaptation assistance information that is obtained and/or to the link adaptation assistance information report.

In one embodiment, the method further comprises receiving, from the first network node, a configuration message related to configuration of the link adaptation assistance information that is obtained, and/or to the link adaptation assistance information report.

Corresponding embodiments of a communication device are also disclosed.

In one embodiment, a method performed by a second network node comprises receiving a link adaptation assistance information report from a communication device, the link adaptation assistance information report comprising link adaptation assistance information associated to a first network node.

In one embodiment, the second network node is a target network node for a mobility event of the communication device, and the first network node is a source network node for the mobility event of the communication device.

In one embodiment, the link adaptation assistance information associated to the first network node comprises: (i) one or more link adaptation parameters, (ii) one or more link adaptation state information elements, or (iii) both (i) and (ii).

In one embodiment, the method further comprises transmitting a configuration message to the communication device, the configuration message.

In one embodiment, a method performed by a first network node comprises transmitting a configuration message to a communication device, wherein the configuration message configures or requests that the communication device report, to a second network node, link adaptation assistance information associated to the first network node and/or link adaptation assistance information associated to the second network node.

In one embodiment, the first network node is a source network node for a mobility event of the communication device, and the second network node is a target network node for the mobility event of the communication device.

In one embodiment, the link adaptation assistance information comprises: (i) one or more link adaptation parameters, (ii) one or more link adaptation state information elements, or (iii) both (i) and (ii).

In one embodiment, the method further comprises receiving a first configuration message from the second network node, wherein the first configuration message is associated to the communication device, which is connected to the first network node, and the first configuration message comprises one or more information elements related to: configuration of the communication device to store or log link adaptation assistance information and/or configuration of the communication device to report link adaptation assistance information to the second network node.

In one embodiment, the method further comprises determining the configuration message to be transmitted to the communication device based on the first configuration message received from the second network node.

In one embodiment, a method performed by a first network node comprises receiving a first configuration message from a second network node, wherein the first configuration message is associated to a communication device, which is connected to the first network node, and the first configuration message comprises one or more information elements related to: configuration of the communication device to store or log link adaptation assistance information and/or configuration of the communication device to report link adaptation assistance information to the second network node.

In one embodiment, the method further comprises determining a configuration message to be transmitted to the communication device based on the first configuration message received from the second network node.

In one embodiment, the method further comprises transmitting a second configuration message to the second network node.

Corresponding embodiments of a network node are also disclosed herein.

Some example embodiments are as follows:

Embodiment 1: A method performed by a communication device (2600; 3300; 3600), the method comprising: obtaining (2604; 3306; 2710) link adaptation assistance information associated to a first network node (2602-1; 3302-1; 3602-1); and transmitting (2606; 3308; 2712) a link adaptation assistance information report to a second network node (2602-2; 3302-2; 3602-2), the link adaptation assistance information report comprising the link adaptation assistance information.

Embodiment 2: The method of embodiment 1 wherein the first network node (2602-1; 3302-1; 3602-1) is a source network node for a mobility event of the communication device (2600; 3300; 3600), and the second network node (2602-2; 3302-2; 3602-2) to which the link adaptation assistance information report is transmitted is a target network node for the mobility event of the communication device (2600; 3300; 3600).

Embodiment 3: The method of embodiment 1 or 2 wherein the link adaptation assistance information associated to the first network node (2602-1; 3302-1; 3602-1) comprises: (i) one or more link adaptation parameters, (ii) one or more link adaptation state information elements, or (iii) both (i) and (ii).

Embodiment 4: The method of any of embodiments 1 to 3 further comprising receiving (2800), from the second network node (2602-2), a configuration message related to configuration of the link adaptation assistance information that is obtained and/or to the link adaptation assistance information report.

Embodiment 5: The method of embodiment 4 wherein the configuration message configures or requests that the communication device (2600) report, to the second network node (2602-2), link adaptation assistance information associated to the first network node (2602-1) and/or link adaptation assistance information associated to the second network node (2602-2).

Embodiment 6: The method of embodiment 4 wherein the configuration message comprises: (a) a request for availability, at the communication device (2600), of link adaptation assistance information associated to the first network node (2602-1); (b) a request for availability, at the communication device (2600), of link adaptation assistance information associated to the second network node (2602-2); (c) a list of requested link adaptation assistance information associated to at least the first network node (2602-1) requested by the second network node (2602-2); (d) a list of configured link adaptation assistance information associated to at least the first network node (2602-1) to be reported to the second network node (2602-2); (e) a list of requested link adaptation assistance information associated to the second network node (2602-1) requested by the second network node (2602-2); (f) a list of configured link adaptation assistance information associated to the second network node (2602-2) to be reported to the second network node (2602-2); (g) one or more resource configuration information to report link adaptation assistance information; (h) a configuration format for at least one of the link adaptation assistance information requested or configured by the configuration message; or (i) a combination of any two or more of (a)-(h).

Embodiment 7: The method of embodiment 4 wherein the configuration message requests or configures the communication device (2600) to report one or more link adaptation parameters associated to one or more communications instances with the first network node (2602-1) and/or one or more communications instances with the second network node (2602-2).

Embodiment 8: The method of embodiment 7 wherein the configuration message configures a reporting granularity in the time-domain, the frequency-domain, and/or the spatial-domain for at least one of the one or more link adaptation parameters.

Embodiment 9: The method of any of embodiments 4 to 8 wherein receiving (2800) the configuration message comprises receiving (2800) the configuration message within one or more random-access messages.

Embodiment 10: The method of any of embodiments 4 to 9 further comprising transmitting (3000) an acknowledgement message to the second network node (2602-2) that indicates that the communication device (2600) can at least partially provide link adaptation assistance information in accordance with the configuration message.

Embodiment 11: The method of any of embodiments 4 to 9 further comprising transmitting (3200) a message to the second network node (2602-2) that indicates that configuration of link assistance information reporting in accordance with the configuration message as failed.

Embodiment 12: The method of any of embodiments 1 to 3 further comprising receiving (3304; 3608), from the first network node (3302-1; 3602-1), a configuration message related to configuration of the link adaptation assistance information that is obtained, and/or to the link adaptation assistance information report.

Embodiment 13: The method of embodiment 12 wherein the configuration message configures the communication device (3300; 3600) to log or store link adaptation assistance information associated to the first network node (3302-1; 3602-1).

Embodiment 14: The method of embodiment 12 or 13 wherein the configuration message configures the communication device (3300; 3600) to report the link adaptation assistance information associated to the first network node (3302-1; 3602-1).

Embodiment 15: The method of embodiment 12 or 13 wherein the configuration message comprises an indication of the second network node (3302-2; 3602-2) to which the communication device (3300; 3600) is to transmit the link adaptation assistance information report.

Embodiment 16: The method of any of embodiments 12 to 15 wherein receiving (3304; 3608) the configuration message comprises receiving (3304; 3608) the configuration message prior to radio access network, RAN, initialization of handover of the communication device (3300; 3600) from the first network node (3302-1; 3602-1) to the second network node (3302-2; 3602-2).

Embodiment 17: The method of any of embodiments 12 to 15 wherein receiving (3304; 3608) the configuration message comprises receiving (3304; 3608) the configuration message during radio access network, RAN, initialization of handover of the communication device (3300; 3600) from the first network node (3302-1; 3602-1) to the second network node (3302-2; 3602-2).

Embodiment 18: A communication device (2600; 3300; 3600) adapted to perform the method of any of embodiments 1 to 17.

Embodiment 19: A method performed by a second network node (2602-2), the method comprising: receiving (2606) a link adaptation assistance information report from a communication device (2600), the link adaptation assistance information report comprising link adaptation assistance information associated to a first network node (2602-1).

Embodiment 20: The method of embodiment 19 wherein the second network node (2602-2) is a target network node for a mobility event of the communication device (2600), and the first network node (2602-1) is a source network node for the mobility event of the communication device (2600).

Embodiment 21: The method of embodiment 19 or 20 wherein the link adaptation assistance information associated to the first network node (2602-1) comprises: (i) one or more link adaptation parameters, (ii) one or more link adaptation state information elements, or (iii) both (i) and (ii).

Embodiment 22: The method of any of embodiments 19 to 21 further comprising transmitting (2800) a configuration message to the communication device (2600), the configuration message.

Embodiment 23: The method of embodiment 22 wherein the configuration message configures or requests that the communication device (2600) report, to the second network node (2602-2), link adaptation assistance information associated to the first network node (2602-1).

Embodiment 24: The method of embodiment 22 wherein the configuration message comprises: (a) a request for availability, at the communication device (2600), of link adaptation assistance information associated to at least the first network node (2602-1); (b) a request for availability, at the communication device (2600), of link adaptation assistance information associated to the second network node (2602-2); (c) a list of requested link adaptation assistance information associated to at least the first network node (2602-1) requested by the second network node (2602-2); (d) a list of configured link adaptation assistance information associated to at least the first network node (2602-1) to be reported to the second network node (2602-2); (e) a list of requested link adaptation assistance information associated to the second network node (2602-1) requested by the second network node (2602-2); (f) a list of configured link adaptation assistance information associated to the second network node (2602-2) to be reported to the second network node (2602-2); (g) one or more resource configuration information to report link adaptation assistance information; (h) a configuration format for at least one of the link adaptation assistance information requested or configured by the configuration message; (i) a combination of any two or more of (a)-(h).

Embodiment 25: The method of embodiment 22 wherein the configuration message requests or configures the communication device (2600) to report one or more link adaptation parameters associated to one or more communications instances with the first network node (2602-1) and/or one or more communications instances with the second network node (2602-2).

Embodiment 26: The method of embodiment 25 wherein the configuration message configures a reporting granularity in the time-domain, the frequency-domain, and/or the spatial-domain for at least one of the one or more link adaptation parameters.

Embodiment 27: The method of any of embodiments 22 to 26 wherein transmitting (2800) the configuration message comprises transmitting (2800) the configuration message within one or more random-access messages.

Embodiment 28: The method of any of embodiments 22 to 27 further comprising receiving (3000) an acknowledgement message from the communication device (2600) that indicates that the communication device (2600) can at least partially provide link adaptation assistance information in accordance with the configuration message.

Embodiment 29: The method of any of embodiments 22 to 27 further comprising receiving (3200) a message from the communication device (2600) that indicates that configuration of link assistance information reporting in accordance with the configuration message as failed.

Embodiment 30: The method of any of embodiments 19 to 28 further comprising using (2608) the link adaptation assistance information.

Embodiment 31: A method performed by a first network node (3302-1; 3602-1), the method comprising: transmitting (3304; 3608) a configuration message to a communication device (3300; 3600), wherein the configuration message configures or requests that the communication device (3300; 3600) report, to a second network node (3302-2; 3602-2), link adaptation assistance information associated to the first network node (3302-1; 3602-1) and/or link adaptation assistance information associated to the second network node (3302-2; 3602-2).

Embodiment 32: The method of embodiment 31 wherein the first network node (3302-1; 3602-1) is a source network node for a mobility event of the communication device (3300; 3600), and the second network node (3302-2; 3602-2) is a target network node for the mobility event of the communication device (2600).

Embodiment 33: The method of embodiment 31 or 32 wherein the link adaptation assistance information comprises: (i) one or more link adaptation parameters, (ii) one or more link adaptation state information elements, or (iii) both (i) and (ii).

Embodiment 34: The method of any of embodiments 31 to 33 wherein the configuration message configures the communication device (3300; 3600) to log or store link adaptation assistance information associated to the first network node (3302-1; 3602-1) and/or link adaptation assistance information associated to the second network node (3302-2; 3602-2).

Embodiment 35: The method of embodiments 31 to 33 wherein the configuration message configures the communication device (3300; 3600) to report the link adaptation assistance information to the second network node (3302-2; 3602-2).

Embodiment 36: The method of embodiments 31 to 33 wherein the configuration message comprises an indication of the second network node (3302-2; 3602-2) to which the communication device (3300; 3600) is to transmit the link adaptation assistance information report.

Embodiment 37: The method of any of embodiments 31 to 36 wherein transmitting (3304; 3608) the configuration message comprises transmitting (3304; 3608) the configuration message prior to radio access network, RAN, initialization of handover of the communication device (3300; 3600) from the first network node (3302-1; 3602-1) to the second network node (3302-2; 3602-2).

Embodiment 38: The method of any of embodiments 31 to 36 wherein transmitting (3304; 3608) the configuration message comprises transmitting (3304; 3608) the configuration message during radio access network, RAN, initialization of handover of the communication device (3300; 3600) from the first network node (3302-1; 3602-1) to the second network node (3302-2; 3602-2).

Embodiment 39: The method of any of embodiments 31 to 38 further comprising receiving (3604) a first configuration message from the second network node (3602-2), wherein the first configuration message is associated to the communication device (3600), which is connected to the first network node (3602-1), and the first configuration message comprises one or more information elements related to: configuration of the communication device (3600) to store or log link adaptation assistance information and/or configuration of the communication device (3600) to report link adaptation assistance information to the second network node (3602-2).

Embodiment 40: The method of embodiment 39 wherein the first configuration message comprises: (i) one or more types of link adaptation assistance information to be configured for the communication device (3600) when connected to the first network node (3602-1); (ii) one or more types of link adaptation assistance information to be configured for the communication device (3600) when connected to the second network node (3602-2); or (iii) both (i) and (ii).

Embodiment 41: The method of embodiment 39 or 40 further comprising determining (3606) the configuration message to be transmitted to the communication device (3600) based on the first configuration message received from the second network node (3602-2).

Embodiment 42: The method of any of embodiments 39 to 41 further comprising transmitting (3700) a second configuration message to the second network node (3602-2).

Embodiment 43: The method of embodiment 42 wherein transmitting (3700) the second configuration message to the second network node (3602-2) comprises transmitting (3700) the second configuration message to the second network node (3602-2) prior to receiving (3604) the first configuration message from the second network node (3602-2).

Embodiment 44: The method of embodiment 42 or 43 wherein the second configuration message comprises: (a) one or more communication device identities comprising an identity of the communication device (3600); (b) an indication of one or more link adaptation assistance information related capabilities of the communication device (3600); (c) an indication of one or more types of link adaptation assistance information that that communication device (3600) can be or is desired to be configured to log or store and/or report to the second network node (3602-2); (d) for at least one type of link adaptation assistance information to be logged or stored and/or reported by the communication device (3600), one or more formats for which the communication device (3600) can be configured or is desired to be configured for reporting; or (e) a combination of any two or more of (a)-(d).

Embodiment 45: The method of embodiment 42 wherein transmitting (3700) the second configuration message to the second network node (3602-2) comprises transmitting (3700) the second configuration message to the second network node (3602-2) after receiving (3604) the first configuration message from the second network node (3602-2).

Embodiment 46: The method of embodiment 42 or 45 wherein the second configuration message comprises an acknowledgment, rejection, and/or modification of all or parts of the information elements comprised in the first configuration message.

Embodiment 47: A method performed by a first network node (3302-1; 3602-1), the method comprising: receiving (3604) a first configuration message from a second network node (3602-2), wherein the first configuration message is associated to a communication device (3600), which is connected to the first network node (3602-1), and the first configuration message comprises one or more information elements related to: configuration of the communication device (3600) to store or log link adaptation assistance information and/or configuration of the communication device (3600) to report link adaptation assistance information to the second network node (3602-2).

Embodiment 48: The method of embodiment 47 wherein the first configuration message comprises: (i) one or more types of link adaptation assistance information to be configured for the communication device (3600) when connected to the first network node (3602-1); (ii) one or more types of link adaptation assistance information to be configured for the communication device (3600) when connected to the second network node (3602-2); or (iii) both (i) and (ii).

Embodiment 49: The method of embodiment 47 or 48 further comprising determining (3606) a configuration message to be transmitted to the communication device (3600)

based on the first configuration message received from the second network node (3602-2).

Embodiment 50: The method of any of embodiments 47 to 49 further comprising transmitting (3700) a second configuration message to the second network node (3602-2).

Embodiment 51: The method of embodiment 50 wherein transmitting (3700) the second configuration message to the second network node (3602-2) comprises transmitting (3700) the second configuration message to the second network node (3602-2) prior to receiving (3604) the first configuration message from the second network node (3602-2).

Embodiment 52: The method of embodiment 50 or 51 wherein the second configuration message comprises: (a) one or more communication device identities comprising an identity of the communication device (3600); (b) an indication of one or more link adaptation assistance information related capabilities of the communication device (3600); (c) an indication of one or more types of link adaptation assistance information that that communication device (3600) can be or is desired to be configured to log or store and/or report to the second network node (3602-2); (d) for at least one type of link adaptation assistance information to be logged or stored and/or reported by the communication device (3600), one or more formats for which the communication device (3600) can be configured or is desired to be configured for reporting; or (e) a combination of any two or more of (a)-(d).

Embodiment 53: The method of embodiment 50 wherein transmitting (3700) the second configuration message to the second network node (3602-2) comprises transmitting (3700) the second configuration message to the second network node (3602-2) after receiving (3604) the first configuration message from the second network node (3602-2).

Embodiment 54: The method of embodiment 50 or 53 wherein the second configuration message comprises an acknowledgment, rejection, and/or modification of all or parts of the information elements comprised in the first configuration message.

Embodiment 55: A network node adapted to perform the method of any of embodiments 19 to 54.

3 Additional Description Relevant to All Embodiments

Figure 43:
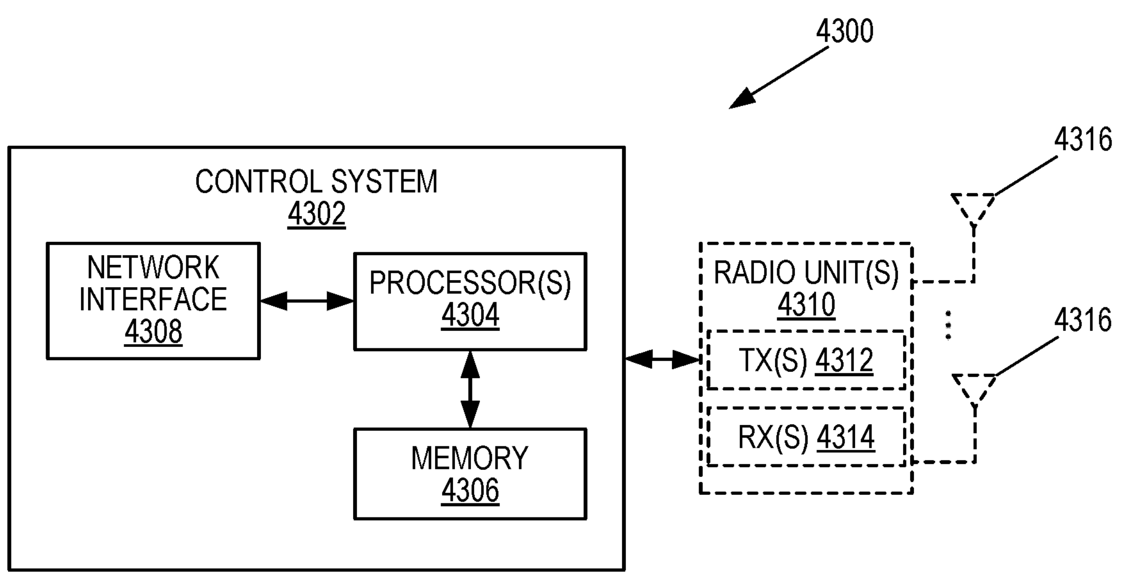
FIGS. 43, 44, and 45 are schematic block diagrams of example embodiments of a Radio Access Network (RAN) node.

FIG. 43 is a schematic block diagram of a RAN node 4300 according to some embodiments of the present disclosure. Optional features are represented by dashed boxes. The RAN node 4300 may be, for example, the first network node 1200-1, the second network node 1200-2, the third network node 1800, the first network node 2602-1, the second network node 2602-2, the first network node 3302-1, the second network node 3302-2, the first network node 3602-1, or the second network node 3602-2, as described herein. Examples of the RAN node 4300 include, but are not limited to, a base station 1102 or 1106, a network node that implements all or part of the functionality of the base station 1102, gNB, gNB-CU, gNB-DU, gNB-CU-CP, gNB-CU-UP, eNB, or the like described herein. As illustrated, the RAN node 4300 includes a control system 4302 that includes one or more processors 4304 (e.g., Central Processing Units (CPUs), Application Specific Integrated Circuits (ASICs), Field Programmable Gate Arrays (FPGAs), and/or the like), memory 4306, and a network interface 4308. The one or more processors 4304 are also referred to herein as processing circuitry. In addition, the RAN node 4300 may include one or more radio units 4310 that each includes one or more transmitters 4312 and one or more receivers 4314 coupled to one or more antennas 4316. The radio units 4310 may be referred to or be part of radio interface circuitry. In some embodiments, the radio unit(s) 4310 is external to the control system 4302 and connected to the control system 4302 via, e.g., a wired connection (e.g., an optical cable). However, in some other embodiments, the radio unit(s) 4310 and potentially the antenna(s) 4316 are integrated together with the control system 4302. The one or more processors 4304 operate to provide one or more functions of a RAN node 4300 as described herein. In some embodiments, the function(s) are implemented in software that is stored, e.g., in the memory 4306 and executed by the one or more processors 4304.

Figure 44:
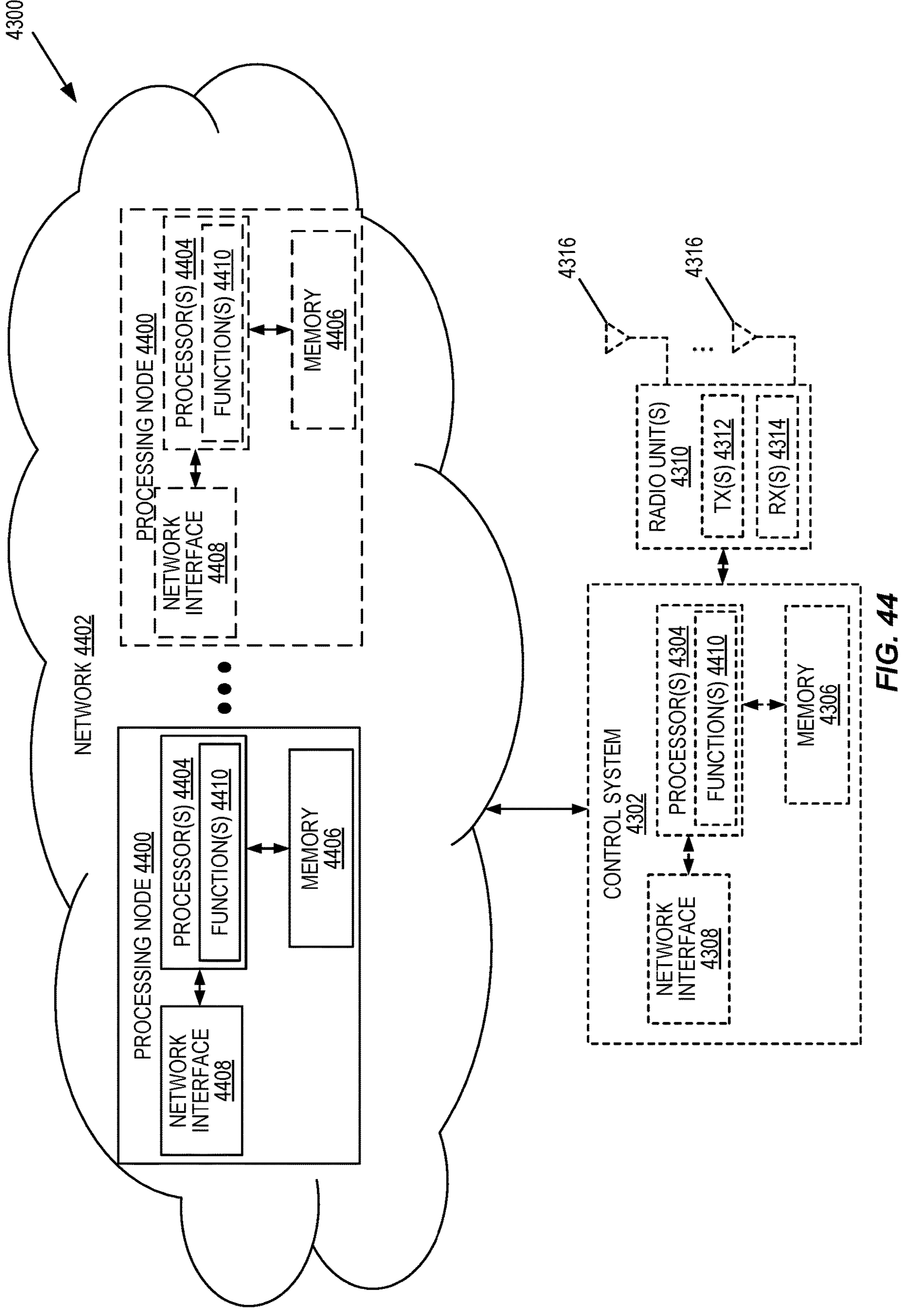

FIG. 44 is a schematic block diagram that illustrates a virtualized embodiment of the RAN node 4300 according to some embodiments of the present disclosure. Again, optional features are represented by dashed boxes. As used herein, a "virtualized" RAN node is an implementation of the RAN node 4300 in which at least a portion of the functionality of the RAN node 4300 is implemented as a virtual component(s) (e.g., via a virtual machine(s) executing on a physical processing node(s) in a network(s)). As illustrated, in this example, the RAN node 4300 may include the control system 4302 and/or the one or more radio units 4310, as described above. The control system 4302 may be connected to the radio unit(s) 4310 via, for example, an optical cable or the like. The RAN node 4300 includes one or more processing nodes 4400 coupled to or included as part of a network(s) 4402. If present, the control system 4302 or the radio unit(s) are connected to the processing node(s) 4400 via the network 4402. Each processing node 4400 includes one or more processors 4404 (e.g., CPUs, ASICs, FPGAs, and/or the like), memory 4406, and a network interface 4408.

In this example, functions 4410 of the RAN node 4300 described herein are implemented at the one or more processing nodes 4400 or distributed across the one or more processing nodes 4400 and the control system 4302 and/or the radio unit(s) 4310 in any desired manner. In some particular embodiments, some or all of the functions 4410 of the RAN node 4300 described herein are implemented as virtual components executed by one or more virtual machines implemented in a virtual environment(s) hosted by the processing node(s) 4400. As will be appreciated by one of ordinary skill in the art, additional signaling or communication between the processing node(s) 4400 and the control system 4302 is used in order to carry out at least some of the desired functions 4410. Notably, in some embodiments, the control system 4302 may not be included, in which case the radio unit(s) 4310 communicate directly with the processing node(s) 4400 via an appropriate network interface(s).

In some embodiments, a computer program including instructions which, when executed by at least one processor, causes the at least one processor to carry out the functionality of RAN node 4300 or a node (e.g., a processing node 4400) implementing one or more of the functions 4410 of the RAN node 4300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 45:
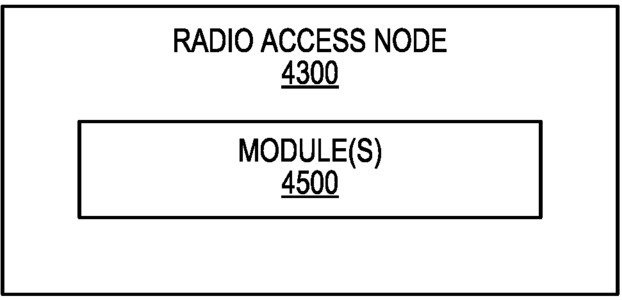

FIG. 45 is a schematic block diagram of the RAN node 4300 according to some other embodiments of the present disclosure. The RAN node 4300 includes one or more modules 4500, each of which is implemented in software. The module(s) 4500 provide the functionality of the RAN node 4300 described herein. This discussion is equally applicable to the processing node 4400 of FIG. 44 where the modules 4500 may be implemented at one of the processing nodes 4400 or distributed across multiple processing nodes 4400 and/or distributed across the processing node(s) 4400 and the control system 4302.

Figure 46:
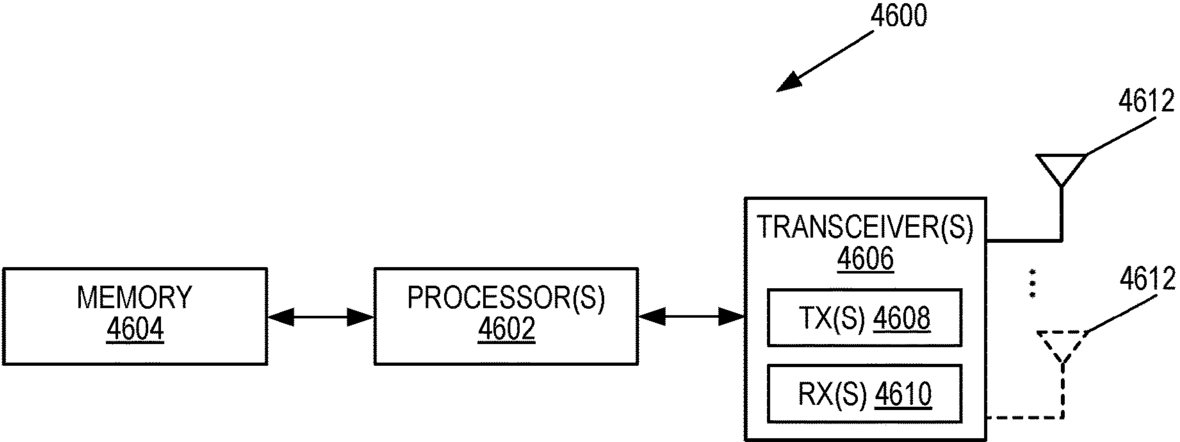
FIGS. 46 and 47 are schematic block diagrams of example embodiments of the wireless communication device.

FIG. 46 is a schematic block diagram of a wireless communication device 4600 (e.g., wireless communication device 2600, 3300, or 3600) according to some embodiments of the present disclosure. As illustrated, the wireless communication device 4600 includes one or more processors 4602 (e.g., CPUs, ASICs, FPGAs, and/or the like), memory 4604, and one or more transceivers 4606 each including one or more transmitters 4608 and one or more receivers 4610 coupled to one or more antennas 4612. The transceiver(s) 4606 includes radio-front end circuitry connected to the antenna(s) 4612 that is configured to condition signals communicated between the antenna(s) 4612 and the processor(s) 4602, as will be appreciated by on of ordinary skill in the art. The processors 4602 are also referred to herein as processing circuitry. The transceivers 4606 are also referred to herein as radio circuitry. In some embodiments, the functionality of the wireless communication device 4600 described above may be fully or partially implemented in software that is, e.g., stored in the memory 4604 and executed by the processor(s) 4602. Note that the wireless communication device 4600 may include additional components not illustrated in FIG. 46 such as, e.g., one or more user interface components (e.g., an input/output interface including a display, buttons, a touch screen, a microphone, a speaker(s), and/or the like and/or any other components for allowing input of information into the wireless communication device 4600 and/or allowing output of information from the wireless communication device 4600), a power supply (e.g., a battery and associated power circuitry), etc.

In some embodiments, a computer program including instructions which, when executed by at least one processor, causes the at least one processor to carry out the functionality of the wireless communication device 4600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 47:
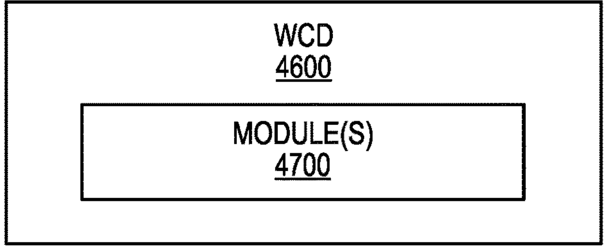

FIG. 47 is a schematic block diagram of the wireless communication device 4600 according to some other embodiments of the present disclosure. The wireless communication device 4600 includes one or more modules 4700, each of which is implemented in software. The module(s) 4700 provide the functionality of the wireless communication device 4600 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

The invention claimed is:

1. A method performed by a first network node for inter-network-node exchange of link adaptation assistance information associated to at least one communication device in a communication network, the method comprising:

obtaining link adaptation assistance information associated to at least one communication device served by the first network node;

prior to transmitting a link adaptation assistance information message to a second network node, receiving a link adaptation assistance information request from the second network node and at least one of:

transmitting a link adaptation assistance information request acknowledgement to the second network node, the link adaptation assistance information request acknowledgement indicating whether the first network node is able to fully or only partially fulfill the link adaptation assistance information request; or transmitting a link adaptation assistance information request negative acknowledgement to the second network node; and transmitting the link adaptation assistance information message comprising the link adaptation assistance information to the second network node.

2. The method of claim 1 wherein the link adaptation assistance information comprises link adaptation assistance information for a particular communication device in a serving cell of the first network node, wherein the link adaptation assistance information for the particular communication device is further associated to: (a) a communication link between the particular communication device and the first network node, (b) a communication link between the particular communication device and the second network node, or (c) both (a) and (b).

3. The method of claim 1 wherein the link adaptation assistance information message further comprises information that indicates one or more radio signals that have been used to determine the link adaptation assistance information.

4. The method of claim 1 wherein the link adaptation assistance information comprises: (i) one or more link adaptation parameters for an uplink or downlink of the at least one communication device, (ii) link adaptation state information for the at least one communication device, or (iii) both (i) and (ii).

5. The method of claim 1 wherein the link adaptation assistance information comprises one or more link adaptation parameters for an uplink or downlink of the at least one communication device, and the one or more link adaptation parameters comprise:

one or more link adaptation parameters used by the first network node for the at least one communication device, one or more link adaptation parameters estimated or recommended by the first network node to be used by the second network node for the at least one communication device, or both; or one or more link adaptation parameters associated to a communication link between the at least one communication device and the first network node, one or more link adaptation parameters associated to a communication link between the at least one communication device and the second network node, or both.

6. The method of claim 4 wherein the one or more link adaptation parameters comprise:

modulation order, code rate, modulation and coding scheme, MCS, index, transport block size, TBS, information carrying capacity, an indication of transmission type, an indication of a transmission number associated to the one or more link adaptation parameters, an indication of one or more hybrid automatic repeat request, HARQ, feedback parameters associated to one or more link adaptation parameters, or any combination thereof.

7. The method of claim 4 wherein the link adaptation assistance information further comprises, for at least one of the link adaptation parameters, an associated probability of success, an associated uncertainty in the associated probability of success, an associated confidence level for the associated probability of success, or any combination thereof.

8. The method of claim 4 wherein at least one of the link adaptation parameters is reported with respect to a defined reporting granularity in the frequency domain, the time domain, the spatial domain, or any combination thereof.

9. The method of claim 4 wherein the link adaptation state information comprises:

a Channel State Information, CSI, measurement report, a CSI prediction report, an indication of a mobility state of the at least one communication device, an indication of a channel fading state experienced by the at least one communication device, an indication of an interference state experienced by the at least one communication device, one or more measurements of a downlink data transmission state in at least one previous transmit time interval, TTI, for the at least one communication device, or any combination thereof.

10. The method of claim 4 wherein at least some of the link adaptation state information is reported with respect to a defined reporting granularity in the frequency domain, the time domain, the spatial domain, or any combination thereof.

11. The method of claim 1 wherein transmitting the link adaptation assistance information message to the second network node comprises transmitting the link adaptation assistance information message to the second network node in a handover request.

12. The method of claim 1 wherein receiving the link adaptation assistance information request from the second network node comprises receiving a handover response from the second network node, the handover response comprising the link adaptation assistance information request.

13. The method of claim 1 wherein obtaining the link adaptation assistance information comprises determining the link adaptation assistance information based on information comprised in the link adaptation assistance information request.

14. The method of claim 13 wherein the information comprised in the link adaptation assistance information request comprises:

an indication to start link adaptation assistance information reporting;

an indication to stop link adaptation assistance information reporting;

an indication to pause link adaptation assistance information reporting;

an indication to resume link adaptation assistance information reporting;

an indication of a type of reporting required (e.g., periodic, aperiodic, or event-triggered); or any combination thereof.

15. The method of claim 13 wherein the information comprised in the link adaptation assistance information request comprises information that indicates one or more types of link adaptation assistance information being requested.

16. The method of claim 15 wherein the one or more types of link adaptation assistance information being requested comprise:

a Channel State Information, CSI, measurement report, a CSI prediction report, an indication of at least one uncertainty measure for one or more information elements of the CSI measurement report, an indication of at least one uncertainty measure for one or more information elements of the CSI prediction report, an indication of a mobility state of the at least one communication device, an indication of a channel fading state experienced by the at least one communication device, an indication of an interference state experienced by the at least one communication device, one or more measurements of a downlink data transmission state in at least one previous transmit time interval, TTI, for the at least one communication device, or any combination thereof.

17. The method of claim 15 wherein the information comprised in the link adaptation assistance information request further comprises information that indicates a reporting granularity for at least one of the one or more types of link adaptation assistance information being requested in the frequency domain, the time domain, the spatial domain, or any combination thereof.

18. The method of claim 15 wherein the information comprised in the link adaptation assistance information request further comprises for at least one of the one or more types of link adaptation assistance information being requested, information that indicates one or more associated reference signal beam coverage areas for which link adaptation assistance information is being requested.

* * * * *